(12) United States Patent
Kim et al.

(10) Patent No.: US 9,813,845 B2
(45) Date of Patent: Nov. 7, 2017

(54) METHOD AND APPARATUS FOR BLUETOOTH CONNECTION

(71) Applicant: LG ELECTRONICS INC., Seoul (KR)

(72) Inventors: Dokyun Kim, Seoul (KR); Younghwan Kwon, Seoul (KR); Jingu Choi, Seoul (KR); Jangwoong Park, Seoul (KR); Minsoo Lee, Seoul (KR); Hyeonjae Lee, Seoul (KR); Seungryul Yang, Seoul (KR); Jaeho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/036,000

(22) PCT Filed: Nov. 6, 2014

(86) PCT No.: PCT/KR2014/010603
§ 371 (c)(1),
(2) Date: May 11, 2016

(87) PCT Pub. No.: WO2015/069030
PCT Pub. Date: May 14, 2015

(65) Prior Publication Data
US 2016/0360345 A1    Dec. 8, 2016

Related U.S. Application Data

(60) Provisional application No. 61/902,749, filed on Nov. 11, 2013.

(30) Foreign Application Priority Data

Jun. 9, 2014  (KR) ........................ 10-2014-0069472

(51) Int. Cl.
*H04W 8/00* (2009.01)
*H04W 4/00* (2009.01)
*H04W 76/02* (2009.01)

(52) U.S. Cl.
CPC .......... *H04W 4/008* (2013.01); *H04W 8/005* (2013.01); *H04W 76/023* (2013.01)

(58) Field of Classification Search
USPC .......... 455/41.2, 404.2, 411, 456.3, 420, 445
See application file for complete search history.

(56) References Cited

U.S. PATENT DOCUMENTS 8,577,392 B1 * 11/2013 Pai .......................... H04L 67/18
455/404.2
2012/0195387 A1 * 8/2012 Masuda .............. H04M 1/7253
375/259

(Continued)

FOREIGN PATENT DOCUMENTS

EP           2557825      2/2013
KR      10-0726622      6/2007

(Continued)

OTHER PUBLICATIONS

PCT International Application No. PCT/KR2014/010603, Notification of Transmittal of the International Search Report dated Feb. 25, 2015, 3 pages.

*Primary Examiner* — Ganiyu A Hanidu
(74) *Attorney, Agent, or Firm* — Lee, Hong, Degerman, Kang & Waimey

(57) ABSTRACT

The present invention relates to Bluetooth connection methods and apparatuses. An embodiment of the present invention provides a Bluetooth connection method, including transmitting, by a Bluetooth LE module, a packet to request device information, receiving a packet related to the device information from at least one connectable Bluetooth LE module, and discovering the at least one connectable Blu- (Continued)

etooth LE module; transmitting, by the Bluetooth LE module, a packet indicative of connection with the discovered at least one connectable Bluetooth LE module and connecting the discovered at least one connectable Bluetooth LE module; and transmitting data to the discovered at least one connectable Bluetooth LE module or at least one Bluetooth BR/EDR module corresponding to the discovered at least one connectable Bluetooth LE module.

13 Claims, 41 Drawing Sheets

(56) References Cited

U.S. PATENT DOCUMENTS

| | | | |
|---|---|---|---|
| 2013/0182798 A1 | 7/2013 | Lozano | |
| 2014/0194062 A1* | 7/2014 | Palin | H04W 4/008 455/41.2 |
| 2014/0199969 A1* | 7/2014 | Johnsson | H04W 56/00 455/411 |
| 2015/0289081 A1* | 10/2015 | Chen | H04W 8/005 455/41.2 |

FOREIGN PATENT DOCUMENTS

| | | |
|---|---|---|
| KR | 10-2009-0041003 | 4/2009 |
| KR | 10-2009-0124588 | 12/2009 |
| WO | 2013/022471 | 2/2013 |

* cited by examiner

[FIG. 1]
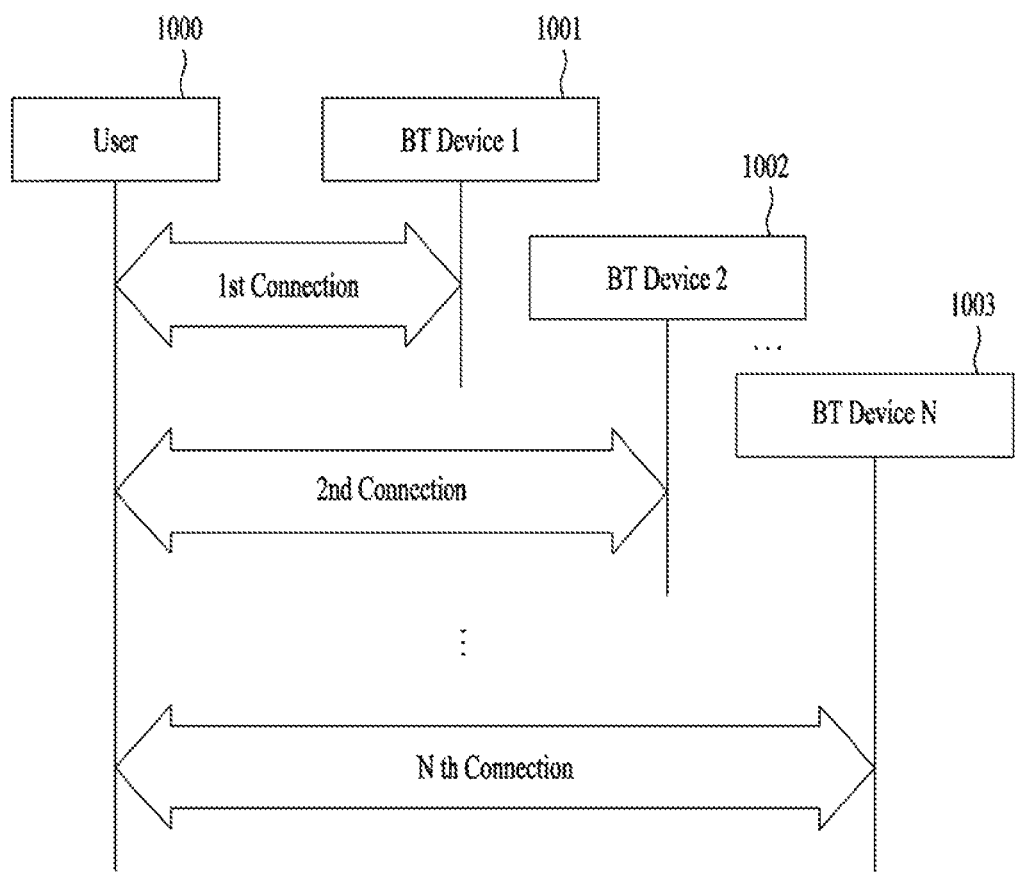

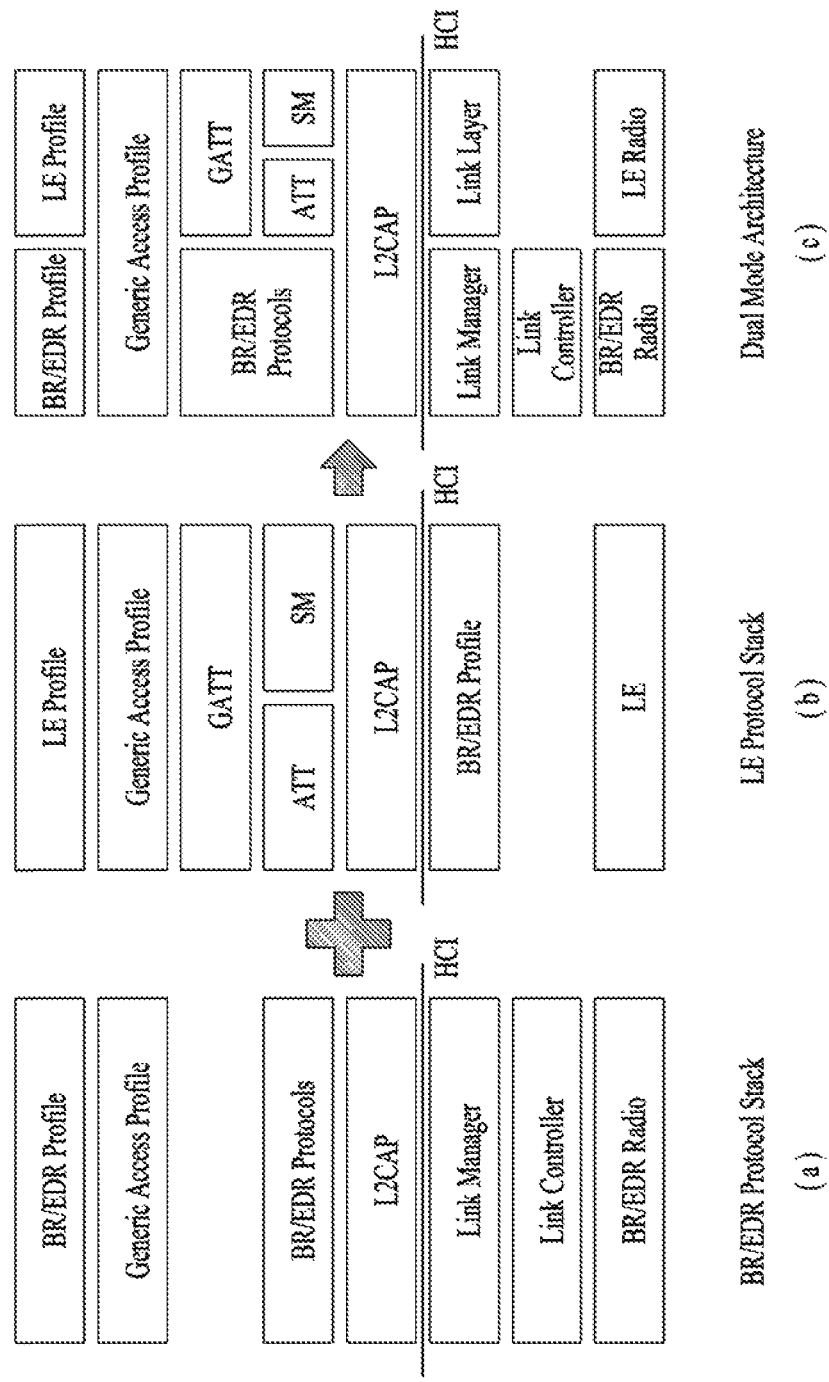

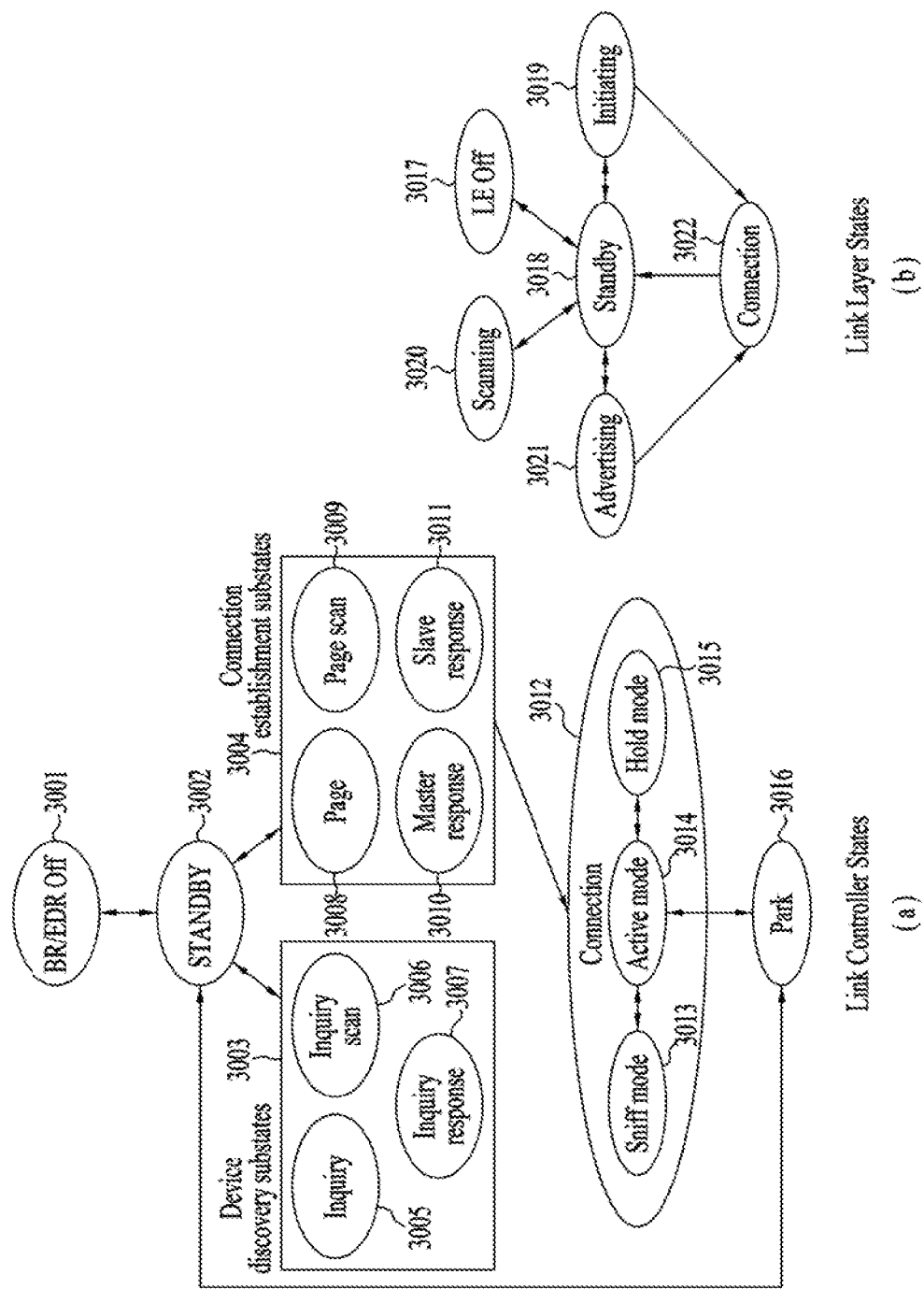
[FIG. 3]

[FIG. 4]

| Control PDU | parameters |
|---|---|
| Advertising (ADV_IND, SCAN_REQ, SCAN_RSP) | Dev_info Conn_info Authority |
| Handover Request | Authority |
| Handover Response | Conn_info Authority Result |

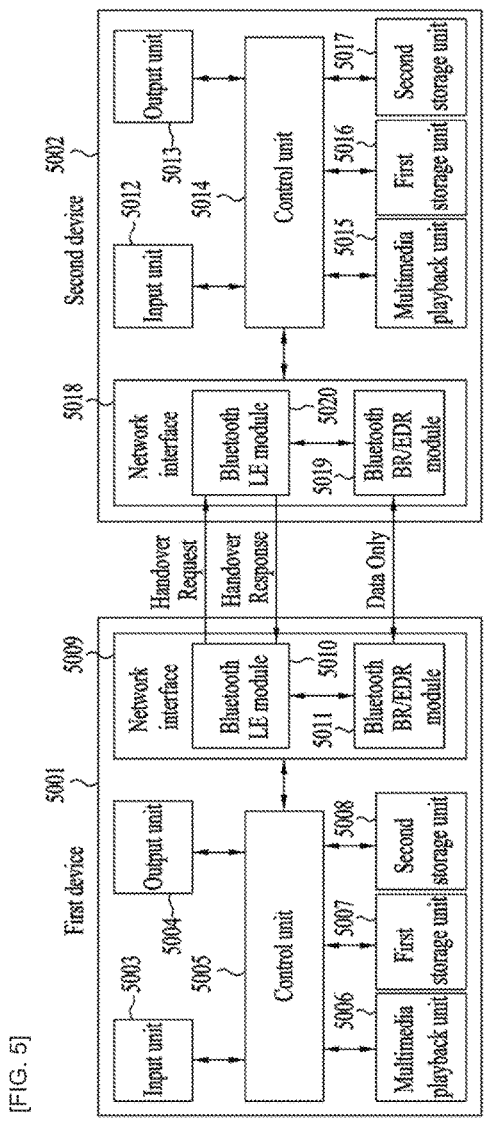
[FIG. 5]

[FIG. 6]
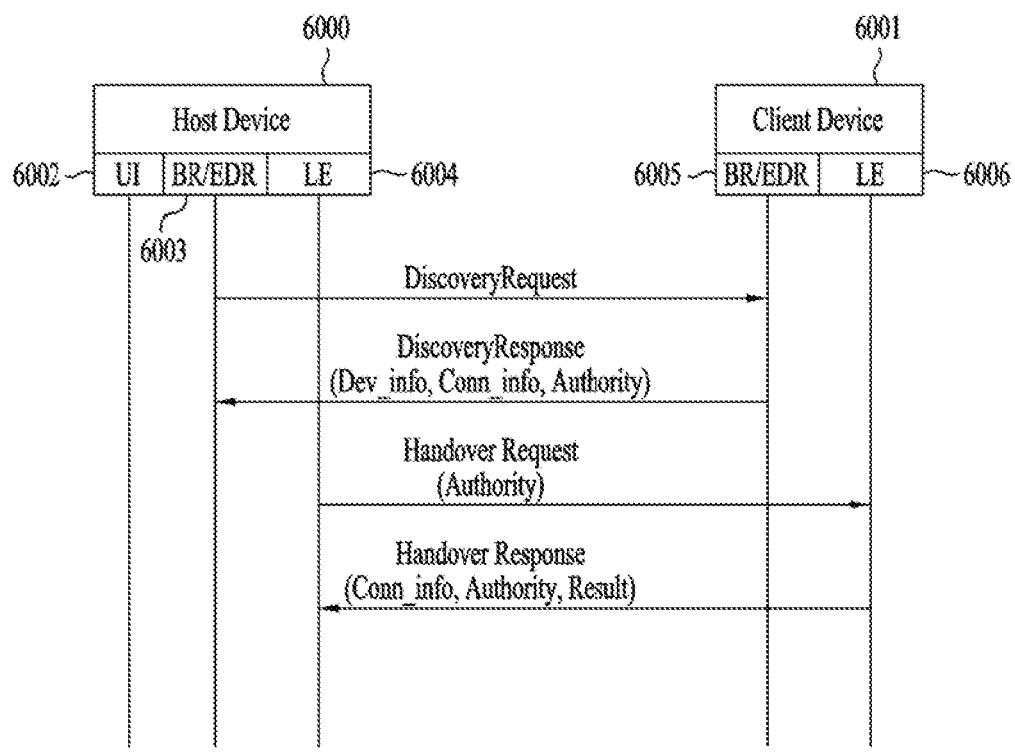

[FIG. 7]
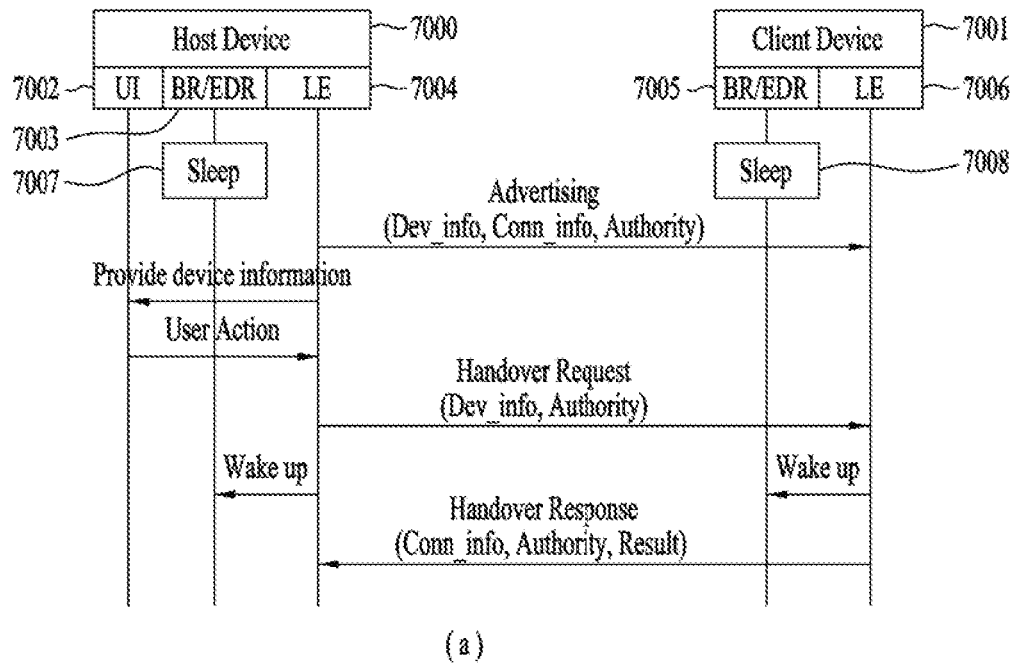

[FIG. 8]
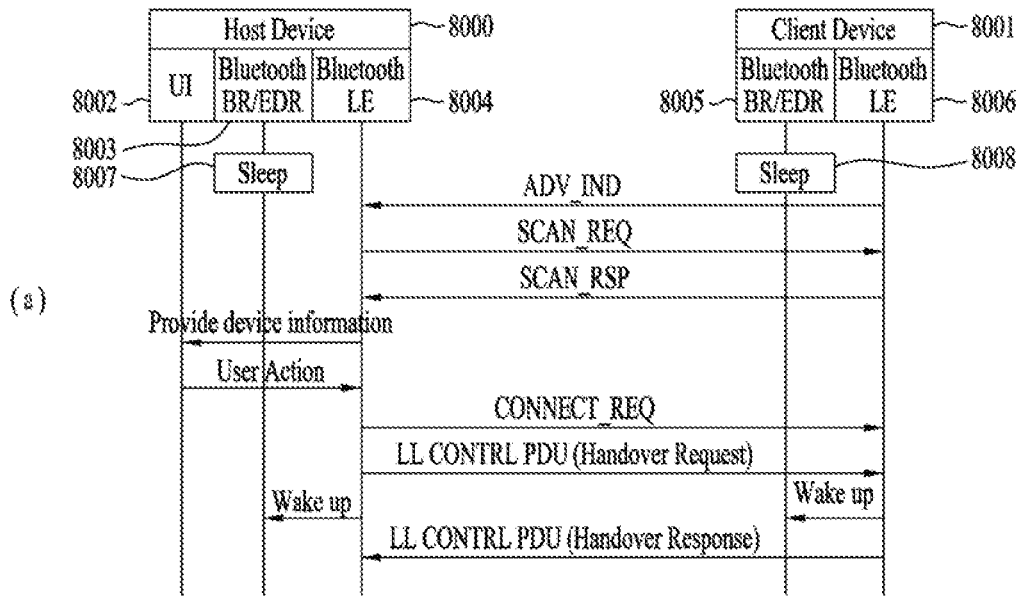

[FIG. 9]

| Bluetooth dual mode power level | | | |
|---|---|---|---|
| Power level | BR/EDR module state | LE module state | Description |
| Level 1 | BR/EDR off | LE off | When main power of device is an off state |
| Level 2 | BR/EDR off | Standby | When a user changes main power from off to on |
| Level 3 | BR/EDR off | Advertising | Device performs discovery process |
| Level 4 | BR/EDR off | Scanning | Device performs discovery process |
| Level 5 | Paging | Connection | When sending handover request and attempting BR/EDR pairing |
| Level 6 | Page Scan | Connection | When receiving handover response and attempting BR/EDR pairing |
| Level 7 | Connection | Standby | When BR/EDR connection has been set up |
| Level 8 | Connection | Advertising | When BR/EDR connection has been set up |
| ... | | | |
| Level N | ... | ... | ... |

[FIG. 10]
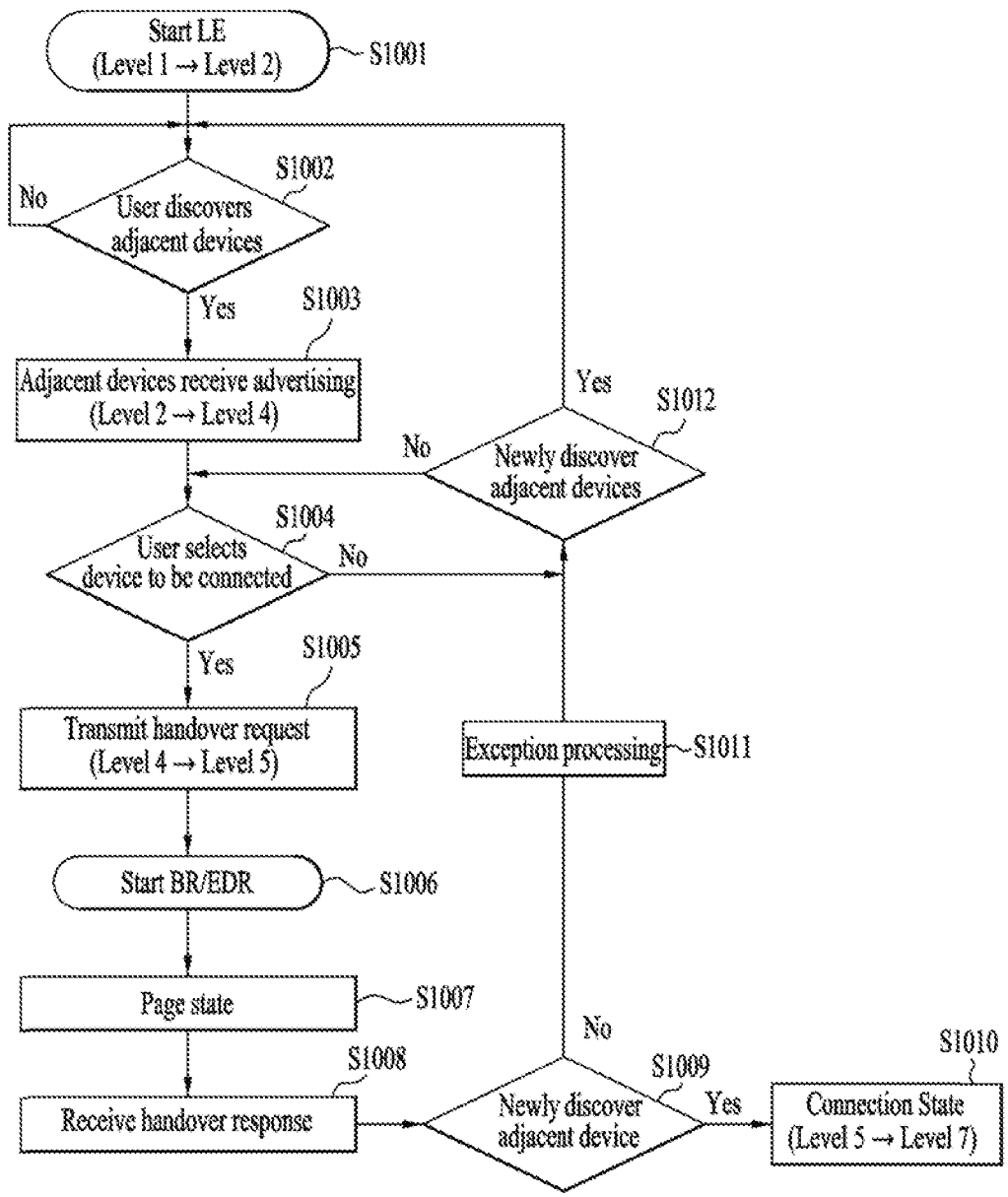

[FIG. 11]
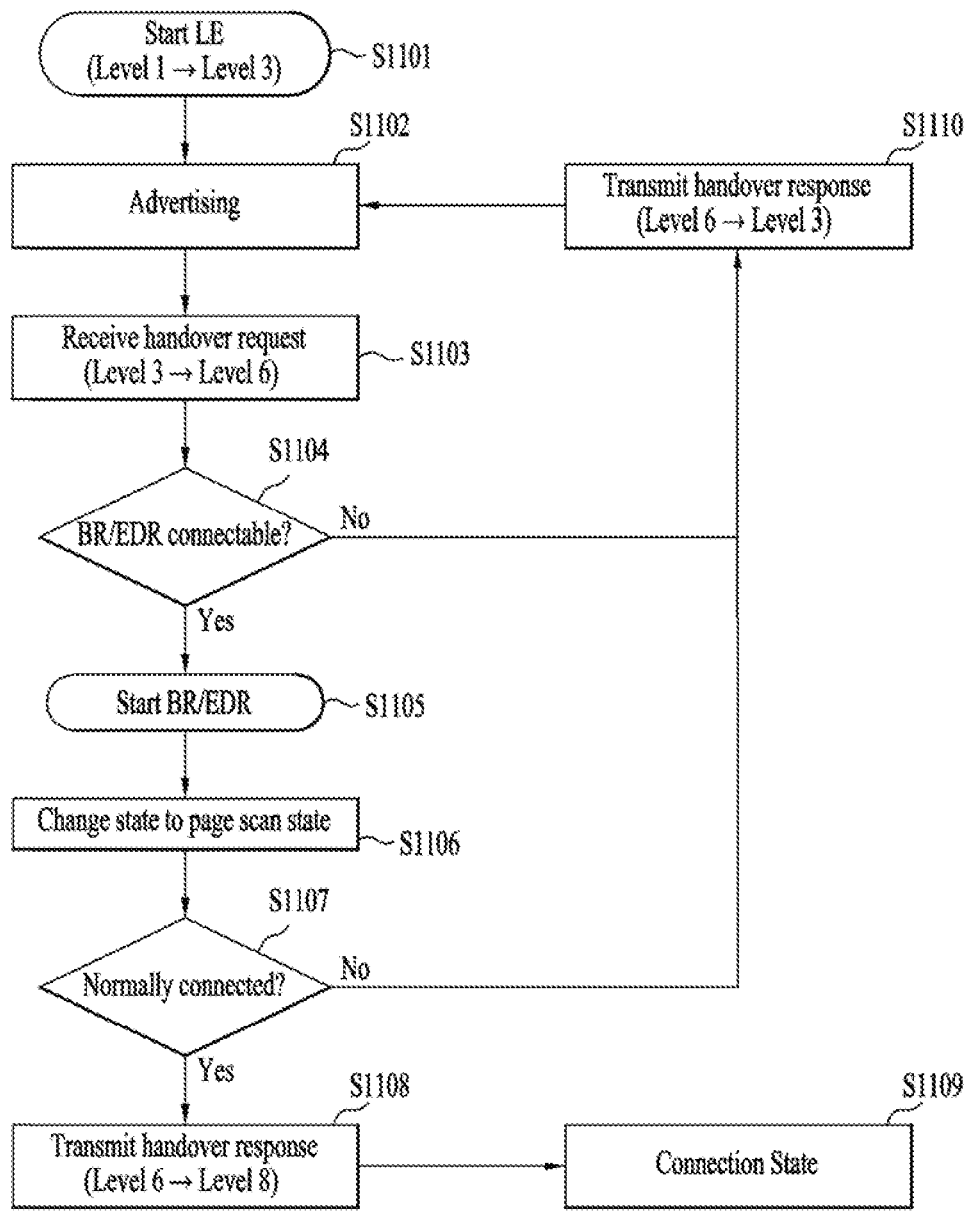

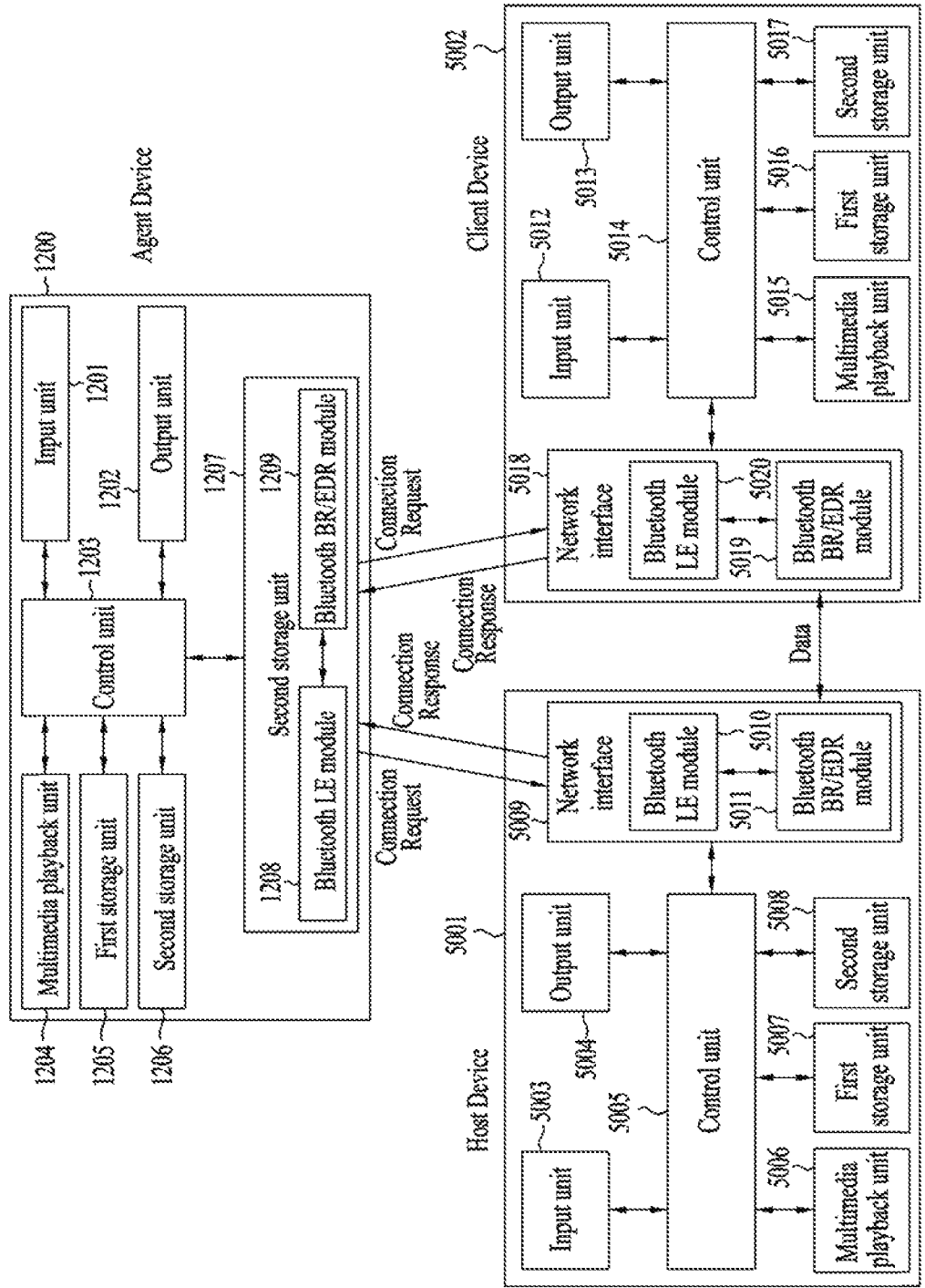
[FIG. 12]

[FIG. 13]
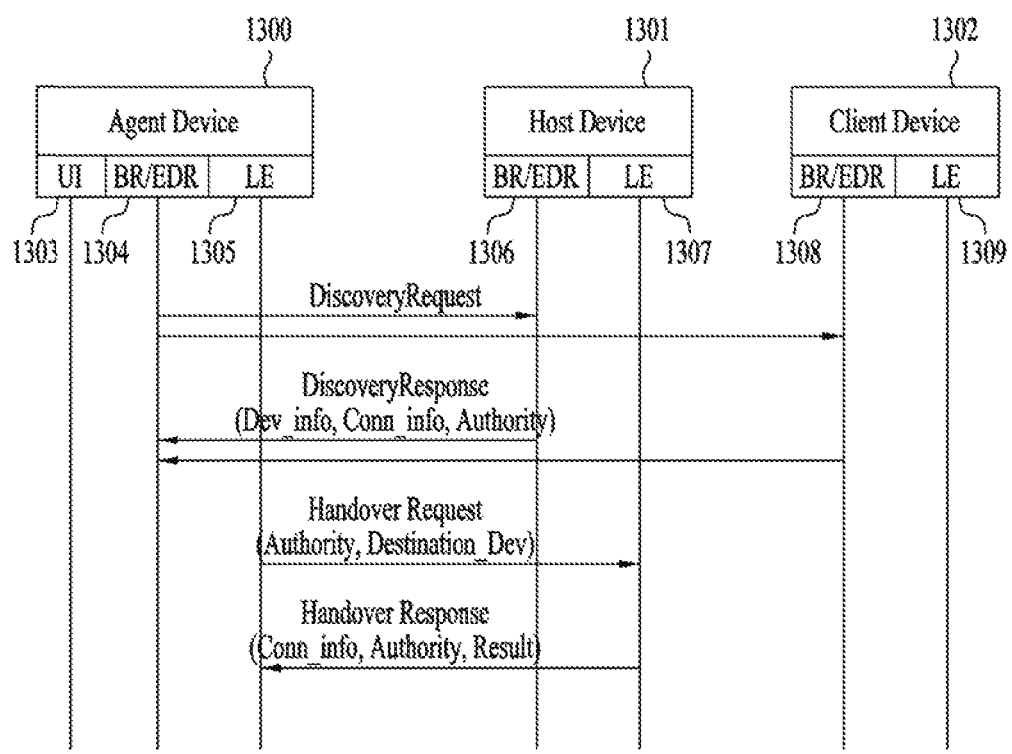

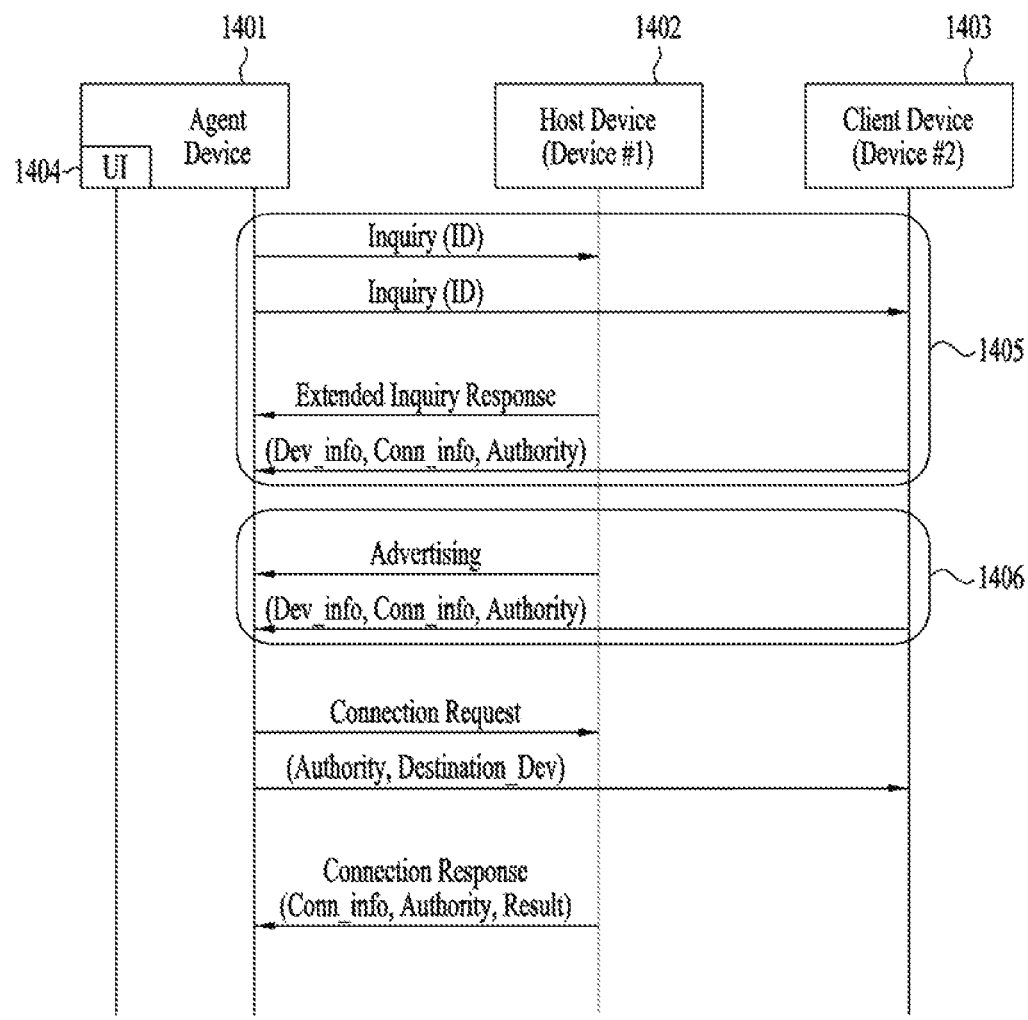
[FIG. 14]

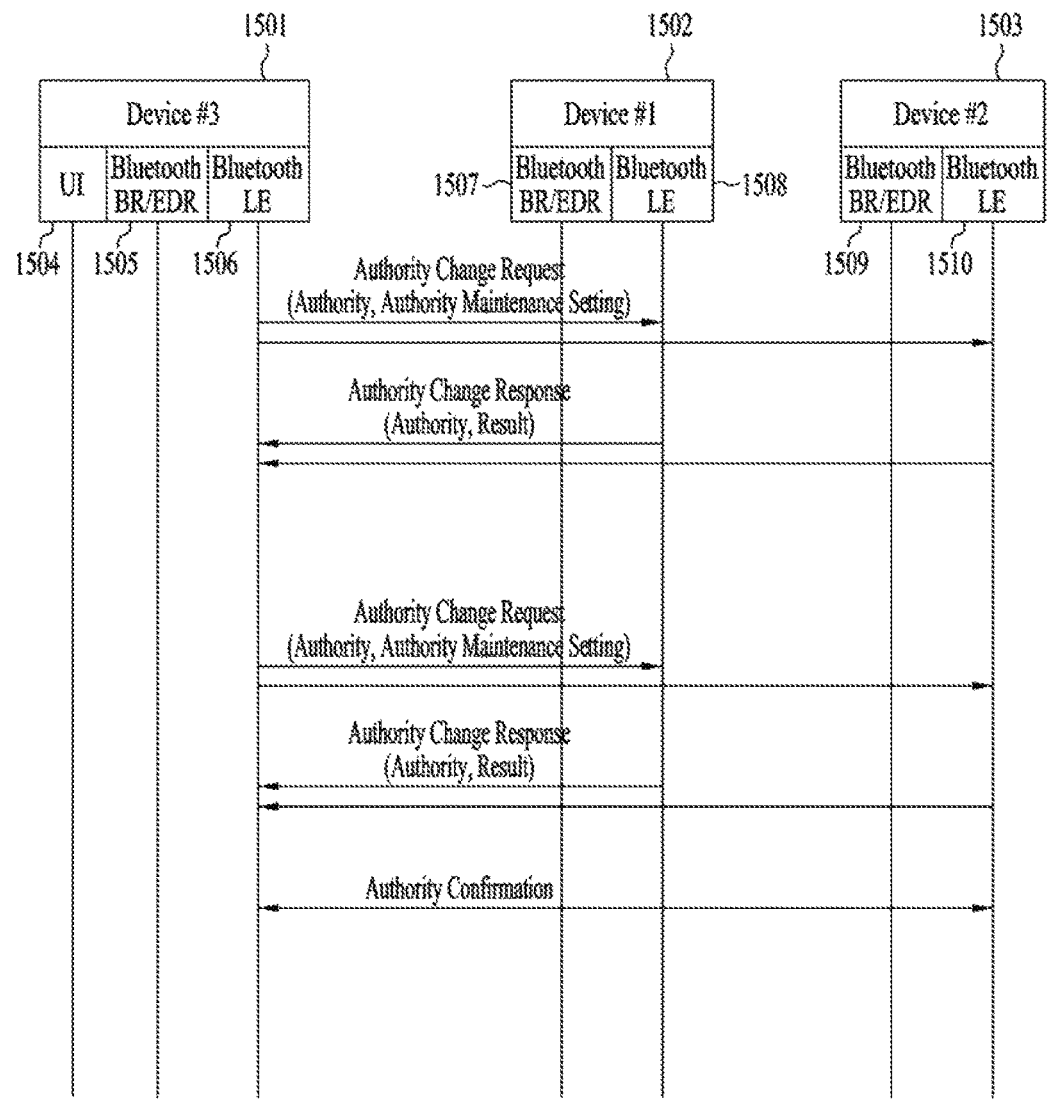

[FIG. 16]
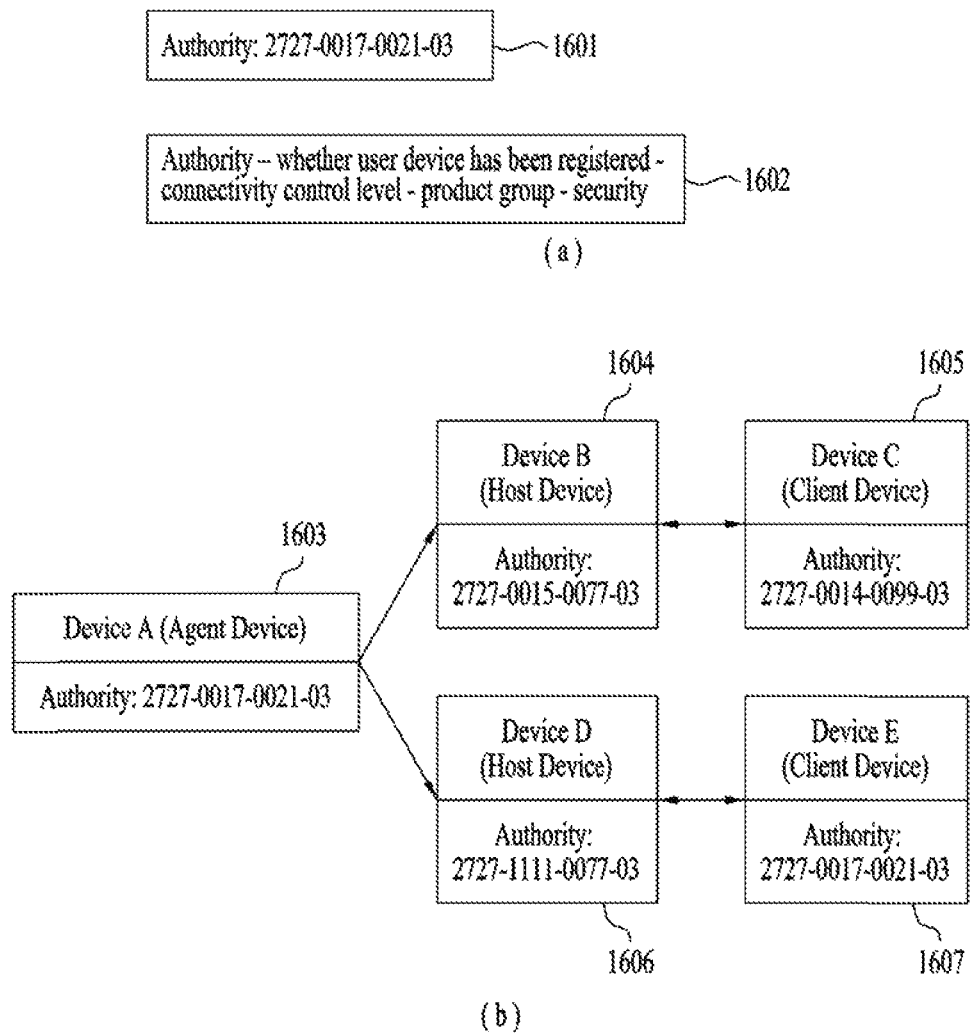

[FIG. 17]
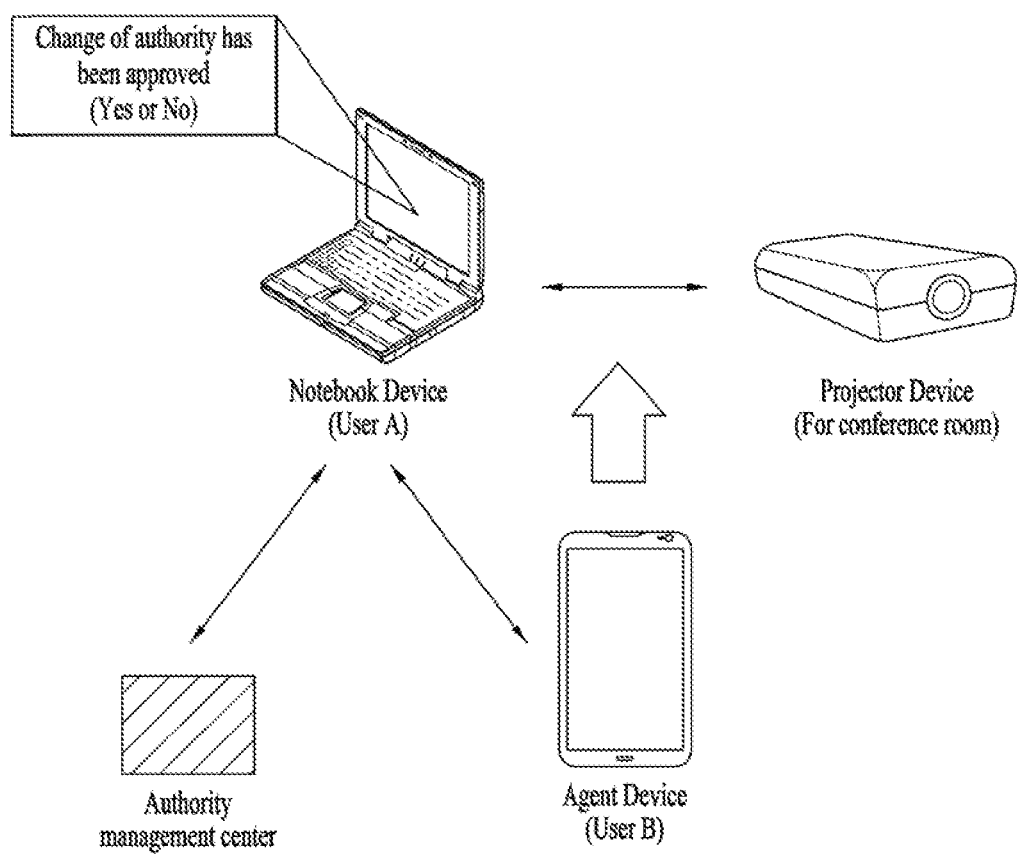

[FIG. 18]
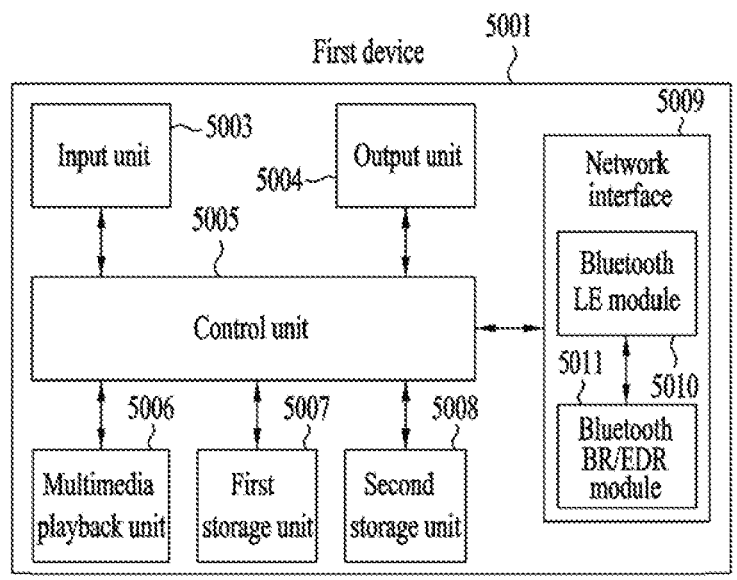
(a)
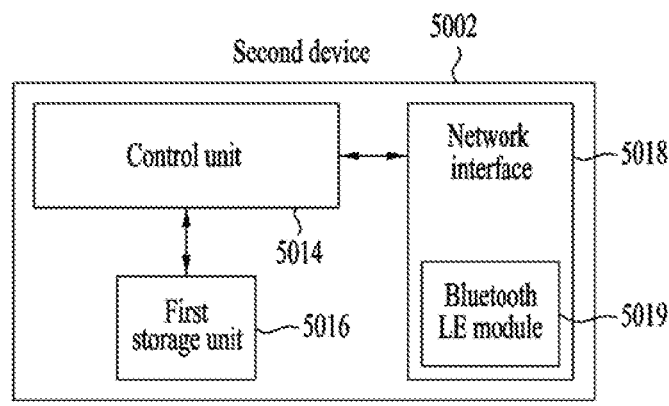
(b)

[FIG. 19]
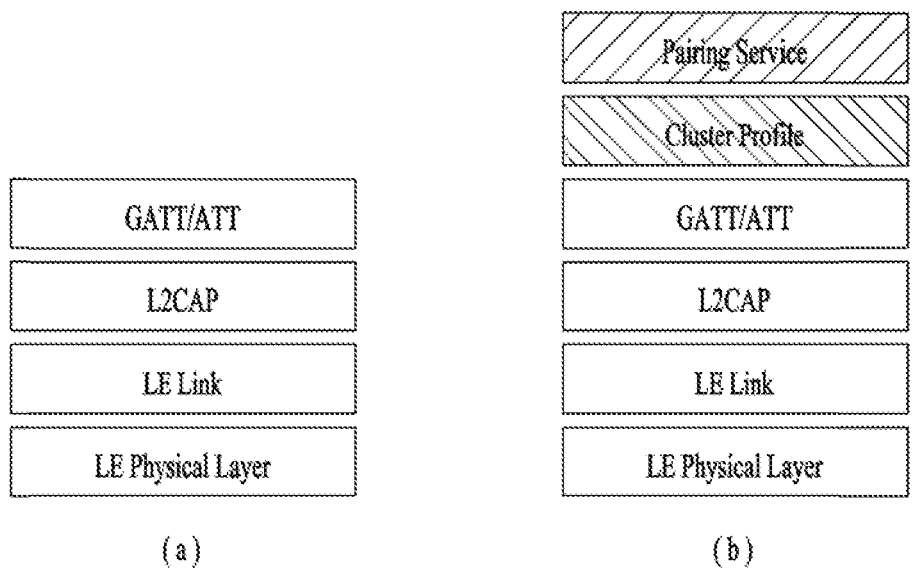

| Packet Name | Parameter Field |
|---|---|
| Inquiry | |
| Extended Inquiry Response | Dev_info<br>Cluster_info<br>Authority |
| Request Cluster | Cluster_ID<br>Cluster_Dev_Info<br>Authority |
| Response Cluster | Authority<br>Result_Cluster |
| Cluster Control | Control_Info<br>Response |
| Release Cluster | Cluster_ID<br>Authority_ID |

(b)

| Packet Name | Parameter Field |
|---|---|
| Advertising (ADV_IND, SCAN_REQ, SCAN_RSP) | Dev_info<br>Cluster_Dev_Info<br>Authority |
| Request Cluster | Authority |
| Response Cluster | Authority<br>Result_Cluster |
| Cluster Control | Control_Info |
| Release Cluster | Cluster_ID<br>Authority_ID |

[FIG. 21]
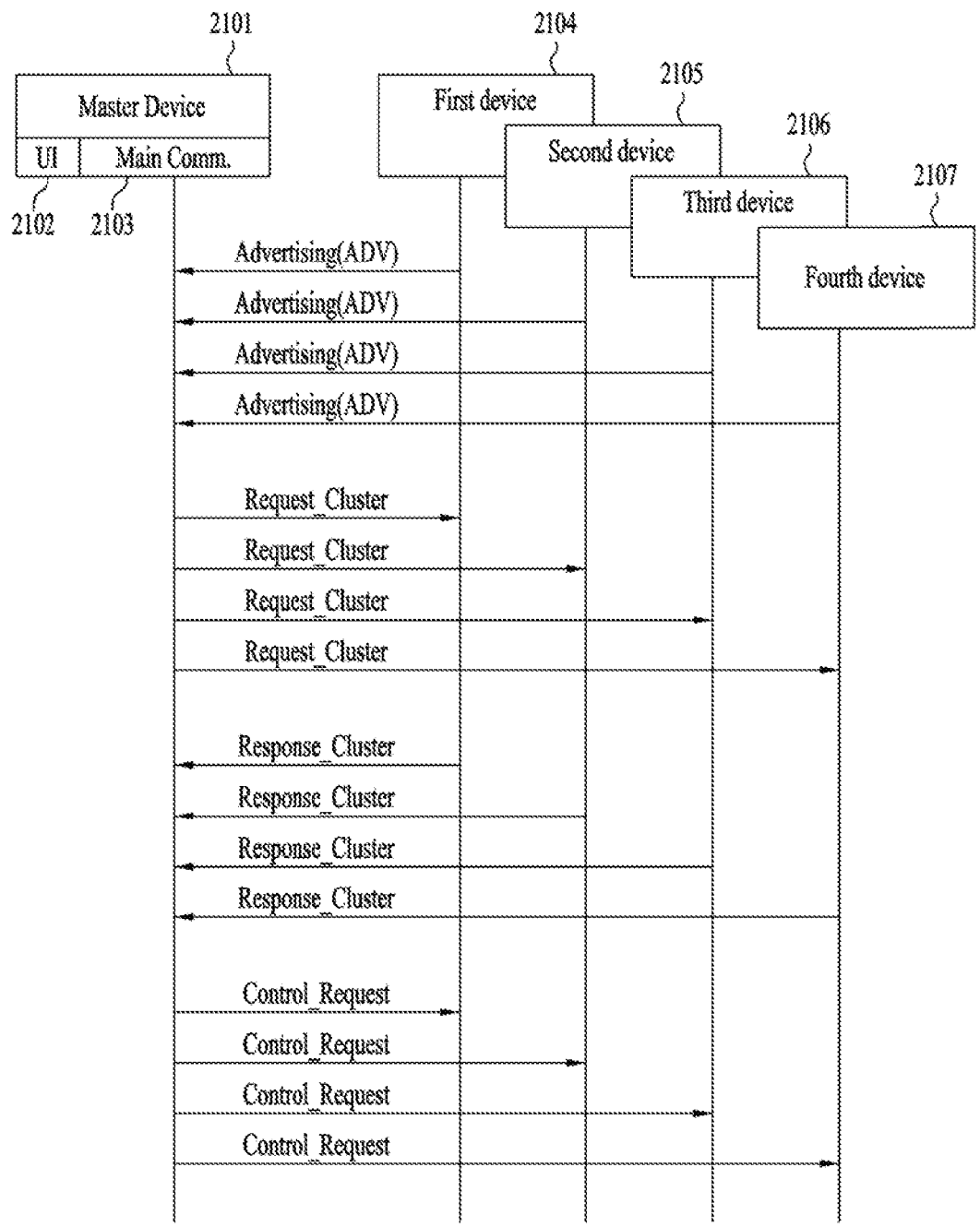

[FIG. 22]
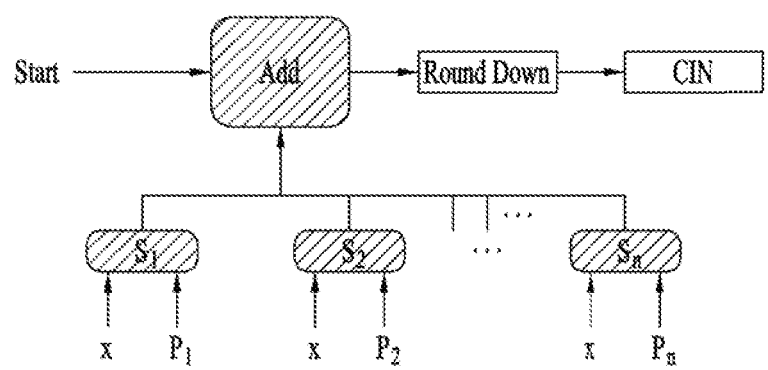

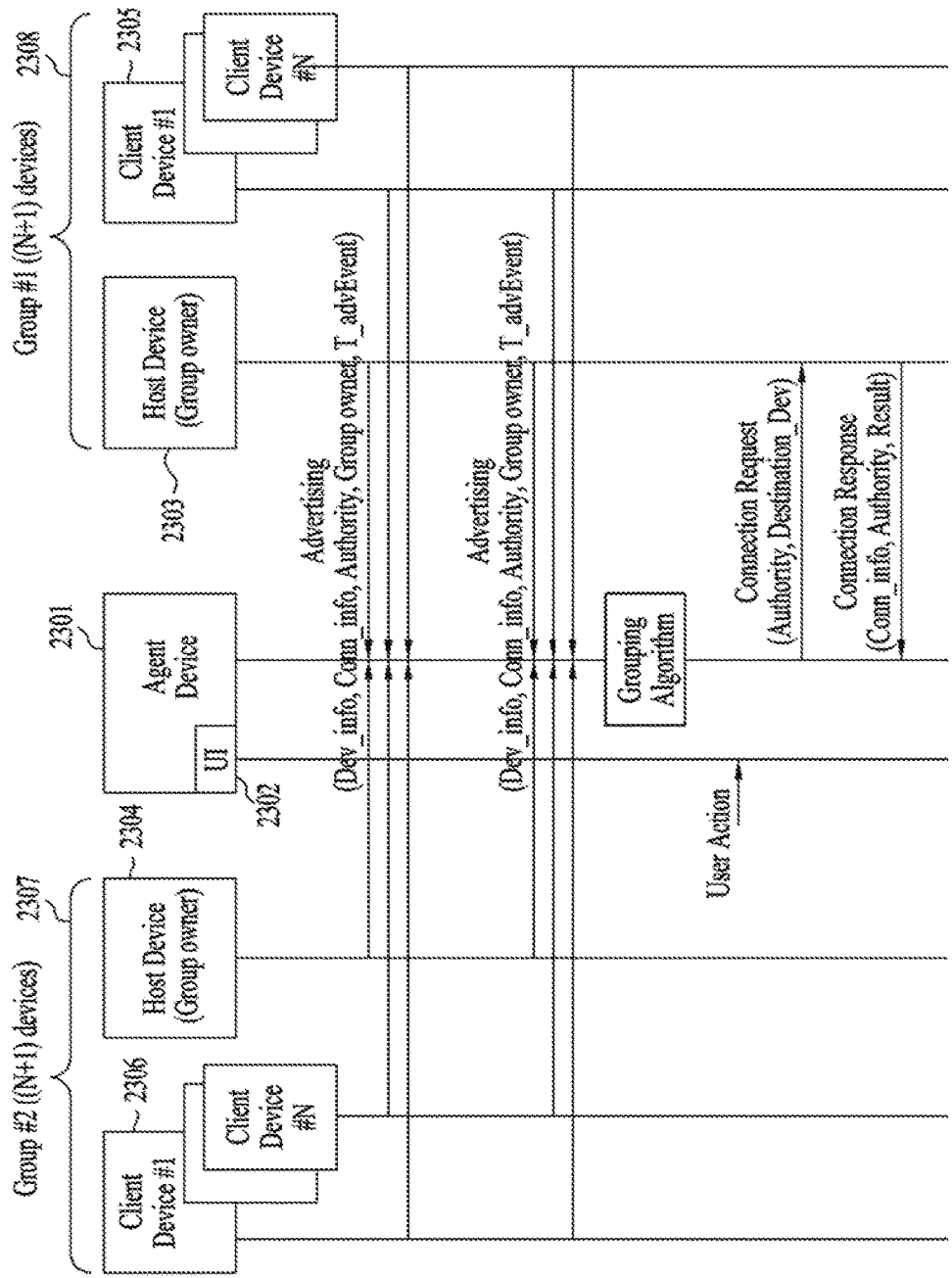

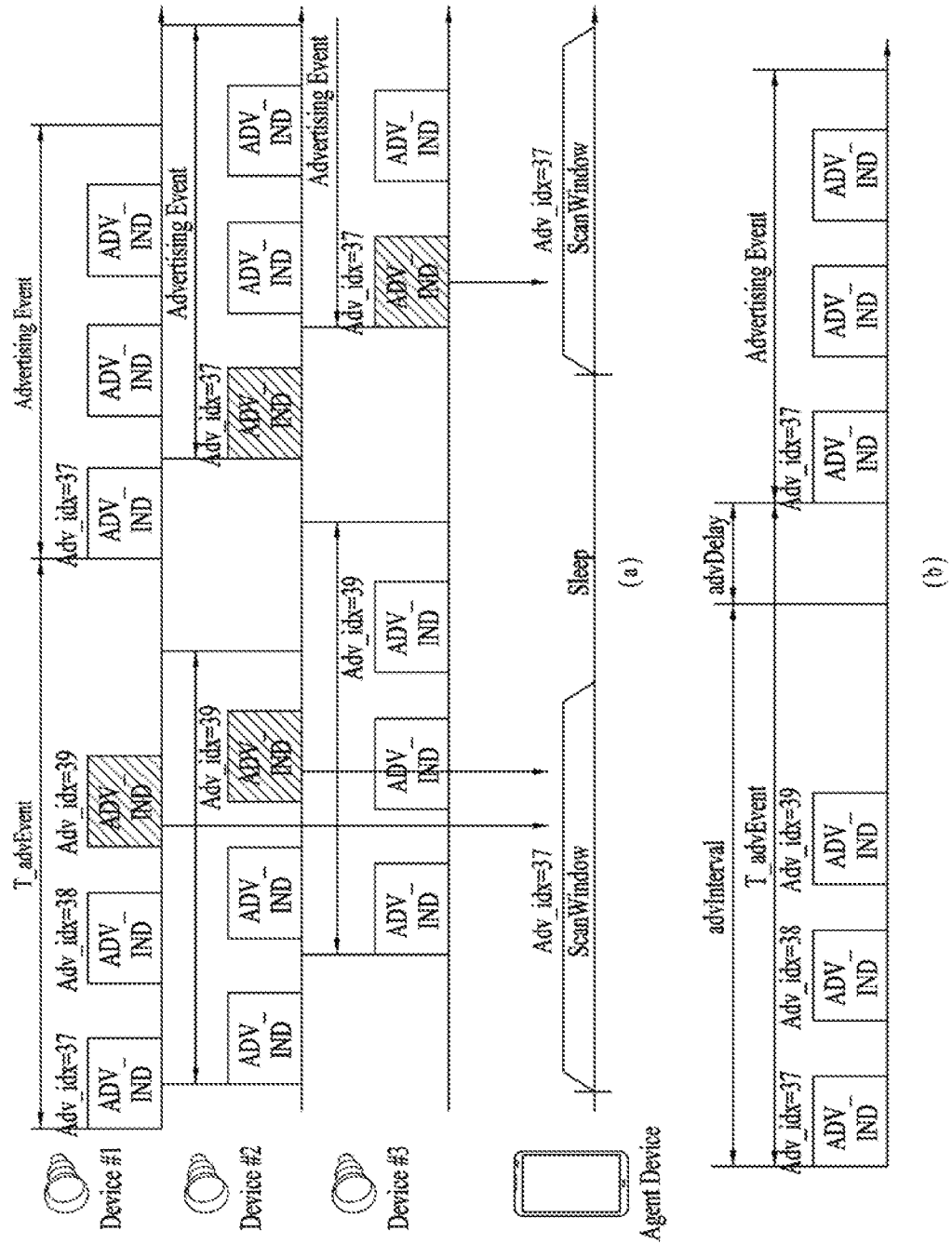

[FIG. 25]
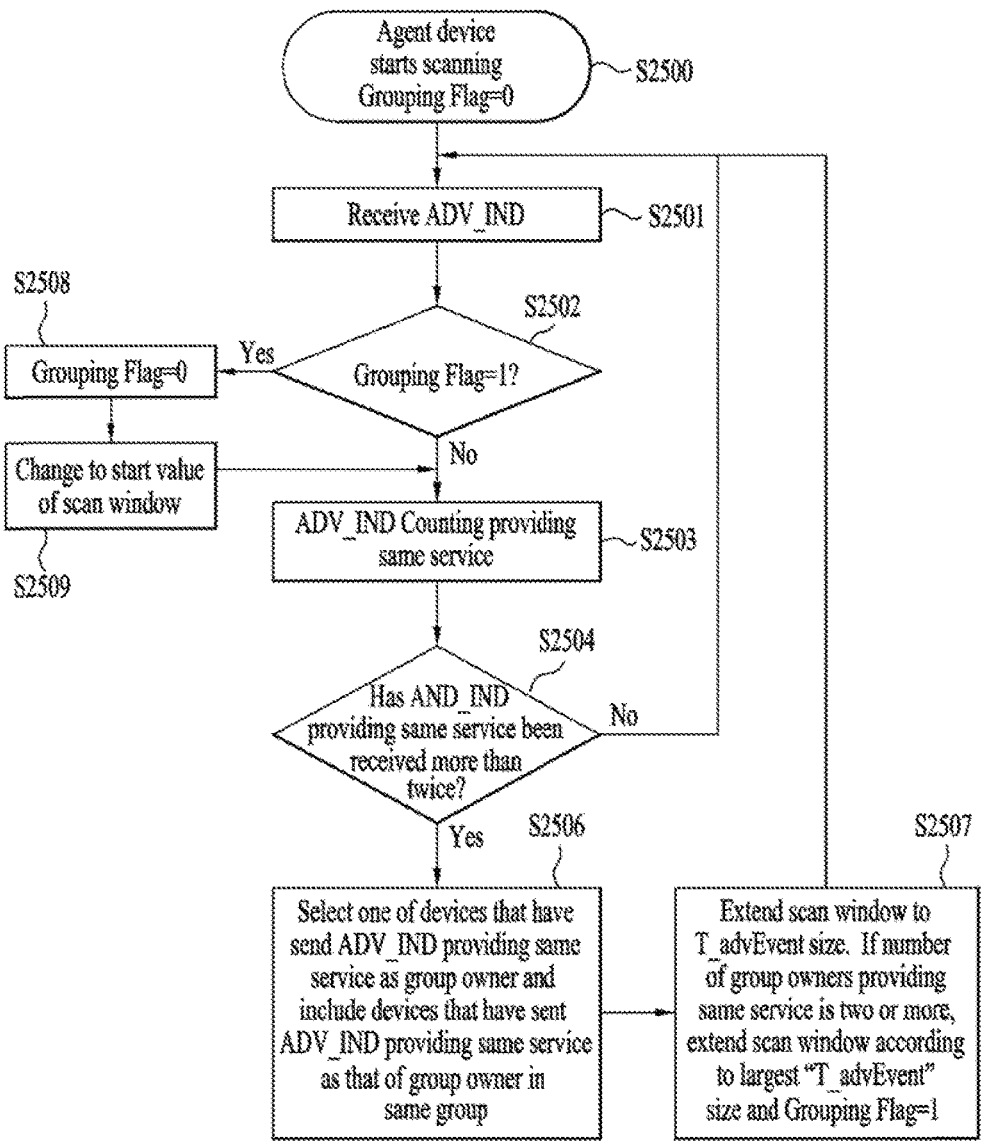

[FIG. 26]
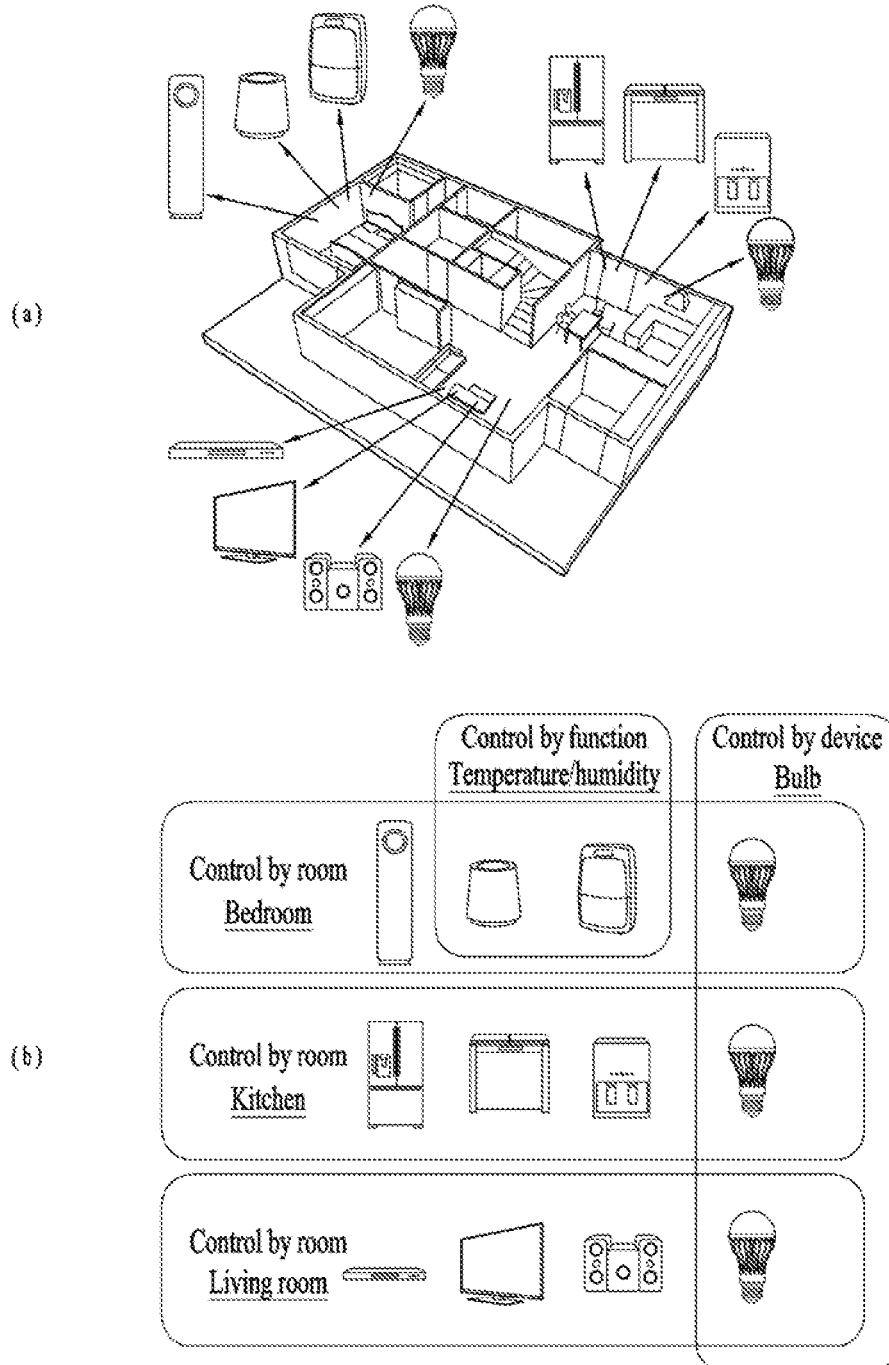

[FIG. 27]
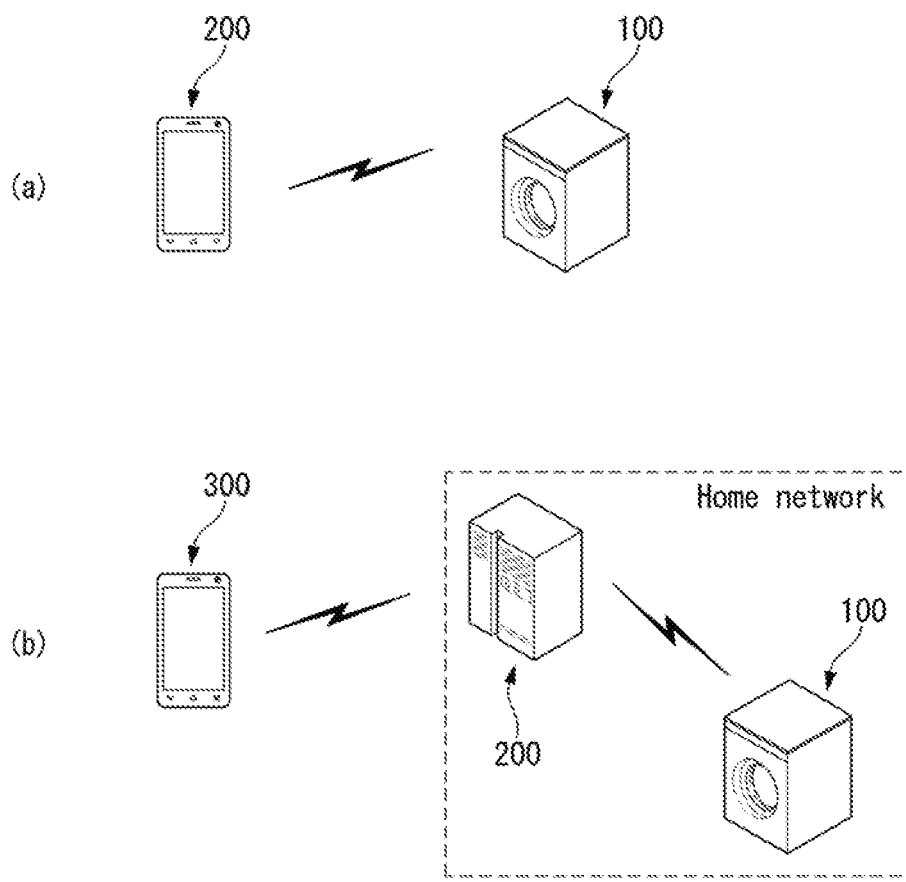

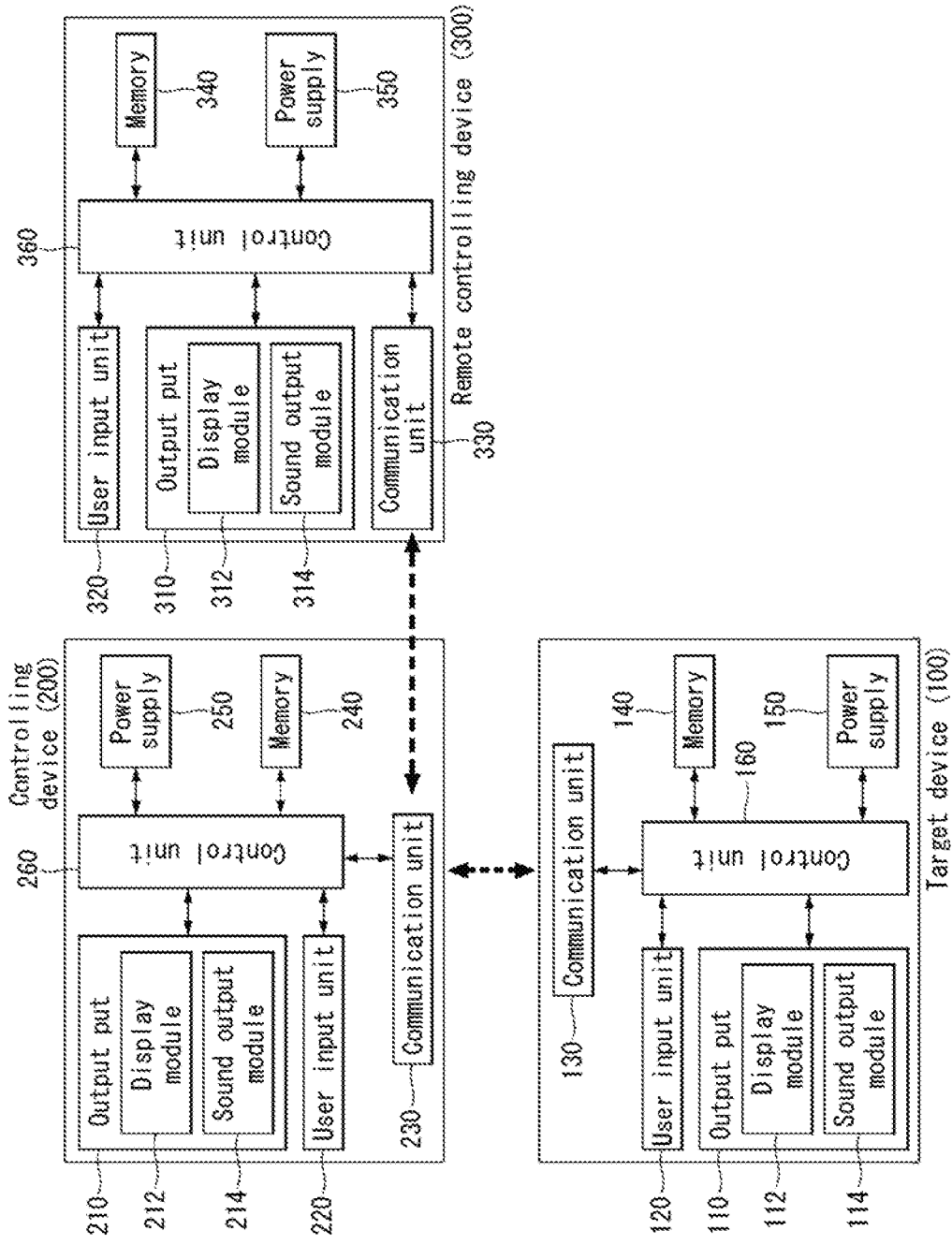

[FIG. 29]
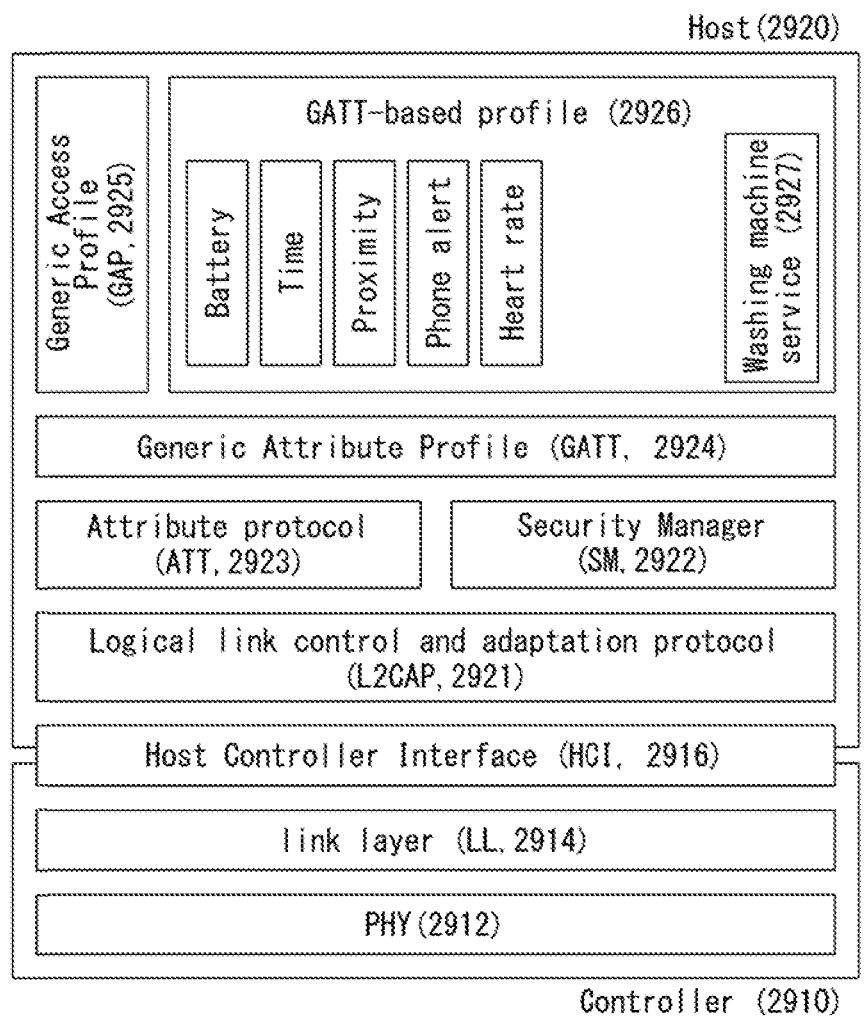

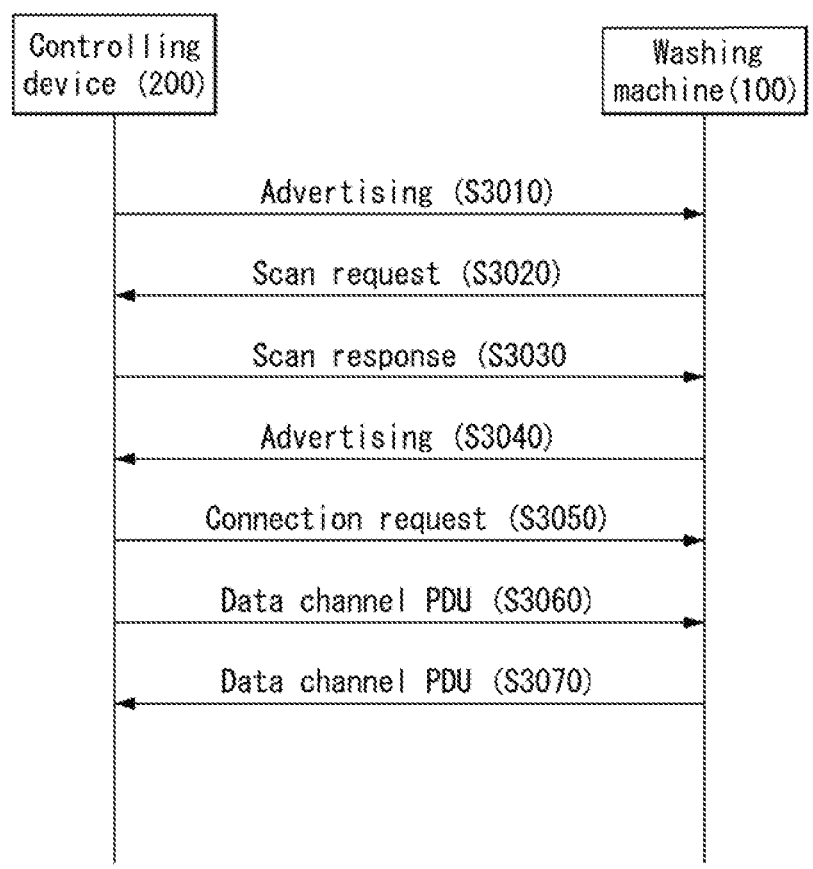
[FIG. 30]

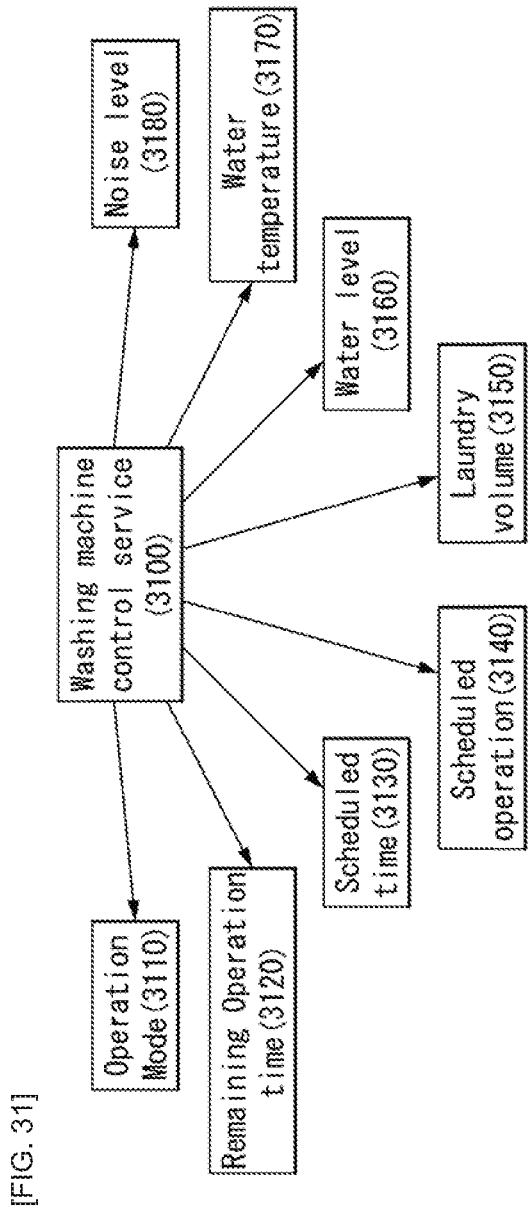
[FIG. 31]

[FIG. 32]
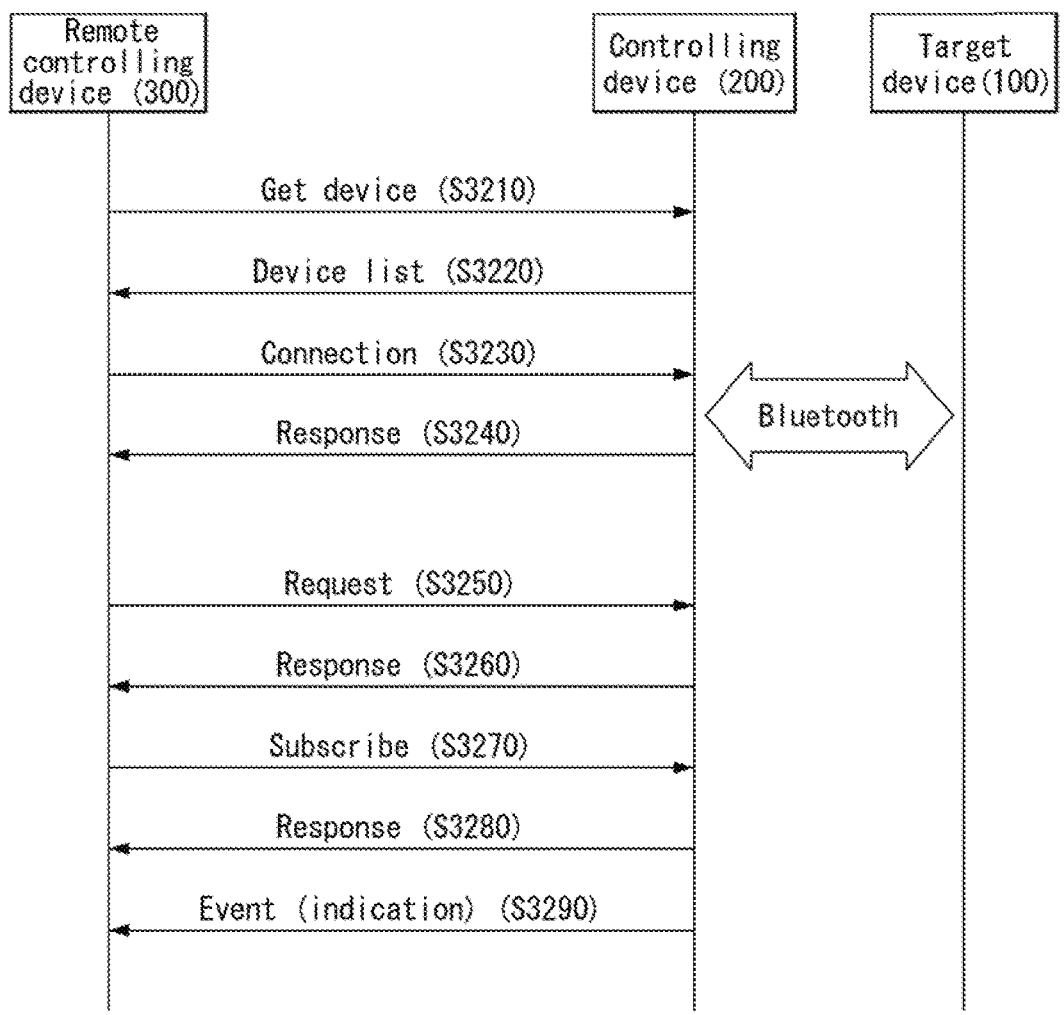

[FIG. 33]
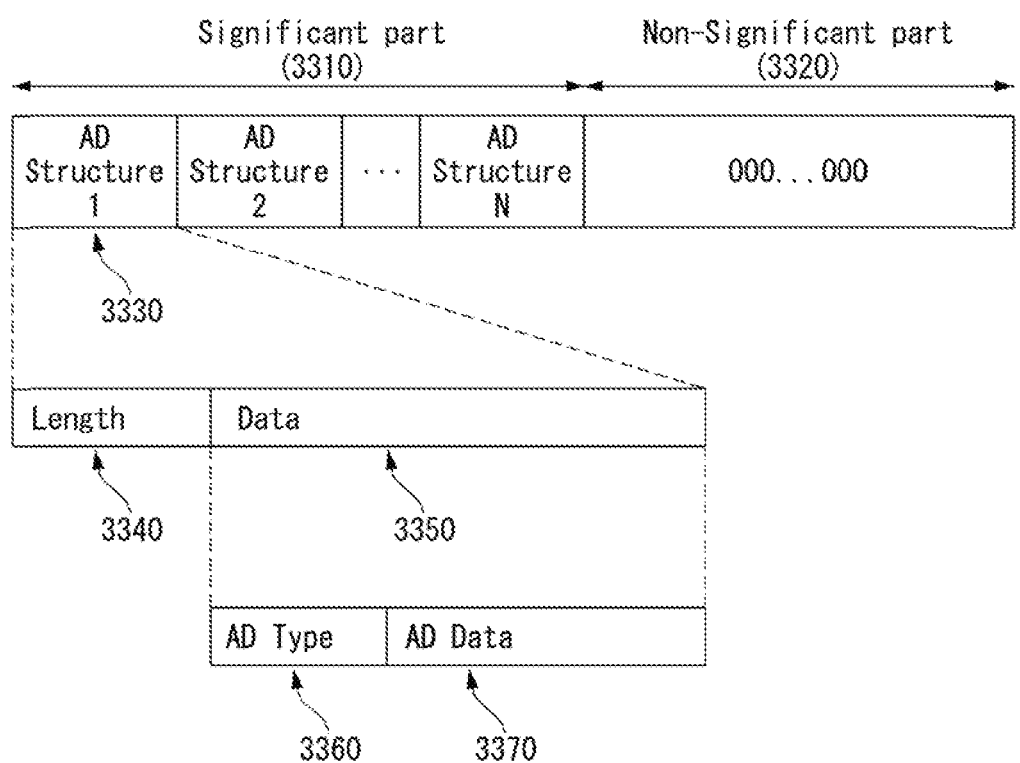

[FIG. 34]
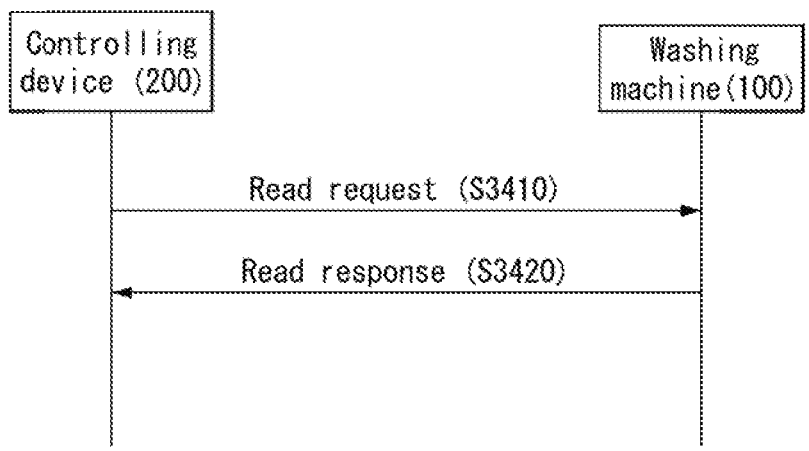

[FIG. 35]
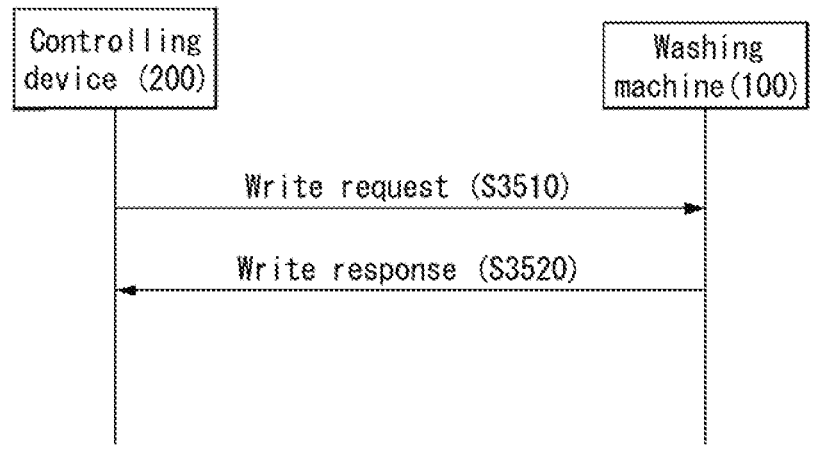

[FIG. 36]
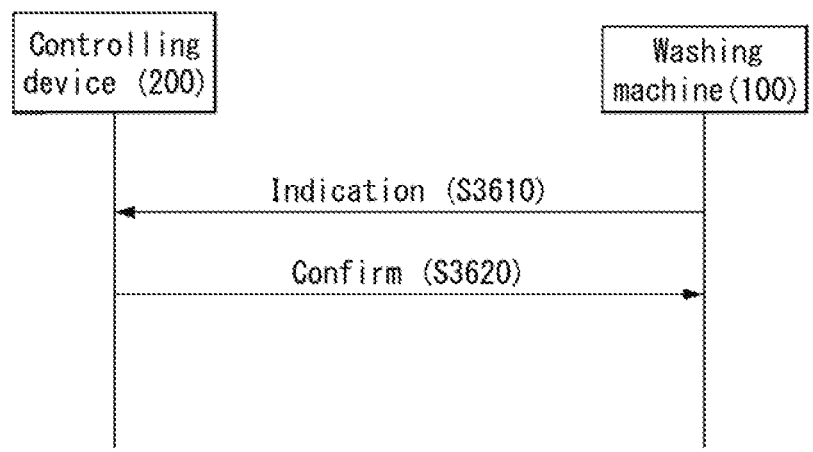

[FIG. 37]
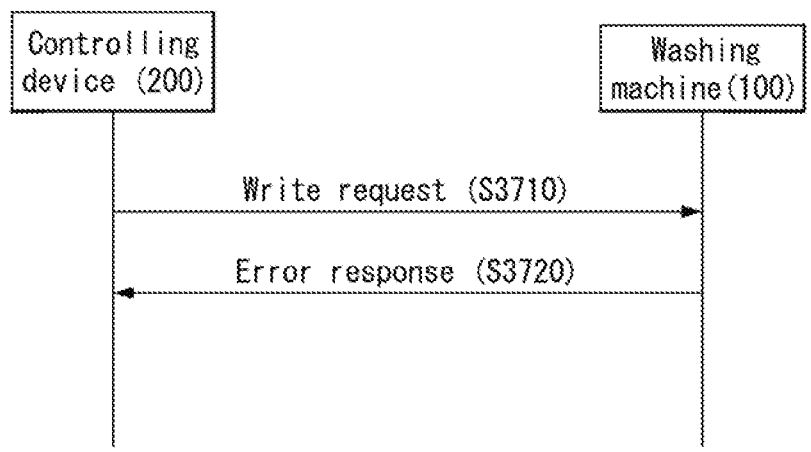

[FIG. 38]
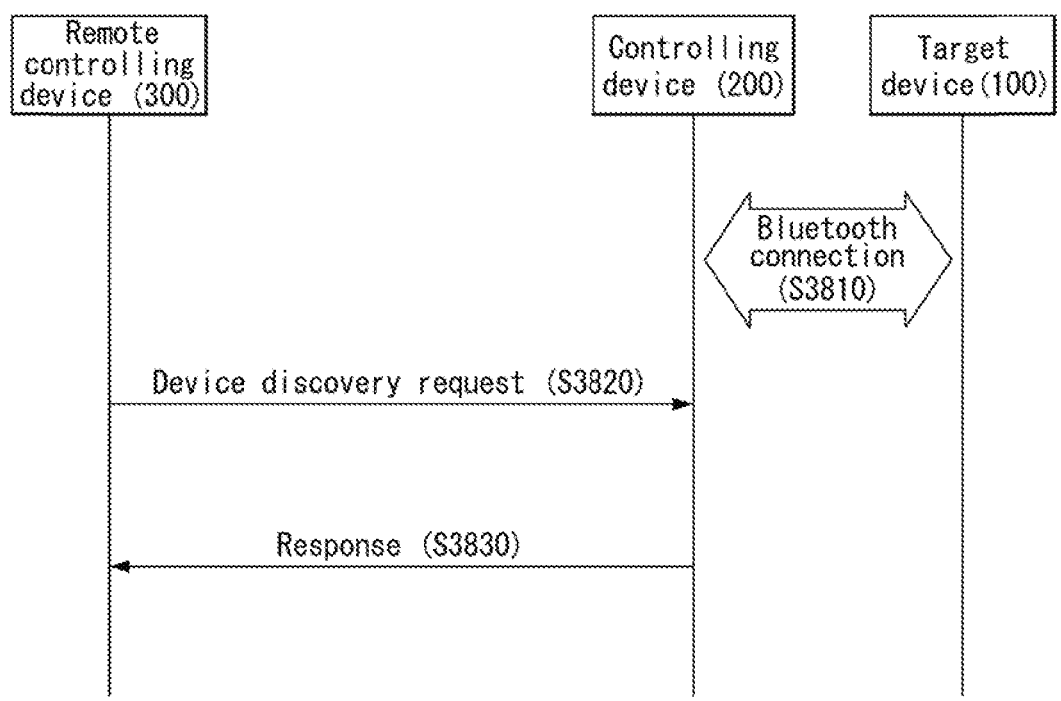

[FIG. 39]
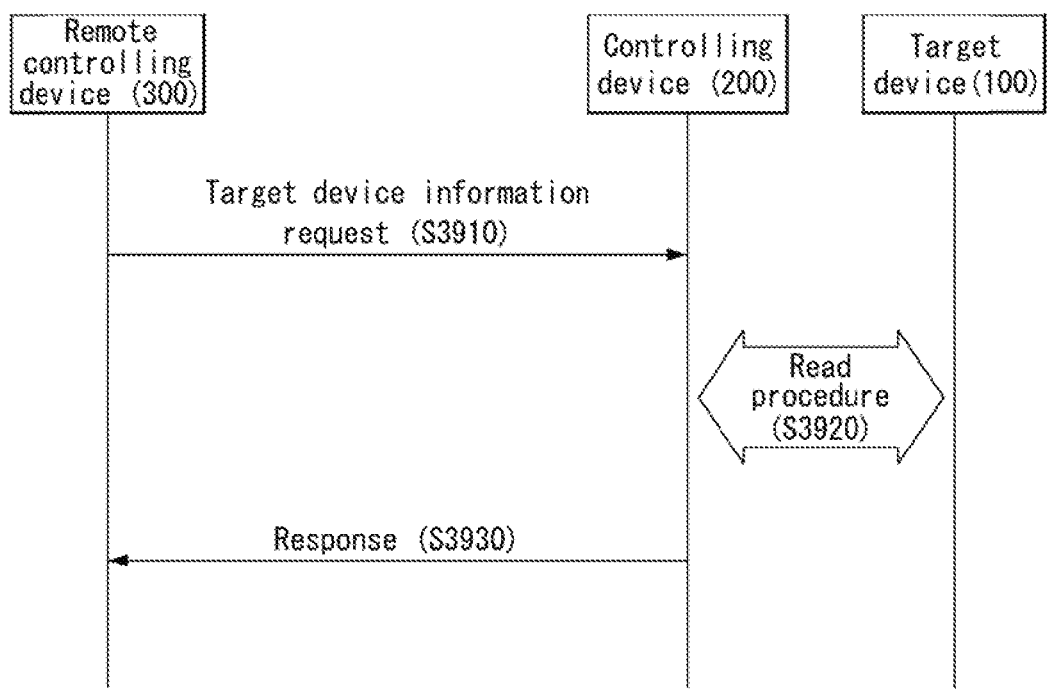

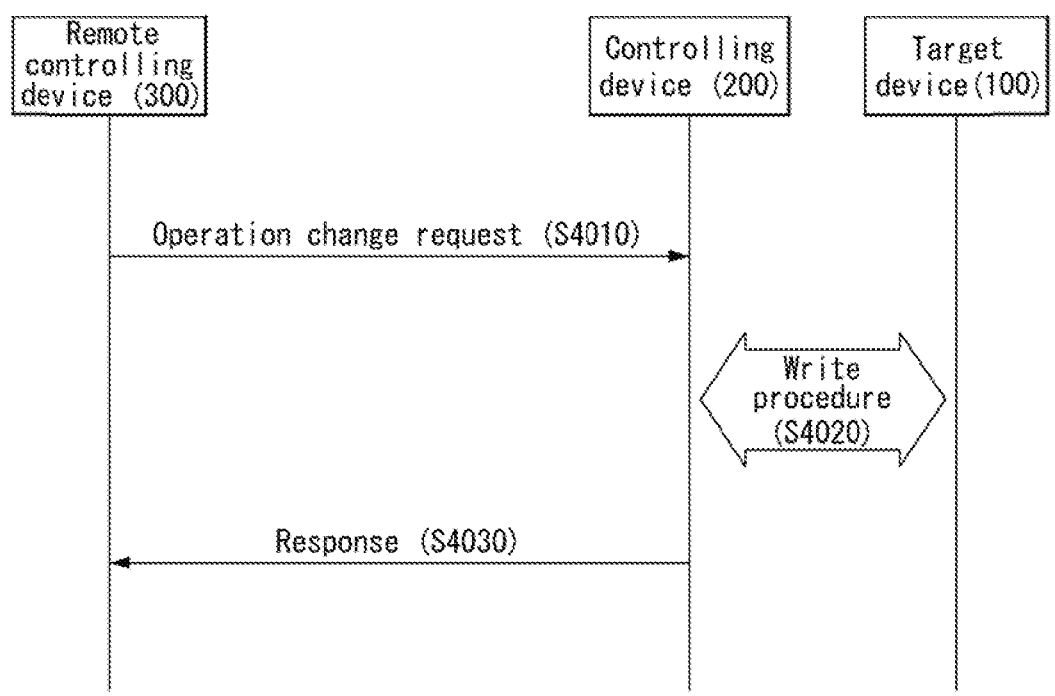
[FIG. 40]

[FIG. 41]
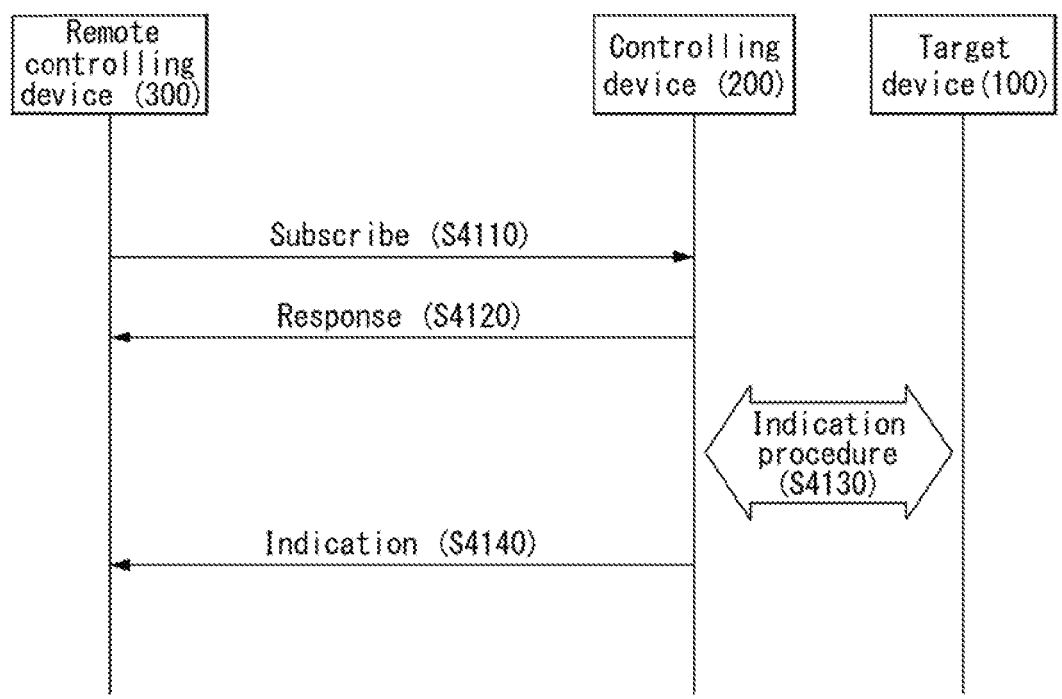

METHOD AND APPARATUS FOR BLUETOOTH CONNECTION

CROSS-REFERENCE TO RELATED APPLICATIONS

This application is the National Stage filing under 35 U.S.C. 371 of International Application No. PCT/KR2014/010603, filed on Nov. 6, 2014, which claims the benefit of earlier filing date and right of priority to Korean Application No. 10-2014-0069472, filed on Jun. 9, 2014, and also claims the benefit of U.S. Provisional Application No. 61/902,749, filed on Nov. 11, 2013 the contents of which are all hereby incorporated by reference herein in their entirety.

TECHNICAL FIELD

The present invention relates to a Bluetooth connection method and apparatus and, more particularly, to a Bluetooth connection method and apparatus for connecting Bluetooth devices using a low energy method.

BACKGROUND ART

Bluetooth is a short-distance radio technology standard in which a variety of types of devices are wirelessly connected at a short distance and data is exchanged. If wireless communication is to be performed between two devices using Bluetooth communication, a user performs a procedure for discovering Bluetooth devices to be communicated with each other and requesting connection between the Bluetooth devices. In embodiments of the present invention, a device may mean an apparatus or equipment.

In this case, a user may discover a Bluetooth device using a Bluetooth communication method to be used using a Bluetooth device and perform connection.

A Bluetooth communication method includes a Bluetooth Basic Rate/Enhanced Data Rate (BR/EDR) method and a Bluetooth Low Energy (LE) method, that is, a low power method. The Bluetooth BR/EDR method means a classic Bluetooth method. The classic Bluetooth method includes Bluetooth technologies from Bluetooth 1.0 to Bluetooth 2.1 using a basic rate and a Bluetooth technology which is supported from Bluetooth 2.0 and uses an enhanced data rate.

Bluetooth devices include products not having a display and/or a user interface. The complexity of connection/management/control/disconnection between a variety of types of Bluetooth devices and Bluetooth devices which belong to the variety of types of Bluetooth devices and to which similar technologies have been applied is increasing. The Bluetooth technology has a problem in that a plurality of devices needs to be paired individually in order to manage the plurality of devices because it is based on 1:1 connection between devices.

Pairing may be selectively performed for connection using Bluetooth. Bluetooth pairing is a term referring to a passive connection process performed for the purpose of security in the first connection between devices. Paired devices may be automatically connected depending on the power state or the distance between the devices or connection between the paired devices may be disconnected based on pairing information.

DISCLOSURE

Technical Problem

If data transmission between devices using a Bluetooth technology is performed, in connection between the devices, a user's device may perform a procedure for discovering a target device to which data will be transmitted and requesting connection with the target device. In this case, the user's device discovers the target device to which data will be transmitted using the Bluetooth BR/EDR method and performs connection with the target device using the Bluetooth BR/EDR method or discovers the target device with which communication will be performed using the Bluetooth LE method and performs connection with the target device using the Bluetooth LE method. The Bluetooth BR/EDR method may degrade user convenience because it requires relatively higher power than the Bluetooth LE method and thus has high consumption of a battery.

Accordingly, the discovery or connection of a target device may be performed using the Bluetooth LE method having low-power consumption and data transmission may be performed using the Bluetooth LE method depending on the properties of data, a user's selection and/or a communication environment or there is a need to provide a compatible method which may be performed as the Bluetooth BR/EDR method.

Furthermore, a user's inconvenience in learning each device manipulation method may be caused because a manipulation method (or scheme) for performing discovery and connection using a Bluetooth technology may be different for each device. Furthermore, there is inconvenience in the discovery or connection of a device to which an input unit for receiving manipulation contents from a user is difficult to be provided, such as a wearable device.

In addition, if there is a physical distance between a user and a device to be manipulated by the user, a method for manipulating, by the user, the device may cause user inconvenience.

Accordingly, there is a need to provide a method for manipulating, by a user, connection between devices using a device accustomed to the user.

Furthermore, if the type of devices connectable using a Bluetooth technology is various or the same type of devices is plural, in order to send or receive data and commands, one of two devices has to discover a target device with which communication will be performed and to perform connection with the target device. In this process, there is a need for a method for performing, by a user, the configuration of devices to be connected together in a bundle.

Furthermore, if a Bluetooth technology is used, low power can be consumed easily and household appliances can be controlled safely, but a technology for supporting Bluetooth is not present in household appliances.

Accordingly, there is a need for means for enabling a user to control household appliances using Bluetooth over a home network.

Technical Solution

In an embodiment of the present invention, there is provided a Bluetooth connection method and apparatus using a Bluetooth LE module and a Bluetooth BR/EDR module. More specifically, the Bluetooth connection method according to an embodiment of the present invention may include discovering, by a Bluetooth Low Energy (LE) module, one or more connectable Bluetooth LE modules, wherein the Bluetooth LE module transmits a packet to request information about at least one device including the one or more connectable Bluetooth LE modules in a standby state and receives a packet related to the information of the at least one device including the one or more connectable Bluetooth LE modules; connecting, by the Bluetooth LE module, the one or more connectable Bluetooth LE modules based on a result of the discovery, wherein the Bluetooth LE module transmits a packet to indicate connection with the discovered one or more connectable Bluetooth LE modules; and transmitting, by the Bluetooth LE module or a Bluetooth Basic Rate/Enhanced Data Rate (BR/ERD) module corresponding to the Bluetooth LE module, data to the discovered one or more connectable Bluetooth LE modules or one or more Bluetooth BR/EDR modules corresponding to the discovered one or more connectable Bluetooth LE modules.

Furthermore, in an embodiment of the present invention, there is provided a method, including receiving a packet including information related to the second device from the second device; transmitting a connection request message to request connection using a Bluetooth Low Energy (LE) method to the second device based on the received packet; and forming the connection with the second device using the Bluetooth LE method, wherein the packet includes information related to a washing machine service.

Advantageous Effects

In accordance with the Bluetooth connection method according to an embodiment of the present invention, Bluetooth devices which may be connected using the Bluetooth LE module can be discovered or connected together, and data can be transmitted using the Bluetooth BR/EDR module. Accordingly, there is an advantage in that power consumed by a Bluetooth device can be reduced.

In accordance with the Bluetooth connection method according to an embodiment of the present invention, a user can manipulate a Bluetooth device so that connection or data transmission between different Bluetooth devices is possible.

In accordance with the Bluetooth connection method according to an embodiment of the present invention, a user can control household appliances over a home network by manipulating a Bluetooth device.

In accordance with the Bluetooth connection method according to an embodiment of the present invention, a Bluetooth device can be controlled using the Bluetooth LE technology having low-power consumption and stable connectivity.

DESCRIPTION OF DRAWINGS

FIG. 1 is a diagram showing a 1:1 pairing method that is a Bluetooth communication method.

FIG. 2 is a diagram showing dual mode architecture for Bluetooth compatibility communication according to an embodiment of the present invention.

FIG. 3 is a diagram showing the state diagrams of a link controller and a link layer in a Bluetooth compatibility communication method.

FIG. 4 is a table showing parameters when connection is performed using a Bluetooth LE method in a Bluetooth compatibility communication method according to an embodiment of the present invention.

FIG. 5 is a diagram showing the operation of a device using a Bluetooth compatibility communication method according to an embodiment of the present invention.

FIG. 6 is a sequence diagram of a Bluetooth compatibility communication method according to an embodiment of the present invention.

FIG. 7 is a sequence diagram showing a Bluetooth compatibility communication method according to an embodiment of the present invention.

FIG. 8 is a sequence diagram of a Bluetooth compatibility communication method and tables control PDU names according to Opcode in accordance with an embodiment of the present invention.

FIG. 9 is a table showing power levels of Bluetooth dual mode, which are provided according to an embodiment of the present invention.

FIG. 10 is a flowchart illustrating a power level change process of a host device, which is provided for a Bluetooth compatibility connection method according to an embodiment of the present invention.

FIG. 11 is a flowchart illustrating a power level change process of a client device, which is provided for a Bluetooth compatibility connection method according to an embodiment of the present invention.

FIG. 12 is a diagram showing devices in which connection between a host device and a client device may be performed in response to a connection request from an agent device in an apparatus providing Bluetooth compatibility communication according to another embodiment of the present invention.

FIG. 13 is a sequence diagram showing a Bluetooth compatibility communication method according to another embodiment of the present invention.

FIG. 14 is a sequence diagram showing a Bluetooth compatibility communication method according to another embodiment of the present invention.

FIG. 15 is a sequence diagram showing a method for changing authority, which is provided for a Bluetooth communication connection method according to another embodiment of the present invention.

FIG. 16 is a diagram showing authority information provided for a Bluetooth communication connection method according to another embodiment of the present invention.

FIG. 17 is a diagram showing an example in which a Bluetooth communication connection method according to another embodiment of the present invention is used.

FIG. 18 is a diagram showing devices which are used to provide a Bluetooth communication connection method according to yet another embodiment of the present invention.

FIG. 19 is a diagram showing a profile stack including a cluster profile diagram provided for a Bluetooth communication connection method according to yet another embodiment of the present invention.

FIG. 20 is a table showing control PDUs and parameters included in the respective control PDUs, which may be provided for yet another embodiment of the present invention.

FIG. 21 is a sequence diagram showing a Bluetooth communication connection method according to yet another embodiment of the present invention.

FIG. 22 is a block diagram showing a process for generating a CIN for Bluetooth clustering according to yet another embodiment of the present invention.

FIG. 23 is a sequence diagram showing a Bluetooth clustering process according to yet another embodiment of the present invention.

FIG. 24 is a diagram illustrating a method for discovering devices in a Bluetooth clustering process according to yet another embodiment of the present invention.

FIG. 25 is a flowchart illustrating a grouping algorithm for discovering devices and grouping the devices in a Bluetooth clustering process according to yet another embodiment of the present invention.

FIG. 26 is a diagram showing fields to which a Bluetooth clustering method according to yet another embodiment of the present invention may be applied.

FIG. 27 is a diagram showing an example in which a Bluetooth communication connection method according to yet another embodiment of the present invention is used.

FIG. 28 is a diagram showing a device which is used to provide a Bluetooth communication connection method according to yet another embodiment of the present invention.

FIG. 29 is a diagram showing a profile stack provided for a Bluetooth communication connection method according to yet another embodiment of the present invention.

FIG. 30 is a flowchart illustrating a Bluetooth connection method according to yet another embodiment of the present invention.

FIG. 31 is a diagram showing the structure of a service according to yet another embodiment of the present invention.

FIG. 32 is a flowchart illustrating a method for controlling a Bluetooth device using a device other than Bluetooth in accordance with other embodiments of the present invention.

FIG. 33 is a diagram showing a data structure to which a service has been applied in accordance with yet another embodiment of the present invention.

FIGS. 34 to 37 are flowcharts illustrating operations between a Bluetooth controlling device and a target device according to yet another embodiment of the present invention.

FIGS. 38 to 41 are flowcharts illustrating communication with a Bluetooth device using a function other than Bluetooth in accordance with other embodiments of the present invention.

MODE FOR INVENTION

The above objects, characteristics, and merits of the present invention will become more apparent from the following detailed description taken in conjunction with the accompanying drawings. The present invention may be modified in various ways and may have some embodiments. Hereinafter, some exemplary embodiments of the present invention will be illustrated in the accompanying drawings and described in detail. The same reference numerals basically designate the same elements throughout the drawings. In describing the present invention, a detailed description of known functions or elements related to the present invention will be omitted if it is deemed to make the gist of the present invention unnecessarily vague.

Hereinafter, methods and devices related to the present invention are described in more detail with reference to the accompanying drawings. It is to be noted that the suffixes of the elements used in the following description, such as "module" and "unit", are assigned or interchangeable with each other by taking only the ease of writing this specification into consideration, but in themselves are not particularly given importance and roles.

An electronic device described in this specification may include a mobile phone, a smart phone, a notebook, a terminal for digital broadcast, a Personal Digital Assistant (PDA), a Portable Multimedia Player (PMP), a navigator, to a name few. However, those skilled in the art to which the present invention pertains may easily understand that the construction according to an embodiment described in this specification may also be applied to fixed terminals, such as digital TV and desktop computers, other than the case where the construction can be applied to only a mobile terminal.

A signal described in this specification may be transmitted in a frame form in addition to a message form.

FIG. 1 is a diagram showing a 1:1 pairing method that is a Bluetooth communication method.

In the Bluetooth communication method, a Bluetooth device manipulated by a user 1000 discovers Bluetooth devices (e.g., a first Bluetooth device 1001, a second Bluetooth device 1002 . . . , an N-th Bluetooth device 1003) connectable to the Bluetooth device manipulated by the user 1000, performs 1:1 pairing with each of the Bluetooth devices to be connected with the Bluetooth device manipulated by the user 1000, and performs data communication.

FIG. 2 is a diagram showing dual mode architecture for Bluetooth compatibility communication according to an embodiment of the present invention.

The dual mode architecture according to an embodiment of the present invention has a structure providing Bluetooth compatibility communication selectively using the Bluetooth BR/EDR method and the Bluetooth LE method.

In FIG. 2, (a) is a diagram showing architecture for a BR/EDR protocol stack according to the Bluetooth BR/EDR method, (b) is a diagram showing architecture for an LE protocol stack according to the Bluetooth LE method, and (c) is a diagram showing the dual mode architecture in which both the stacks (a) and (b) are used in accordance with an embodiment of the present invention.

The Bluetooth protocol stack includes an upper host protocol and a lower host controller protocol on the basis of a Host Controller Interface (HCI). The host controller corresponds to a Bluetooth module. A host is connected to the Bluetooth module, that is, the host controller, and it controls the Bluetooth module and performs operations. The host may be a PC, PDA, or smart phone, for example, and may be a processor included in a system according to circumstances.

In an embodiment of the present invention, the Bluetooth module may include a Bluetooth LE module and a Bluetooth BR/EDR module.

The BR/EDR protocol stack includes a BR/EDR profile, a Generic Access Profile (GAP), BR/EDR protocols, a Logical Link Control and Adaptation Protocol (L2CAP), and a link manager, a link controller, and a BR/EDR radio included in a Host Controller Interface (HCI).

The LE protocol stack includes an LE profile, a Generic Access Profile (GAP), a Generic Attribute Profile (GATT), an attribute protocol (ATT), a Security Manager (SM), a Logical Link Control and Adaptation protocol (L2CAP), and a link layer and an LE radio included in a Host Controller Interface (HCI). The LE protocol stack is different from the aforementioned BR/EDR protocol stack.

The dual mode architecture according to an embodiment of the present invention includes both of the BR/EDR protocol stack architecture and the LE protocol stack architecture.

In the dual mode architecture according to an embodiment of the present invention, Protocol Data Units (PDUs) and parameters are added to the link controller of the BR/EDR protocol stack and the link layer of the LE protocol stack, enabling compatible communication between Bluetooth BR/EDR and Bluetooth LE. The link controller and the link layer are described in detail below.

FIG. 3 is a diagram showing the state diagrams of the link controller and the link layer in a Bluetooth compatibility communication method.

In an embodiment of the present invention, the link controller state means the state of the Bluetooth BR/EDR module, and the link layer state means the state of the Bluetooth LE module.

In FIG. 3, (a) is a state diagram showing the operation of the link controller of the BR/EDR protocol stack, and (b) is a state diagram showing the operation of the link layer of the LE protocol stack.

As shown in FIG. 3, the link controller and the link layer are the same in that they become a standby state depending on a BR/EDR on/off state 3001 or an LE on/off state 3017 or perform a basic operation for connecting a corresponding Bluetooth device, but are different in detailed operations.

As shown in FIG. 3(a), the link controller state is divided into 3 major states and 7 substates. The 3 major states include Standby 3002, Connection 3012, and Park 3016. The 7 substates include Page 3008, Page scan 3009, Inquiry 3005, Inquiry scan 3006, Inquiry response 3007, Master response 3010, and Slave response 3011. Connection 3012 includes Sniff mode 3013, Active mode 3014, and Hold mode 3015.

The substate means a middle state which is used to set up connection (3004) and to discover devices (3003).

As shown in FIG. 3(b), the link layer state is divided into Standby 3018, Advertising 3021, Scanning 3020, Initiating 3019, and Connection 3022.

The terms describing the state diagrams of FIG. 3 may be interpreted as terms commonly used in common Bluetooth technologies.

FIG. 4 is a table showing parameters when connection is performed using the Bluetooth LE method in a Bluetooth compatibility communication method according to an embodiment of the present invention.

A control PDU means a Protocol Data Unit (PDU) for controlling the discovery and connection of a device in Bluetooth compatibility communication. The control PDU may include an Advertising channel PDU, a Handover Request PDU, and a Handover Response PDU. The Advertising channel PDU may include an Advertising PDU, a scanning PDU, and an initiating PDU.

The Advertising channel PDU may include an ADV_IND PDU, a SCAN_REQ PDU, and a SCAN_RSP PDU.

An agent device may send a connection request to a host device or a client device so that connection is performed between the host device and the client device. The agent device may include an input unit for receiving a connection command from a user and an output unit for outputting a result of the execution of connection.

The host device may include a Bluetooth module for sending a handover request to the client device. The host device may receive a connection request from the agent device and perform Bluetooth connection with the client device.

The client device may receive a handover request from the host device and perform connection with the host device. When receiving a connection request from the agent device, the client device may perform connection with the host device.

The advertising PDUs are control PDUs exchanged between the Bluetooth module within the host device and the Bluetooth module within the client device while the Bluetooth modules perform a discovery process. The advertising PDU may include ADV_IND and ADV_DIRECT_IND.

ADV_IND may be generated in the case of a connectable undirected advertising event.

ADV_DIRECT_IND may be generated in the case of a connectable directed advertising event.

The scanning PDU has SCAN_REQ or SCAN_RSP as a packet name. SCAN_REQ is a control PDU which requests information about client devices from a host device.

SCAN_RSP is a control PDU through which client devices that have received SCAN_REQ send SCAN_RSP to a host device.

The advertising PDU may include parameters "Dev_info", "Conn_info", and "Authority."

The parameter "Dev_info" may include information indicative of the characteristics and attributes of a device.

The information indicative of the characteristics and attributes of a device may be represented as device information or information of a device. The characteristics and attributes of a device may include the name of the device (e.g., a model name or the name of the device designated by a user), the type of device (e.g., TV, a headset, or a notebook), a Universal Unique Identifier (UUID), and a MAC address.

The UUID is a general-purpose unique identifier and is the number of 16 octets included in a device so that each device is identified on a network.

Conn_info includes Dev_info information about another device if there is another device already connected to a device.

Authority is a parameter that delivers device setting information providing information about whether devices can be connected together. The parameter "Authority" includes information about whether a device is a device capable of receiving a Bluetooth BR/EDR connection command using the Bluetooth LE method and performing Bluetooth BR/EDR connection and whether the device has authority to instruct such connection.

If Authority information is set as a specific value, a corresponding device may be discovered by another device and may not perform a handover request command. Furthermore, Authority information may be used to determine whether a handover request command can be transmitted to another device.

When pieces of Authority information of discovered client devices are transmitted to a Bluetooth LE module within a host device in a discovery process, the host device may determine whether the Bluetooth LE module of the host device and a Bluetooth LE module within a client device can be connected together. The Bluetooth LE module of the host device may configure network topology for the discovered devices based on information indicating whether the Bluetooth LE module of the host device and the Bluetooth LE module of the client device can be connected together.

The Handover Request PDU includes information by which a host device instructs connection between two devices. A host device or agent device may send a Handover Request PDU to a client device.

The Handover Response PDU includes a response message for a Handover Request PDU and a response message for a result of the execution of connection. Accordingly, a handover response is a control PDU transmitted from a device that has received a handover request to a device that has sent the handover request. The handover response PDU may include parameters "Conn_info", "Authority", and "Result."

The parameter "Result" includes information about the results of connection. The information about the results of connection may include a connection success or a connection failure.

The contents or names of the aforementioned parameters may be changed by a designer's intention.

FIG. 5 is a diagram showing the operation of a device using a Bluetooth compatibility communication method according to an embodiment of the present invention.

More specifically, FIG. 4 shows an operation for performing Bluetooth compatibility communication between a first device 5001 and a second device 5002 using the parameters described above with reference to FIG. 3.

The first device 5001 includes an input unit 5003, an output unit 5004, a control unit 5005, a multimedia playback unit 5006, a first storage unit 5007, a second storage unit 5008, and a network interface 5009. The network interface 5009 includes a Bluetooth LE module 5010 and a Bluetooth BR/EDR module 5011. Although not shown, each of the first and the second devices may further include a power supply. Some modules or units of the first device 5001 may be referred to as different names or omitted depending on an implementation method of a person who implements the present invention. The second device 5002 may be the same as the first device 5001. Some modules or units of the first device 5001 may be omitted depending on an implementation method of a person who implements the present invention.

The role of each device and the modules and units included in each device are described in detail below.

In some embodiment, each device may be any one of an agent device, a host device, and a client device.

The host device 5001 may instruct the client device 5002 to perform connection between the host device 5001 and the client device 5002 by sending a connection request to the client device 5002. The host device 5001 may include the input unit 5003 for receiving a connection command from a user and the output unit 5004 for outputting a result of the execution of connection.

The connection request is a control PDU through which the Bluetooth module 5009 of the host device 5001 sends information indicative of connection between the Bluetooth module 5009 of the host device 5001 and the Bluetooth module 5018 of the client device 5002 to the Bluetooth module 5018 of the client device 5002.

The connection request may include parameters "Destination_Dev" and "Authority." Contents for the parameter "Authority" are the same as the aforementioned contents. The parameter "Destination_Dev" is information about a connection target device. In this case, the information about the connection target device means information about the client device to which the host device will be connected and may include Dev_info, Conn_info and so on.

The host device 5001 may instructs the client device 5002 to perform connection between network interfaces by sending a handover request to the client device 5002. When the client device 5002 receives the handover request from the host device 5001, it may perform connection with the host device 5001.

The input unit 5003 is an element for receiving a command, such as discovery and connection, from a user and outputting the received command to the control unit 5005.

The output unit 5004 is an element for outputting data received through the network interface 5009 or data stored in the first storage unit 5007 or the second storage unit 5008 under the control of the control unit 5005.

The control unit 5005 may control the operation of each of the input unit 5003, the output unit 5004, the multimedia playback unit 5006, the first storage unit 5007, the second storage unit 5008, and the network interface 5009 using data received from each of the units and modules of the host device 5001. Furthermore, the control unit 5005 may control the operation of each of the input unit 5003, the output unit 5004, the multimedia playback unit 5006, the first storage unit 5007, the second storage unit 5008, and the network interface 5009 by sending data to each of the units and modules of the host device 5001.

The multimedia playback unit 5006 is an element for playing back a variety of types of multimedia. The multimedia playback unit 5006 may be placed and implemented within the control unit 5005. As shown in FIG. 5, the multimedia playback unit 5006 may be placed and implemented at a location different from the location of the control unit 5005.

The first storage unit 5007 is a physical element of a non-volatile property capable of storing a variety of types of data. For example, the first storage unit 5007 may be an SD card.

The second storage unit 5008 is an optional element implemented in a variety of types of devices and is a physical element of a volatile property in which a variety of types of data is temporarily stored.

The network interface unit 5009 is an element that enables Bluetooth communication, and it includes the Bluetooth BR/EDR module 5011 and the Bluetooth LE module 5010.

The Bluetooth BR/EDR module 5011 is an element for wireless communication and discovering another device to be connected or sending data.

The Bluetooth LE module 5010 has a function similar to that of the Bluetooth BR/EDR module 5011, but is different from the Bluetooth BR/EDR module 5011 in that it is capable of low-power wireless communication.

As shown in FIG. 5, in a Bluetooth compatibility communication method according to an embodiment of the present invention, when the Bluetooth LE module 5010 of the first device 5001 sends a Handover Request PDU to the Bluetooth LE module 5020 of the second device 5002, the Bluetooth LE module 5020 of the second device 5002 may send a Handover Response PDU to the Bluetooth LE module 5010 of the first device 5001 based on the value of the received Handover Request PDU.

A connection request PDU and a connection response PDU may be successfully transmitted and received between the first device 5001 and the second device 5002 in response to the Handover Response PDU received by the first device 5001, so the first device 5001 and the second device 5002 can be connected together.

When the first device 5001 and the second device 5002 are connected together, data transmission may be performed between the Bluetooth BR/EDR modules 5011 and 5019, as shown in FIG. 5. Although not directly shown in FIG. 5, the aforementioned data transmission may be performed between the Bluetooth LE modules 5010 and 5020.

FIG. 6 is a sequence diagram of a Bluetooth compatibility communication method according to an embodiment of the present invention. A process for discovering devices to be connected together is performed between the BR/EDR modules of devices, and the transmission of a handover request and a handover response is performed between the Bluetooth LE modules of the devices. When a command for discovery is received by the input unit (User Interface (UI)) 6002 of a host device 6000, the Bluetooth BR/EDR module 6003 of the host device 6000 may send a discovery request PDU to a client device 6001. In response to the discovery request PDU from the host device 6000, the client device 6001 may send a discovery response to the host device 6000.

The discovery request PDU and the discovery response PDU are control PDUs for discovering devices to be connected together.

The discovery request PDU is a control PDU transmitted by the host device 6000 in order to obtain information about the client device 6001. The discovery response PDU is a control PDU transmitted by the client device 6001 as a response to the discovery request PDU received from the host device 6000.

The discovery response PDU may include parameters "Dev_info", "Conn_info", and "Authority."

After a discovery process is performed between the Bluetooth BR/EDR modules 6003 and 6005 of the devices, a process for transmitting and receiving Handover Request and Handover Response PDUs may be performed between the Bluetooth LE modules 6002 and 6006. As shown and described above, the handover request may include the parameter "Authority", and the handover response may include the parameters "Conn_info", "Authority", and "Result."

FIG. 7 is a sequence diagram showing a Bluetooth compatibility communication method according to an embodiment of the present invention.

FIG. 7(a) is a diagram showing a method for sending wake-up data using wake-up PDU information if BR/EDR modules are in sleep mode. When a user inputs a discovery or connection command to the input unit (UI) 7002 of a host device 7000, a process for sending an advertising PDU for searching for (or discovering) devices to be connected together is performed between the LE modules 7004 and 7006 of the host device 7000 and a client device 7001. The transmission of a handover request and a handover response is also performed between the Bluetooth LE modules of the host device 7000 and the client device 7001.

In the present embodiment, since a discovery process and a handover process, that is, a process for request, setup, and response for connection, are performed through the LE modules only, the BR/EDR modules 7002 and 7005 of the host device 7000 and the client device 7001 may be in sleep mode.

Sleep mode 7007 means the state in which consumption power mode of the BR/EDR module has switched to low-power consumption power mode in order to reduce energy consumption of the BR/EDR modules that are not used. If the LE module 7006 of the client device 7001 receives a Handover Request PDU, generates a wake-up message based on information of the received Handover Request PDU, and sends the wake-up message, the BR/EDR modules 7003 and 7005 of the host device 7000 and the client device 7001 may receive the wake-up message.

FIG. 7(b) is a table showing packet names according to PDU types. A PDU is divided into an advertising PDU, a scanning PDU, and an initiating PDU depending on a PDU type. If a PDU type is 0000~0010, 0110, a corresponding PDU means an advertising PDU. If a PDU type is 0011, 0100, a corresponding PDU means a scanning PDU. If a PDU type is 0111~1111, a corresponding PDU corresponds to a reserved region that is not used now.

Each of the advertising PDU, scanning PDU, and initiating PDU is described below.

If a PDU type is 0110, a corresponding PDU is indicative of an initiating PDU. If a PDU type is 0000, a packet name is ADV_IND. In this case, the packet name ADV_IND may be generated in the case of a connectable undirected advertising event.

If a PDU type is 0001, a packet name is ADV_DIRECT_IND. In this case, the packet name ADV_DIRECT_IND may be generated in the case of a connectable directed advertising event.

If a PDU type is 0010, a packet name is ADV_NONCONN_IND. In this case, the packet name ADV_NONCONN_IND may be generated in the case of a non-connectable undirected advertising event.

If a PDU type is 0110, a packet name is ADV_SCAN_IND. In this case, the packet name ADV_SCAN_IND may be used in a scannable undirected advertising event.

If a PDU type is 0011, a packet name is SCAN_REQ. In this case, SCAN_REQ may be transmitted in the link layer of a scanning state and received in the link layer of an advertising state. The packet name SCAN_REQ may be transmitted in order to obtain additional information about a device that has sent an advertising PDU.

If a PDU type is 0100, a packet name is SCAN_RSP. In this case, the packet name SCAN_RSP may be transmitted in the link layer of an advertising state and received in the link layer of a scanning state.

If a PDU type is 0101, a packet name is CONNECT_REQ. In this case, the packet name CONNECT_REQ may be transmitted in the link layer of an initiating state and received in the link layer of an advertising state.

FIG. 7(c) is a table showing that the regions in which PDU types are 0111-1111 may be used in accordance with an embodiment of the present invention. For example, if a PDU type is 0111 and a PDU type is 1000, the packet names of a handover request and handover response may be referred to as ADV_HAN_REQ and ADV_HAN_RSP, respectively.

As shown in FIG. 7, the host device may include information that requests the parameters "Dev_info" and "Authority" for the client device by sending the packet name ADV_HAN_REQ to the advertised client device.

In response to the packet name ADV_HAN_REQ, the client device may send the packet name ADV_HAN_RSP to the host device. The packet name ADV_HAN_RSP may include the parameters "Conn_info", "Authority", and "Result."

FIG. 8 is a sequence diagram of a Bluetooth compatibility communication method and tables control PDU names according to Opcode in accordance with an embodiment of the present invention.

Furthermore, the embodiment of FIG. 8 proposes a method for sending a handover request and a handover response through a data channel PDU.

Differences from FIG. 7 are chiefly described below.

FIG. 8(a) is a sequence diagram showing a Bluetooth compatibility communication method according to an embodiment of the present invention. When the Bluetooth LE module 8006 of a client device 8001 sends ADV_IND to the Bluetooth LE module 8004 of a host device 8000, the Bluetooth LE module 8004 of the host device 8000 may send SCAN_REQ to the Bluetooth LE module 8006 of the client device 8001. In response to SCAN_REQ, the Bluetooth LE module 8006 of the client device 8001 may send SCAN_RSP to the Bluetooth LE module 8004 of the host device 8000.

The Bluetooth LE module 8004 of the host device 8000 provides a user with information about the client device 8001 through the input unit (UI) 8002 of the host device 8000. The user may select a device to be connected through the input unit 8002 of the host device 8000. The input unit 8002 of the host device 8000 may send information about the device to be connected, received from the user, to the Bluetooth LE module 8004 of the host device 8000. The Bluetooth LE module 8004 of the host device 8000 that has received the information about the device selected by the user may send a connection request CONNECT_REQ to the Bluetooth LE module 8006 of the client device 8001. When the connection request is transmitted, the Bluetooth LE modules of the host device 8000 and the client device 8001 become a connection state.

FIG. 8(b) is a table illustrating control PDU names which may be transmitted through a data channel PDU capable of being assigned depending on the form of Opcode.

Operation Code (Opcode) is a symbol indicative of a command corresponding to a control PDU. In an embodiment of the present invention, a data channel PDU which may be assigned to each Opcode may include LL_CONNECTION_UPDATE_REQ, LL_CHANNEL_MAP_REQ, LL_TERMINATE_IND, LL_PING_REQ, and LL_PING_RSP. The names of the data channel PDUs may be changed depending on a designer's intention. Pieces of information corresponding to the name of each data channel PDU may include contents commonly used in common Bluetooth technologies.

FIG. 8(c) is a table showing an example in which Reserved for Future Use in Opcode is assigned for a handover request and a handover response for implementing the present invention.

The control PDU names of a handover request and a handover response described in the table of FIG. 8(c) may be referred to as LL_HANDOVER_REQ and LL_HANDOVER_RSP, respectively, in order to distinguish them from the handover request and handover response of FIG. 7.

LL_HANDOVER_REQ and LL_HANDOVER_RSP may have the same functions and roles as ADV_HAN_REQ and ADV_HAN_RSP of FIG. 7.

FIG. 9 is a table showing power levels of Bluetooth dual mode, which are provided according to an embodiment of the present invention.

The power level of Bluetooth dual mode may be determined up to an N-th Level depending on the state of the BR/EDR module of a device and the state of the LE module of a device.

The Bluetooth dual mode power level may be determined by taking into consideration the power application state of a Band Pass Filter (BPF) and demodulators forming a BR/EDR radio and may be determined by taking into consideration the on/off state of hardware and software operations forming a Bluetooth stack, such as a link manager or a link controller.

If both the state of the BR/EDR module and the state of the LE module are an off state, the Bluetooth dual mode power level may be determined to be Level 1. In this case, the off state means the state in which main power has not been applied.

If the state of the BR/EDR module is an off state and the state of the LE module is a standby state, the Bluetooth dual mode power level may be determined to be Level 2.

The state in which the LE module is standby refers to the state in which power has been applied to the LE module by a user. If the state of the BR/EDR module is an off state and the state of the LE module is an advertising state, the Bluetooth dual mode power level may be determined to be Level 3.

If the state of the BR/EDR module is an off state and the state of the LE module is a scanning state, the Bluetooth dual mode power level may be determined to be Level 4. In this case, in the case of Level 3 and Level 4, the LE module may perform a discovery process.

If the state of the BR/EDR module is a paging state and the state of the LE module is a connection state, the Bluetooth dual mode power level may be determined to be Level 5. In the case of Level 5, the host device may send a handover request to the client device. In this case, pairing may be performed between the BR/EDR modules of the host device and the client device.

If the state of the BR/EDR module is a page scan state and the state of the LE module is a connection state, the Bluetooth dual mode power level may be determined to be Level 6. In the case of Level 6, the client device may send a handover response to the host device. In this case, pairing between the BR/EDR modules of the host device and the client device may be performed.

If the state of the BR/EDR module is a connection state and the state of the LE module is a standby state, the Bluetooth dual mode power level may be determined to be Level 7. If the state of the BR/EDR module is a connection state and the state of the LE module is an advertising state, the Bluetooth dual mode power level may be determined to be Level 8. Level 7 or Level 8 may mean the case where connection between the BR/EDR modules has been set up.

The Bluetooth dual mode power level may be changed in response to a wake-up message. This is described in more detail later.

FIG. 10 is a flowchart illustrating a power level change process of the host device, which is provided for a Bluetooth compatibility connection method according to an embodiment of the present invention.

The state in which both the BR/EDR module and LE module of the host device are off corresponds to Level 1, as described above with reference to FIG. 9. When only the LE module of the host device is powered on if the power level of the Bluetooth module of the host device is Level 1, the LE module becomes an on state at step S1001. That is, when the state of the LE module of the host device becomes the standby state, the power level of the LE module of the host device becomes Level 2 and the LE module may discover a device adjacent to the LE module at step S1002.

If an adjacent device is not discovered by the LE module up to a specific point of time, the LE module continues to discover adjacent devices at step S1002. If an adjacent device is discovered by the LE module, the power level of the LE module becomes Level 4 at step S1003. When a device to be connected with the Bluetooth LE module of the host device is selected by a user's input or a predetermined specific function at step S1004, the Bluetooth LE module of the host device may send handover request information that instructs connection between the Bluetooth LE modules to the selected device to be connected at step S1005.

As described above with reference to FIG. 9, if the host device sends the handover request and attempts pairing (or connection) using the Bluetooth BR/EDR module of the host device, the power level becomes Level 5 at step S1006.

The state of the Bluetooth BR/EDR module of the host device may immediately become the page state because discovery (search for) has been completed by the Bluetooth LE module of the same host device at step S1007. The host device receives a handover response from the client device. The received handover response may include the parameter "Result" indicating whether connection has been set up at step S1008.

If the Bluetooth BR/EDR module of the host device checks that normal connection has been performed based on the parameter "Result", the state of the Bluetooth BR/EDR module of the host device switches to the connection state at step S1010. In this case, when the state switches to the connection state, the power level of the Bluetooth BR/EDR module of the host device becomes Level 7 at step S1010.

If the Bluetooth BR/EDR module of the host device checks that normal connection has not been performed based on the parameter "Result", the state of the Bluetooth BR/EDR module of the host device does not switch to the connection state and may become the state in which the Bluetooth BR/EDR module discovers adjacent devices again exceptionally at step S1009.

If adjacent devices are determined to be discovered again at step S1012, the power level of the Bluetooth LE module of the host device becomes Level 2. The user may perform the aforementioned contents again from step S1002 for discovering adjacent devices.

If adjacent devices are determined to be not discovered again at step S1012, the user may perform the aforementioned contents again from step in which a device to be connected is selected using Advertising information already received in a previous step.

FIG. 11 is a flowchart illustrating a power level change process of the client device, which is provided for a Bluetooth compatibility connection method according to an embodiment of the present invention.

The state in which both the BR/EDR module and LE module of the client device are off corresponds to Level 1, as described above with reference to FIG. 9. When only the LE module of the client device is power on if the power level of the Bluetooth module of the client device is Level 1, the LE module becomes an on state at step S1101. That is, when the state of the LE module of the client device becomes the standby state, the power level becomes Level 3, and the LE module may send Advertising to the Bluetooth LE module of the host device adjacent to the LE module of the client device at step S1102.

The Bluetooth LE module of the host device that has received Advertising from the Bluetooth LE module of the client device may send a handover request to the Bluetooth LE module of the client device. The power level of the Bluetooth LE module of the client device that has received the handover request from the Bluetooth LE module of the host device becomes Level 6, as described with reference to FIG. 9, at step S1103.

The Bluetooth LE module of the client device may determine whether the Bluetooth BR/EDR module of the client device is the state in which it is connectable to the Bluetooth BR/EDR module of the host device at step S1104.

If, as a result of the determination, it is determined that the Bluetooth BR/EDR module of the client device is not connectable, the Bluetooth LE module of the client device may include a parameter indicative of information indicating that the Bluetooth BR/EDR module of the client device is not connectable in a handover response and sends the handover response to the Bluetooth LE module of the host device. The power level of the Bluetooth LE module of the client device becomes Level 3 at step S1110.

If, as a result of the determination, it is determined that the Bluetooth BR/EDR module of the client device is a connectable state at step S1105, the state of the Bluetooth BR/EDR module of the client device may switch to the page scan state at step S1106.

When the state of the Bluetooth BR/EDR module of the client device switches to the page scan state, the Bluetooth LE module of the client device may determine whether or not to be connected with the Bluetooth LE module of the host device that has sent the handover request at step S1107.

If, as a result of the determination, it is determined that the Bluetooth LE module of the client device is to be connected to the Bluetooth LE module of the host device that has sent the handover request is determined, the Bluetooth LE module of the client device may include parameters, used to determine whether the connection will be performed, in a handover response and send the handover response to the Bluetooth LE module of the host device at step S1108. In this case, in accordance with the aforementioned contents of FIG. 9, the power level of the Bluetooth LE module of the client device may become Level 8 or Level 3 depending on whether the Bluetooth LE module of the client device has been connected to the Bluetooth LE module of the host device.

If the power level of the Bluetooth LE module of the client device becomes Level 8 at step S1108, the state of the Bluetooth BR/EDR module of the client device may become the connection state at step S1109.

If the power level of the Bluetooth LE module of the client device becomes Level 3 at step S1110, the Bluetooth LE module of the client device may perform the aforementioned steps from step S1102 in which advertising is transmitted to the Bluetooth LE module of an adjacent host device.

FIG. 12 is a diagram showing devices in which connection between the host device 5001 and the client device 5002 may be performed in response to a connection request from an agent device 1200 in an apparatus providing Bluetooth compatibility communication according to another embodiment of the present invention.

The agent device 1200, the host device 5001, and the client device 5002 may be determined depending on a role performed by each device.

The agent device 1200 may discover the host device 5001 and the client device 5002 and send a packet so that the host device 5001 and the client device 5002 perform mutual data transmission.

The agent device 1200 may instruct the host device 5001 and the client device 5002 to perform connection therebetween by sending a connection request to the host device 5001 or the client device 5002. The agent device 1200 may include an input unit 1201 for receiving a connection command from a user and an output unit 1202 for outputting a result of the execution of connection.

The connection request is a control PDU through which the Bluetooth module (or network interface) 1207 of the agent device 1200 sends information indicative of connection between the Bluetooth module 5009 of the host device 5001 and the Bluetooth module 5018 of the client device 5002 to the Bluetooth modules 5009 and 5018 of the host device 5001 and the client device 5002 or to the Bluetooth module 5009 of the host device 5001.

The connection request may include parameters "Destination_Dev" and "Authority". Contents for the parameter "Authority" are the same as the aforementioned contents. The parameter "Destination_Dev" is information about a connection target device. In this case, the information about the connection target device means information about the client device 5002 to which the host device 5001 will be connected and may include Dev_info, Conn_info and so on.

The host device 5001 may instruct the client device 5002 to perform connection between network interfaces by sending a handover request to the client device 5002. Furthermore, as described above, when the host device 5001 receives a connection request from the agent device 1200, it may perform connection with the client device 5002.

When receiving the connection request from the agent device 1200, the client device 5002 may perform connection with the host device 5001.

The input unit 1201 is an element for receiving a command, such as discovery and connection, from a user and outputting the received command to a control unit 1203.

An output unit 1202 is an element for outputting data received through the network interface 1207 or data stored in a first storage unit 1205 or a second storage unit 1206 under the control of the control unit 1203.

The control unit 1203 may control the operation of each of the input unit 1201, the output unit 1202, a multimedia playback unit 1204, the first storage unit 1205, the second storage unit 1206, and the network interface 1207 using data received from each of the units and modules of the agent device 1200. Furthermore, the control unit 1203 may control the operation of each of the input unit 1201, the output unit 1202, the multimedia playback unit 1204, the first storage unit 1205, the second storage unit 1206, and the network interface 1207 by sending data to each of the units and modules of the agent device 1200.

The multimedia playback unit 1204 is an element for playing back a variety of types of multimedia. The multimedia playback unit 1204 may be placed and implemented within the control unit 1203. As shown in FIG. 12, the multimedia playback unit 1204 may be placed and implemented at a location separate from the location of the control unit 1203.

The first storage unit 1205 is a physical device of a non-volatile property capable of storing a variety of types of data. For example, the first storage unit 1205 may be an SD card.

The second storage unit 1206 is an optional element implemented in a variety of types of device and is a physical device of a volatile property in which a variety of types of data is temporarily stored.

The network interface unit 1209 is an element that enables Bluetooth communication, and it includes a Bluetooth BR/EDR module 1209 and a Bluetooth LE module 1208.

The Bluetooth BR/EDR module 1209 is an element for wireless communication and for discovering another device to be connected or sending data.

The Bluetooth LE module 1208 has a function similar to the function of the Bluetooth BR/EDR module 1209, but is different from the Bluetooth BR/EDR module 1209 in that it is capable of low-power wireless communication.

FIG. 13 is a sequence diagram showing a Bluetooth compatibility communication method according to another embodiment of the present invention.

The Bluetooth BR/EDR module 1304 of an agent device 1300 may send a discovery request to the Bluetooth BR/EDR modules 1306 and 1308 of a host device 1301 and a client device 1302.

In response to the discovery request from the Bluetooth BR/EDR module 1304 of the agent device 1300, the Bluetooth BR/EDR modules of the host device 1301 and the client device 1302 may send respective discovery responses to the Bluetooth BR/EDR module 1304 of the agent device 1300.

The Bluetooth BR/EDR module 1304 of the agent device 1300 that has received the discovery responses from the Bluetooth BR/EDR modules 1306 and 1308 of the host device 1301 and the client device 1302 may send a handover request to the Bluetooth LE module 1307 of the host device 1301.

A handover request described in the embodiment of FIG. 13 and transmitted from the Bluetooth LE module 1305 of the agent device 1300 to the Bluetooth LE module 1307 of the host device 1301 may be a PDU indicative of connection between the Bluetooth LE module 1307 of the host device 1301 and the Bluetooth LE module 1309 of the client device 1302.

In response to the handover request, the Bluetooth LE module 1307 of the host device 1301 may send a handover response to the Bluetooth LE module 1305 of the agent device 1300.

FIG. 14 is a sequence diagram showing a Bluetooth compatibility communication method according to another embodiment of the present invention.

The Bluetooth BR/EDR modules or Bluetooth LE modules of a host device 1402 and a client device 1403 are discovered by the Bluetooth BR/EDR module or Bluetooth LE module of an agent device 1401.

FIG. 14 is a sequence diagram showing an example in which the Bluetooth modules of the agent device, the host device, and the client device perform a discovery process.

The first dotted-line rectangle of the sequence diagram may illustrate an example in which discovery is performed between the Bluetooth BR/EDR modules (1405). In the following description of FIG. 14, a Bluetooth module means a Bluetooth BR/EDR module.

The Bluetooth module of the agent device 1401 may broadcast Inquiry (ID) in order to discover the Bluetooth module of the host device 1402 and the Bluetooth module of the client device 1403. The broadcasting means that Inquiry (ID) is transmitted without specifying the host device or the client device.

The Bluetooth modules of the host device 1402 and the client device 1403 may send extended inquiry responses "Extended Inquiry Response" that respond to the received Inquiry (ID).

The second dotted-line rectangle of the sequence diagram may illustrate an example in which discovery is performed between the Bluetooth LE modules (1406). In the following description of FIG. 14, a Bluetooth module means a Bluetooth LE module.

The Bluetooth module of the agent device 1401 may broadcast Advertising in order to discover the Bluetooth module of the host device 1402 and the Bluetooth module of the client device 1403.

The Bluetooth modules of the host device 1402 and the client device 1403 may send extended inquiry responses "Extended Inquiry Response" that respond to the received Inquiry (ID).

When a process for performing discovery between the Bluetooth modules of the devices is completed, the Bluetooth BR/EDR module or Bluetooth LE module of the agent device 1401 may send a connection request to the Bluetooth BR/EDR modules or Bluetooth LE modules of the host device 1402 and the client device 1403 based on a result of the execution of discovery. The Bluetooth BR/EDR modules or Bluetooth LE modules of the host device and the client device may send connection requests, responding to the connection request, to the Bluetooth BR/EDR module or Bluetooth LE module of the agent device.

The aforementioned processes for sending the connection request and the connection response may be performed between the Bluetooth BR/EDR module or Bluetooth LE module of the agent device and the Bluetooth BR/EDR module or Bluetooth LE module of the host device.

Inquiry (ID) and Extended Inquiry Response, that is, control PDUs, used in the process for performing discovery between the Bluetooth BR/EDR module are described below.

Inquiry (ID) is a control PDU broadcasted by the Bluetooth BR/EDR module of an agent device in order to discover a device including capable of Bluetooth communication.

Extended Inquiry Response is a control PDU transmitted in response to Inquiry (ID). Extended Inquiry Response may include parameters "Dev_info", "Conn_info", and "Authority." The role of each of the parameters is the same as that described above.

FIG. 15 is a sequence diagram showing a method for changing authority, which is provided for a Bluetooth communication connection method according to another embodiment of the present invention.

An embodiment of the present invention may provide a method for changing the authority of a device.

A change of Authority may be started by a user through the input unit of the agent device or may be started in such a manner that the Bluetooth LE module of the agent device continues to send an authority change request.

In FIG. 15, four arrows on the upper side of the sequence diagram correspond to a sequence diagram showing the following process.

The Bluetooth LE module of an agent device 1501 may send an authority change request "Authority Change Request" to the Bluetooth LE modules of a host device 1502 and a client device 1503.

The authority change request is a control PDU that requests a change of device authority.

An authority change response "Authority Change Response" is a response control PDU for a received authority change request.

The Bluetooth LE modules of the host device 1502 and the client device 1503 may send authority change responses "Authority Change Response" to the Bluetooth LE module of the agent device 1501 in response to the received authority change request.

In FIG. 15, five arrows on the lower side of the sequence diagram correspond to a sequence diagram in which a process for sending an authority confirmation control PDU has been added to the aforementioned process.

Changed authority may be maintained while parameters "Authority Confirmation" are exchanged between the devices.

The authority change request may include parameters "Authority" and "Authority Maintenance Setting."

The authority change response may include parameters "Authority" and "Result." Authority Maintenance Setting may include information indicative of authority that is requested from the host device 1502 and the client device 1501 based on authority information of the agent device 1502.

The parameter "Result" may include information indicative of a result indicating whether authority has been changed.

The process for sending the control PDUs (i.e., the authority change request and the authority change response) for changing authority may be performed by a separate device different from the agent device 1503.

FIG. 16 is a diagram showing authority information provided for a Bluetooth communication connection method according to another embodiment of the present invention.

FIG. 16(a) is an example of authority information 1602 which may be provided according to an embodiment of the present invention.

The authority information may include pieces of information related to whether a user device has been registered, a connectivity control level, a product group, and security.

Each of the pieces of information may be represented as a number of 4 or 2 digits as shown in FIG. 16(b). The pieces of information are described below.

The information about whether a user device has been registered may indicate whether a user has performed a configuration so that the agent device may manipulate the host device and the client device. In this case, in the case of a device registered by the user, the corresponding device may be manipulated regardless of information about a connectivity control level and a product group to be described below.

The connectivity control level is described below.

Whether manipulation between the devices is possible may be determined based on the value of the connectivity control level. Connectivity for a host device and a client device having a lower connectivity control level than an agent device may be manipulated. A device having a higher connectivity control level value may control a device having a lower connectivity control level value. If the number of devices that are already connected together is many, a connectivity control level value may be changed to a specific value if a request for connectivity control is to be not permitted.

The information about a product group has the same value if devices belong to the same product group.

Devices belonging to the same product group may be distinguished based on the information about a product group. Connectivity between the same product groups may be impossible.

The information related to security may include a value which is used to determine whether connectivity control can be permitted based on security strength of wireless communication (e.g., Bluetooth communication in an embodiment of the present invention.

The security strength may include information related to a security method for determining a strict degree of security when connection is performed between devices.

FIG. 16(b) is a diagram showing an example in which connectivity between devices is determined using the authority information proposed in FIG. 16(a).

An agent device 1603 has 2727 as a value regarding whether a user has registered devices, 0017 as the value of a connectivity control level, 0021 as a product group value, and 03 as a security value.

The agent device 1603 may perform an authority change process on each of devices (i.e., host devices 1604 and 1606 or client devices 1605 and 1607) and control connection between the devices using an authority value included in each device without performing a change process.

Whether each of the host and client devices has been registered with the agent device may be determined based on a value indicating whether a user has registered each device. As described above with reference to FIG. 16(a), if the host device or the client device has the same value as a value indicating whether it has been registered with the agent device because it has been registered with the agent device, the agent device may control connection between the host and client devices.

In the description related to FIG. 16(b), assuming that each of the devices (i.e., the host device and the client device) has not been registered with the agent device, an example in which whether connectivity can be controlled based on values related to the connectivity control level and the product group is determined is described.

The device B 1604 and the device C 1605 have respective connectivity control level values of 0015 and 0014 which are lower than 0017, that is, the connectivity control level value of the device A 1603. Furthermore, the device B 1604 and the device C 1605 have product group values different from the product group value of the agent device 1603. Accordingly, the agent device 1603 may control connection between the device B 1604 and the device C 1605.

The device D 1606 and the device E 1607 have respective connectivity control level values of 1111 and 0017. The device D 1606 has the connectivity control level value of 1111 higher than the connectivity control level value of the device A 1603. Accordingly, the agent device 1603 may not perform connection control on the device D 1606.

Connection control for the device E 1607 may be possible because the device E 1607 has the same connectivity control level value as the device A 1603, but connection control for the device E 1607 may be impossible because the device E 1607 has the same product group value as the device A 1603.

FIG. 17 is a diagram showing an example in which a Bluetooth communication connection method according to another embodiment of the present invention is used.

The phone of a user B to be used as an agent device is unable to connect a projector for a conference room and the notebook device of a user A.

When the users A and B enter the conference room, an authority management center mounted on the conference room performs a process for sending an authority change request or an authority change response to the notebook device of the user A. When the user A agrees, the user B may connect the notebook device of the user A and the projector for the conference room using the phone of the user B (i.e., an agent device).

Although the authority management center is not present, the phone the user B, that is, an agent device, may perform a process for sending a PDU for a change of authority to the notebook device of the user A, that is, a host device or a client device.

Changed authority of each device may return to a basic value when each device deviates from a range in which it is able to receive a signal from the authority management center or the agent device. In some embodiments, changed authority of each device may return to a basic value according to a process set within the notebook device of the user A.

In the example shown in FIG. 17, the type or name or both of each device may be changed according to a user's intention, and some devices or sensors may not be used.

FIG. 18 is a diagram showing devices which are used to provide a Bluetooth communication connection method according to yet another embodiment of the present invention.

FIG. 18(*a*) is a block diagram 5001 showing the configuration of an agent device, a host device, and a client device which may be used in yet another embodiment of the present invention.

FIG. 18(*b*) is a block diagram 5002 showing the configuration of a host device and a client device which may be used in yet another embodiment of the present invention.

In an embodiment of the present invention, a host device may be represented as a cluster manager device, and a client device may be represented as a slave device.

Each device shown in FIG. 18(*a*) has the same configuration as each device described with reference to FIG. 5.

FIG. 18(*b*) shows the configuration of a host device and a client device which may be used in yet another embodiment of the present invention. In this case, an input unit and an output unit may not be included, a separate multimedia playback unit may not be included, and a single storage 5014 unit may be included.

The network interface unit 5018 of a second device shown in FIG. 18(*b*) may include only a Bluetooth LE module 5019.

FIG. 19 is a diagram showing a profile stack including a cluster profile diagram provided for a Bluetooth communication connection method according to yet another embodiment of the present invention.

FIG. 19(*a*) is a diagram showing a profile stack provided for a Bluetooth LE communication method.

The profile stack provided for a Bluetooth LE communication method includes a GATT/ATT, L2CAP, an LE link (or also called an LE link layer), and an LE physical layer.

A description of FIG. 19(*a*) may be replaced with that of FIG. 2(*b*).

FIG. 19(*b*) is a diagram showing a profile stack including a cluster profile diagram provided for a Bluetooth communication connection method according to yet another embodiment of the present invention.

A profile which may be additionally provided for a Bluetooth communication connection method according to yet another embodiment of the present invention is a cluster profile.

In order to implement an embodiment of the present invention u sing the cluster profile, a pairing service application may be added.

A cluster and clustering used in an embodiment of the present invention may be interchangeably used as terms, such as a group and grouping, according to circumstances.

FIG. 20 is a table showing control PDUs and parameters included in the respective control PDUs, which may be provided for yet another embodiment of the present invention.

FIG. 20(*a*) is a table showing control PDUs and parameters included in the respective control PDUs, which may be provided when a Bluetooth BR/EDR module is used.

The control PDUs which may be provided when a Bluetooth BR/EDR module is used may include Inquiry (ID), Extended Inquiry Response, Request Cluster, Reference Cluster, Cluster Control, and Release Cluster.

The Extended Inquiry Response PDU may include parameters Dev_info, Cluster_info, and Authority.

Cluster_info may be represented as Cluster_Dev_info. Cluster_info may include information indicating whether a device is a device capable of receiving a cluster request from a host device or a client device and performing clustering.

The Request Cluster PDU may include parameters "Cluster_ID", "Cluster_Dev_Info", and "Authority."

Request Cluster is a control PDU through which a Bluetooth module within an agent device may request clustering from a host device or a client device.

Cluster_ID may include information indicative of identifiers assigned to identify clusters.

Cluster_Dev_Info may include information indicating whether a device is a device capable of performing clustering from a host device or a client device.

The Response Cluster PDU may include parameters "Authority" and "Result_Cluster."

Reference Cluster is a control PDU which may include information indicative of results regarding whether clustering requested from a request cluster has been performed.

Result_Cluster may be represented as Clustering_Result. Result_Cluster may include information about the results of clustering performed on client devices by a cluster manager.

One of devices from which a request cluster has been requested may be selected as a device functioning as a cluster manager.

The Cluster Control PDU may include a parameter "Control_Info."

Control_Info may include information which may be required when an agent device performs control of a cluster.

The Release Cluster PDU may include parameters "Cluster_ID" and "Authority_ID."

The Release Cluster PDU is a control PDU transmitted to a host device or client device included in a cluster to be released from an agent device when generated clustering is released.

Cluster_ID may include information indicative of an identifier capable of identifying clustered devices. Cluster_ID may be interchangeably used as the ID of a device functioning as a cluster manager and may be newly generated in a process of clustering being performed.

Authority_ID is a parameter for identifying information related to authority assigned to a host device or client device included in the same cluster.

Authority_ID may include information capable of identifying information related to authority assigned to a host device or client device included in the same cluster.

FIG. 20(b) is a table showing control PDUs and parameters included in the respective control PDUs, which may be provided when a Bluetooth LE module is used.

The control PDUs which may be provided when a Bluetooth LE module is used may include Advertising, Request Cluster, Reference Cluster, Cluster Control, and Release Cluster.

The control PDU "Advertising" may include parameters included in the control PDU "Extended Inquiry Response" described with reference to FIG. 20(a).

In addition, each of the control PDUs shown in FIG. 20(b) may have the same role as each of the control PDUs which may be provided when the Bluetooth BR/EDR module is used in FIG. 20(a) and may include the same parameters included in the respective control PDUs.

Although not shown, a description of the control PDUs and the parameters that have not been described above is the same as the aforementioned contents.

Although not shown, parameters which may be provided for a Bluetooth communication connection method according to yet another embodiment of the present invention is described below.

A Cluster Identity Number (CIN) is a parameter for identifying current clustered clusters.

A Pre Cluster Identity Number (Pre CIN) is a parameter in which the CIN of a cluster prior to release is stored if clustering is released.

Cluster_Manager is a parameter assigned to a single device when the role of a manager is assigned to one of devices included in a cluster.

A device to which the parameter "Cluster_Manager" has been assigned may be determined to be a manager device or a host device. A device to which the parameter "Cluster_Manager" has been assigned may directly receive information for controlling a cluster from an agent device and control slave devices included in the cluster.

Result_Cluster_Manager is a parameter which may be used when a cluster manager sends information indicating whether clustering has been completed to an agent device.

Cluster_Manager_Dev_Info is a parameter which may include information of a host device that functions as a cluster manager.

Result_Clustering is a parameter which may include information indicative of the results of clustering of slave devices, which is performed by a manager device to which authority of a cluster manager has been assigned by an agent device.

Dev_Info_Slave may include information of slave devices included in a cluster. The information of the slave devices may include information included in Dev_info.

FIG. 21 is a sequence diagram showing a Bluetooth communication connection method according to yet another embodiment of the present invention.

A master device (i.e., another expression of an agent device) 2101 may receive advertising PDUs from a first device 2104, a second device 2105, a third device 2106, and a fourth device 2107. In this case, before receiving the advertising PDUs, the master device 2101 may send a control PDU for requesting advertising to each of the devices.

The master device 2101 that has received the advertising PDUs may send a request cluster control PDU "Request_Cluster" to each of the devices.

One or more of devices that have received the request cluster control PDU "Request_Cluster" may send response clusters "Response_Cluster" corresponding to the request cluster control PDUs "Request_Cluster." Information included in the response cluster "Response_Cluster" may be information about whether clustering has been completed. The master device 2101 may determine a device that belongs to the devices, sent the response clusters "Response_Cluster", and that has sent the response cluster most quickly to be a manager device. In another embodiment, a device that belongs to the devices, sent the response clusters "Response_Cluster", and that has the greatest remaining battery power capacity may be determined to be a manager device. In yet another embodiment, one of devices included in a cluster may be determined to be a manager device after clustering is completed. A process for determining a manager device may be determined by a designer's intention.

In the aforementioned contents, if a Bluetooth BR/EDR module is used, a control PDU that requests advertising may be interpreted as Inquiry (ID), and an advertising PDU may be interpreted as Extended Inquiry Response.

In the aforementioned embodiments, after connection between the Bluetooth modules is performed, data transmission may be performed between devices including the connected Bluetooth modules through the Bluetooth modules.

FIG. 22 is a block diagram showing a process for generating a CIN for Bluetooth clustering according to yet another embodiment of the present invention.

Equation 1 may be used to generate a CIN in FIG. 22.

$$X = ADA \qquad \text{[Equation 1]}$$
$$P_n = SDA_n$$
$$S_n = P_n \times \bmod n$$
$$CIN = \sum_{n=1}^{num(E)} S_n$$

ADA is an agent device address, and SDA is a slave device address. The device address is a value assigned in order to identify Bluetooth devices. The device address may be determined based on the standard established by IEEE Registration Authority.

ADA and SDA may be replaced with the UUID of an agent device and the UUID of a slave device, respectively.

All of CINs are different for each device and may be generated whenever clustering is performed because devices included in a clustering execution process or the state of the included devices may be changed over time. A CIN generated by incorporating a change over time may be called a dynamically generated CIN.

In a clustering execution process using a Bluetooth communication method, if the value of a dynamically generated CIN is the same as a pre CIN, a process for generating a CIN may be performed once more.

An algorithm for generating a dynamic CIN which is proposed according to an embodiment of the present invention may be called a Cluster Identity Number Generator (CING).

FIG. 22 is a diagram illustrating a CING algorithm.

A plurality of values is received to become a total sum. A process for discarding an overflow value may be performed and thus a CIN may be finally output. In this case, the plurality of values may be S1, S2, . . . , Sn as shown in FIG. 22. Each of the plurality of values S1, S2, . . . , Sn may be obtained by multiplying values "x" and Pn and dividing the multiplied value by "n." In this case, n may mean the number of devices (i.e., a host device and a client device), that is, the subject on which a clustering process will be performed.

A CIN may be individually performed according to each clustering execution process.

FIG. 23 is a sequence diagram showing a Bluetooth clustering process according to yet another embodiment of the present invention.

The sequence diagram of FIG. 21 is a clustering process showing a clustering process in the case of a single group, whereas the sequence diagram of FIG. 23 may be a clustering process when the number of clusters is two or more.

Another embodiment of the present invention may provide a method for providing the discovery of devices providing the same service and convenience of connection control for the devices if the number of devices providing the same service is plural near an agent device. Referring to FIG. 23, (2N+2) devices are disposed on the basis of an agent device 2301. A group 2 2307 may include (N+1) devices capable of providing the same service, and a group 1 2308 may include (N+1) devices capable of providing the same service. If the group owner (or cluster manager) device 2303 of the group 1 2308 has been determined, the agent device 2301 may discover the group owner device 2303 of the group 1 2308 based on "Group owner" parameter (or "Cluster_manager" parameter) information and output only the group owner device 2303 as the results of the discovery. If connection with the group owner device 2303 of the group 1 2308 is requested, the agent device 2301 may send a connection request to the group owner device 2303. The group owner device 2303 that has received the connection request may operate as a host device and perform connection with N slave devices 2305 of devices included in the group 1 2308 other than the group owner device 2303.

If a group owner device has not been determined, a group owner parameter may not include information regarding that which device is the group owner device of the group 1 2308. The agent device 2301 may perform a grouping algorithm based on Dev_info information obtained based on the results of discovery. The group owner device 2303 of the group 1 2308 may be determined as the results of the execution of the grouping algorithm, and information about the determined group owner device 2303 may be transmitted to the agent device 2301. The agent device 2301 may send a connection request to the group owner device 2303 of the group 1 2308 determined through the group algorithm. In this case, Destination_Dev that is included in the connection request and transmitted may include information about the N slave devices of the group 1 2308 other than information about the group owner device 2303.

A detailed method for performing the grouping algorithm is described later.

FIG. 24 is a diagram illustrating a method for discovering devices in a Bluetooth clustering process according to yet another embodiment of the present invention.

If the group owner device of a group has not been determined, an agent device may select the group owner device using the grouping algorithm.

FIG. 24($a$) is a diagram showing an example in which a device 1, a device 2, and a device 3 form a single group and a group owner device has not been determined.

ADV_IND having an arrow that is downward drawn indicates that a corresponding device has entered the scan window "ScanWindow" of the agent device.

The scan window may be defined as a parameter corresponding to a time domain while the agent device or a host device receives ADV_IND.

When the agent device receives ADV_IND from the device 1 and receives ADV_IND from the device 2, it may determine that devices capable of being grouped are present near the agent device.

The agent device may recognize the device 1 and the device 2 as a single group and determine the device 1 to be a group owner device.

If the agent device receives ADV_IND from the device 3 and determines the device 3 to be a device providing the same service as the device 1 based on the received ADV_IND information, it may classify the device 3 as a group in which the device 1 is a group owner device.

If the grouping algorithm is performed, the agent device may extend the time so that all devices that may be included in the same group are grouped by controlling the time in a scanning state.

The agent device may extend the scan window so that it has the same size as T_advEvent of device 1, the device 2, and the device 3 using the grouping algorithm.

In this case, T_advEvent may mean a parameter indicative of the time between points of time at which two pieces of consecutive information "ADV_IND" are started if the two pieces of consecutive information "ADV_IND" are transmitted.

In this case, sleep may mean the state in which a device is an idle state. Accordingly, in the sleep state, the scan window may disappear.

FIG. 24($b$) is a diagram showing the relationships between T_advEvent, advinterval, and advDelay. In the contents shown in this figure, the relationships between T_advEvent, advinterval, and advDelay may be represented as Equation 2.

$$T\_advEvent = advInterval + advDelay \qquad [\text{Equation 2}]$$

advinterval may mean a periodic time during which advertising is generated.

advDelay may mean a latency time generated between periodic times in which the periodic time "advinterval" is generated.

FIG. 25 is a flowchart illustrating a grouping algorithm for discovering devices and grouping the devices in a Bluetooth clustering process according to yet another embodiment of the present invention.

If an agent device starts scanning, the value of a grouping flag may be 0 at step S2500.

The value of the grouping flag may include information about whether a scan window is an extended state in a process of performing grouping.

If the value of the grouping flag is 1, the scan window has been extended in order to perform grouping. If the value of the grouping flag is 0, the scan window may be a basic setting state in which the scan window for performing grouping has not been extended.

The agent device receives ADV_IND at step S2501. If the received ADV_IND is ADV_IND related to information of a device which may be included in the same group, the value of the grouping flag becomes 1 at step S2502. If the value of the grouping flag is 1, it means that the scan window has been extended, and thus the agent device may determine that all of types of information about devices which may be included in the same group have been received. Accordingly, the agent device may change the value of the grouping flag to 0 at step S2508, and the scan window may be changed to the basic setting state prior to the extension at step S2509.

If the value of the grouping flag is not 1, the agent device may count ADV_IND of devices providing the same service at step S2503. If two or more pieces of information ADV_IND about devices providing the same service are received at step S2504, the agent device may select one of the devices providing the same service as a group owner. Furthermore, the agent device may group the devices, providing the same service, into the same group at step S2506. After grouping the devices providing the same service into the same group, the agent device may extend the scan window to a "T_advEvent" size. If the number of group owners providing the same service is two or more, the agent device may extend the scan window according to the largest "T_advEvent" size. Since the scan window has been extended, the value of the grouping flag may be 1 at step S2507.

If the number of group owners providing the same service is two or more, the agent device may extend the scan window in order to group another device into the same group because there is another device group providing the same service. Furthermore, the agent device may return to step S2501 in which it receives ADV_IND of devices in order to discover devices providing the same service.

If two or more ADV_IND of devices providing the same service are not received, the agent device may return to step in which it receives ADV_IND of devices.

FIG. 26 is a diagram showing fields to which a Bluetooth clustering method according to yet another embodiment of the present invention may be applied.

FIG. 26(a) is a diagram showing Bluetooth devices which may be present in common homes or offices in different spaces.

FIG. 26(b) is a diagram showing an example in which the Bluetooth devices of FIG. 26(a) are grouped according to the spaces in which the devices are present, functions, and devices.

In accordance with yet another embodiment of the present invention, the Bluetooth devices may be grouped according to the spaces in which the devices are present, such as bed rooms, kitchens, and living rooms. In an embodiment, devices related to temperature or humidification may be grouped into the same group by function.

In another embodiment, the same devices (e.g., bulbs in FIG. 24(b)) may be grouped into the same group.

Devices grouped into the same group may operate based on information received by a group owner from an agent device.

FIG. 27 is a diagram showing an example in which a Bluetooth communication connection method according to yet another embodiment of the present invention is used.

From FIG. 27, it may be seen that household appliances are controlled using Bluetooth or household appliances are externally controlled over a home network using a gateway.

An easy pairing procedure using Bluetooth can provide stable connection between devices, and a recent Bluetooth Low Energy (LE) technology can stably provide information of several hundreds of KB while consuming low power.

If such a Bluetooth technology is used, household appliances can be stably controlled with low power easily, but devices supporting Bluetooth are rarely found in household appliances (e.g., a refrigerator, a washing machine, and a humidifier).

In a prior art, household appliances may be controlled using the Wi-Fi and Z-Wave technologies. In the case of Wi-Fi, connection through an AP or connection through Wi-Fi Direct is required.

However, such Wi-Fi Direct connection is disadvantageous in that a complicated connection process and a long time taken for connection are required and connection with a plurality of devices cannot be controlled. Compared with such technologies, Bluetooth is advantageous in that it can provide connectivity with several devices easily and rapidly.

Accordingly, if household appliances (e.g., a washing machine 100) supporting a Bluetooth function are controlled using a control device 200 supporting the Bluetooth function, the household appliances can be controlled easily and efficiently.

Furthermore, although a user is out of his or her house, he or she can indirectly control the washing machine 100 within the house through connection with a gateway 200 within the house using a technology other than Bluetooth.

Bluetooth communication has low power consumption because it has a simple message structure and supports a small amount of data for transmission and sleep mode of a Radio Frequency (RF) and also enables stable channel connection and data transmission because it uses a frequency hopping scheme and thus it is less influenced by interference from another radio technology using the same frequency band.

FIG. 28 is a diagram showing a device which is used to provide a Bluetooth communication connection method according to yet another embodiment of the present invention.

In an embodiment of the present invention, a target device 100, a controlling device 200, and a remote controlling device 300 may include respective output units 110, 210, and 310, respective user input units 120, 220, and 320, respective communication units 130, 230, and 330, respective pieces of memory 140, 240, and 340, respective power supplies 150, 250, and 350, and respective control units 160, 260, and 360.

The elements of FIG. 28 are not essential, and a device having a large number or smaller number of elements than the elements of FIG. 28 may be implemented.

The controlling device 200 may send a request or receive information through direct communication with the target device 100. The controlling device 200 may receive a request from the remote controlling device 300, may send the request to the target device 100 or receive a response from the target device 100, and may deliver the response to the remote controlling device 300.

Furthermore, the controlling device 200 may send a request message to the target device 100 in order to request data from the target device 100 or so that the target device 100 performs a specific operation. The controlling device 200 may receive an indication message indicative of the operating state of the washing machine 100 from the washing machine, may process the indication message, and may send a confirm message to the target device 100.

In the process for sending and receiving the messages, the controlling device 200 may provide a user with information through the output unit 210 and receive a user request through the user input unit 220. In the process for sending and receiving the messages, the controlling device 200 may read data from the memory 240 and store new data in the memory 240.

After the target device 100 receives a request message from the controlling device 200 and processes the request message, it may send a response message to the controlling device 200. The controlling device 200 may send an indication message in order to provide its own information and receive a confirm message in response to the indication message.

Furthermore, in the process for sending the response message or the confirm message, the target device 100 may receive a command from a user through the user input unit 120.

The remote controlling device 300 refers to a device capable of communication with the controlling device 200 using Bluetooth or another interface technology through the communication unit 330, but incapable of direct communication with the target device 100.

The communication units 130, 230, and 330 may include one or more modules that enable wireless communication between a device and a wireless communication system or between a device and a network in which the device is placed. For example, the communication units 130, 230, and 330 may include a broadcast reception module (not shown), a mobile communication module (not shown), a wireless Internet module (not shown), and a short-distance communication module (not shown).

The communication units 130, 230, and 330 may be called transmission and reception units.

The mobile communication module exchanges radio signals with at least one of a base station, an external terminal and a server over a mobile communication network. The radio signal may include a variety of types of data according to the transmission and reception of voice call signals, video telephony call signals, or text/multimedia messages.

The wireless Internet module refers to a module for wireless Internet access. The wireless Internet module may be internal or external to a device. A Wireless LAN (WLAN) (WiFi), a Wireless Broadband (WiBro), a World Interoperability for Microwave Access (WiMax), and High Speed Downlink Packet Access (HSPDA) may be used as the wireless Internet technology.

The device may perform Wi-Fi Peer to Peer (P2P) connection with another device through the wireless Internet module. Through such Wi-Fi P2P connection, a streaming service between devices can be provided, data can be transmitted and received, and a printing service can be provided through connection with a printer.

In an embodiment of the present invention, the target device 100 may perform communication with the controlling device 200 using Bluetooth, that is, short-distance communication. The remote controlling device 300 may be connected to the controlling device 200 using a communication technology other than Bluetooth and may control the target device 100.

The user input units 120, 220, and 320 generates input data for controlling the operations of the devices by a user.

The user input units 120, 220, and 320 may include a key pad dome switch, a touch pad (resistive/capacitive), a jog wheel and/or a jog switch.

The output units 110, 210, and 310 generate output related to visual, auditory, or tactile senses and may include respective display modules 112, 212, and 312 and respective sound output modules 114, 214, and 314.

The display modules 112, 212, and 312 display information processed by the devices. For example, of the device is call mode, the display module displays a User Interface (UI) or Graphic User Interface (GUI) related to a call. If the device is video telephony mode or photographing mode, the display module displays a photographed or/and received image, a UI, or a GUI.

Each of the display modules 112, 212, and 312 may include at least one of a liquid crystal display, a thin film transistor liquid crystal display, an organic light-emitting diode, a flexible display, and a 3D display.

The sound output modules 114, 214, and 314 may output audio data received from the communication units 130, 230, and 330 or stored in the memory 140, 240, and 340 in incoming call mode, communication mode, recording mode, voice recognition mode, and broadcast reception mode. Each of the sound output modules 114, 214, and 314 outputs sound signals related to a function (e.g., a received call sound and a received message sound) performed in the device. The sound output modules 114, 214, and 314 may include a receiver, a speaker, and a buzzer.

Each of the control units 160, 260, and 360 refers to a module for controlling an overall operation of each of the target device 100, the controlling device 200, and the remote controlling device 300 and may perform control so that a request to send a message or the processing of a received message is performed through a Bluetooth interface and another communication interface.

Each of the control units 160, 260, and 360 may be called a controller, a microcontroller, or a microprocessor and may be implemented by hardware, firmware, software or a combination of them.

The control units 160, 260, and 360 may include Application-Specific Integrated Circuits (ASICs), other chipsets, logic circuits and/or data processing apparatuses.

The memory 140, 240, and 340 is a medium for storing a variety of types of information of the device. The memory is connected to the control unit and may store programs, applications, common files, and input/output data for the operations of the control units 160, 260, and 360.

The memory 140, 240, and 340 may include at least of a flash memory type, a hard disk type, a multimedia card micro type, card type memory (e.g., SD or XD memory), Random Access Memory (RAM), Static Random Access Memory (SRAM), Read-Only memory (ROM), Electrically Erasable Programmable Read-Only Memory (EEPROM), Programmable Read-Only Memory (PROM), magnetic memory, a magnetic disk and an optical disk. The device may also operate in relation to web storage that performs the storage function of the memory 140, 240, and 340 on the Internet.

Each of the power supplies 150, 250, and 350 refers to a module for being supplied with external power or internal power and supplying power for the operations of the elements under the control of each of the control units 160, 260, and 360. Hereinafter, the target device 100 is assumed to be a washing machine, and the target device 100 may also be called a washing machine.

FIG. 29 is a diagram showing a profile stack provided for a Bluetooth communication connection method according to yet another embodiment of the present invention.

The Bluetooth protocol stack includes a host 2920 on the upper side of a Host Controller Interface (HCI) 2916 and a controller 2910 on the lower side of the HCI 2916. The controller 2910 includes a physical layer (PHY) 2912, and a Link Layer (LL) 2914.

Furthermore, the host 2920 includes a logical link control and adaptation protocol (L2CAP) 2921, a Security Manager (SM) 2922, an attribute protocol (ATT) 2923, a Generic Attribute Profile (GATT) 2924, a Generic Access Profile (GAP) 2925, and a GATT-based profile 2926.

The controller 2910 and the host 2920 are connected together by the HCI 2916.

The host 2920 may provide commands and data to the controller 2910 through the HCI 2916. The controller 2910 may provide events and data to the host 2920 through the HCI 2916.

The controller 2910 refers to a radio transmission/reception module for receiving Bluetooth signals and hardware for sending or receiving Bluetooth packets.

The PHY layer 2912 is a layer for sending and receiving radio signals, and it uses a Gaussian Frequency Shift Keying (GFSK) modulation scheme and a frequency hopping scheme including 40 Radio Frequency (RF) channels.

The link layer 2914 may provide a function for generating connection between devices by performing advertising and scanning functions using three advertising channels and exchanging data packets 37 data channels.

The host 2920 may multiplex various protocols and profiles provided by higher Bluetooth using the logical link control and adaptation protocol (hereinafter called L2CAP) 2921.

The L2CAP 2921 may provide a single bi-directional channel for sending data to a specific protocol or profile and uses three fixed channels in Bluetooth LE energy.

The fixed channels may be used for a signaling channel, the Security Manager (SM) 2922, and the attribute protocol (hereinafter called ATT) 2923.

A dynamic channel is used in a Bluetooth Basic Rate/Enhanced Data Rate (BR/EDR), and a protocol service multiplexer, retransmission, and streaming mode may be supported.

The Security Manager (hereinafter called SM) 2922 is a protocol for providing device authentication and key distributions.

The ATT 2923 is used in communication between a server and a client. A client has an attribute handle which is used to access attributes in a server. Protocol operation instructions include "Request", "Response", "Command", "Notification", "Indication", and "Confirmation."

The generic attribute profile (hereinafter called GATT) 2924) defines a procedure for obtaining corresponding information using the following message defined in the S/W element and ATT protocol of a Bluetooth device. The procedure may define the configuration of discovering, reading, writing, notifying, and indicating characteristics.

Service: Define the basis operation of a device through a combination of behaviors related to data
Include: Define the relationships between services
Characteristics: A data value used in a service
Behavior: A computer readable format defined by a Universally Unique Identifier (UUID)

The GAP 2925 defines a scheme for discovering and connecting defined devices and providing information to a user and may provides privacy.

The GATT-based profile 2926 is profiles dependent on the GATT 2924 and is chiefly applied to low energy devices.

The GATT-based profile 2926 may include profiles related to a battery, time, proximity, phone alert, a heart rate, and a washing machine service (i.e., a HTTP Proxy Service) 2927.

The washing machine service 2927 may provide a service for controlling the washing machine u sing the Generic Attribute Profile (GATT) function of Bluetooth. The controlling device 200 may control the washing machine using the washing machine service 2927, and the remote controlling device 300 may also control the washing machine through the controlling device 200.

FIG. 30 is a flowchart illustrating a Bluetooth connection method according to yet another embodiment of the present invention.

Referring to FIG. 30, the controlling device 200 may provide notification of services supportable by the washing machine 100 and may provide the washing machine service through connection with the washing machine 100 using the services. In an embodiment of the present invention, the parameters and PDU Types described with reference to FIGS. 4 and 7 may be used.

More specifically, the controlling device 200 may notify the washing machine 100 that the washing machine service is available by sending an advertising PDU at step S3010.

The advertising PDU may be used to notify another device of information (e.g., a device name, service information, and manufacturer data) about a transmitting device and may include a header and a payload.

The washing machine 100 that has been aware that the controlling device 200 can provide the washing machine service based on the advertising PDU received from the controlling device 200 may send a scan request to the controlling device 200 at step S3020. The scan request may be transmitted by the washing machine 100 when the washing machine 100 wants to be aware of additional information about the controlling device 200.

In response to the scan request, the controlling device 200 may send additional information about the controlling device 200 to the washing machine 100 through a scan response at step S3030.

Thereafter, the washing machine 100 may send its own information to the controlling device 200 through an advertising PDU. The advertising PDU may include information indicating whether the washing machine service of the washing machine is supported.

Table 1 below shows a universal unique identifier (UUID) which may be included in the advertising PDU for the washing machine service.

TABLE 1

| Specification Name | Specification Type | Assigned Number |
| --- | --- | --- |
| Washing machine service | org.bluetooth.service.home_control | 0x1817 |

Referring to Table 1, the advertising message may include a "0x1817" value in order to provide notification that the washing machine service can be supported.

In this case, a 16-bit UUID may have the 0x1817 value, and a 128-bit UUID may have a "0x00001817-0000-1000-8000-0085F9B34FB" value.

The controlling device 200 that has received the advertising PDU sends a connection request to the washing machine 100 in order to perform connection with the target device 100 at step S3050.

The connection request is a control PDU for sending information indicative of connection with a Bluetooth module. The connection request may include Destination_Dev and Authority parameter. Authority and Destination_Dev are the same as the aforementioned contents.

The controlling device 200 connected to the washing machine 100 through Bluetooth sends a data channel PDU to the washing machine 100 in order to obtain information from the washing machine 100 or give a specific command to the washing machine 100 at step S3060.

The data channel PDU may be used for data transmission or may be used for controlling link layer connection.

The washing machine 100 that has received the data channel PDU executes a command included in the data channel PDU. The washing machine 100 may include the results of the execution or requested data in a data channel PDU and send the data channel PDU to the controlling device 200 at step S3070.

The controlling device 200 can control the washing machine 100 through Bluetooth communication according to the aforementioned method.

FIG. 31 is a diagram showing the structure of a service according to yet another embodiment of the present invention.

FIG. 31 shows the type of characteristics for providing the washing machine service at once. More specifically, Table 2 below shows a data structure and characteristics for providing the washing machine service.

The scheduled time 3130 may indicate the time when a scheduled time is executed. In order to set the scheduled time 3130, the controlling device 200 may set the scheduled time through a write request and send a read request in order to check the scheduled time of the washing machine 100.

The scheduled operation 3140 indicates operation mode (e.g., washing course or dehydration) of a scheduled operation. The controlling device 200 may set the scheduled operation 3140 by sending a write request to the washing machine 100 and may send a read request to the washing machine 100 in order to check a set scheduled operation 3140.

The laundry volume 3150 indicates the relative amount of laundry contained in the washing machine 100. The controlling device 200 may send a read request to the washing machine 100 in order to check the laundry volume 3150.

The water level 3160 indicates the amount of water which is used when washing is performed. The controlling device 200 may send a write request to the washing machine 100 in order to set the level of water, that is, the amount of water which is used when washing is performed. The controlling device 200 may send a read request to the washing machine 100 in order to check a currently set water level 3160.

The water temperature 3170 is the temperature of water when washing is performed and may indicate an absolute

TABLE 2

|  | Broadcast | Read | Write without response | write | Notify | Indicate | Signed write | Reliable Write | Writable auxiliaries |
|---|---|---|---|---|---|---|---|---|---|
| Operation status |  | M |  | M |  | M |  |  |  |
| Remaining time |  | M |  |  |  | M |  |  |  |
| Scheduled time |  | M |  | M |  |  |  |  |  |
| Scheduled operation |  | M |  | M |  |  |  |  |  |
| Laundry volume |  | M |  |  |  |  |  |  |  |
| Water level |  | M |  | M |  |  |  |  |  |
| Water temperature |  | M |  | M |  |  |  |  |  |
| Noise level |  | M |  | M |  |  |  |  |  |

The washing machine control service 3100 may have at least one of the characteristics of an operation status 3110, a remaining time 3120, a scheduled time 3130, a scheduled operation 3140, a laundry volume 3150, a water level 3160, a water temperature 3170, and a noise level 3180.

The operation status 3110 provides status information of the washing machine. The status type of the washing machine may be ON, Running, Scheduled Sleeping and may be written and read from the controlling device 200, and the status information may be provided to the controlling device 200 through an indication message.

The type of the operation status may indicate the following status.
 ON: Power On but no working.
 Running: Power On and working.
 Scheduled Sleeping: Sleeping and waiting Scheduled working.

The remaining time 3120 may indicate the remaining time until an operation is terminated while the washing machine is in operation and may be indicated as a relative time value.

temperature value of water. The controlling device 200 may set the temperature of water of the washing machine 100 through a write request and check the temperature of water of the washing machine through a read request.

The noise level 3180 may indicate whether mode is noise mode when washing is performed and indicate a relative value (e.g., low noise or common). The controlling device 200 may set the noise level 3180 of the washing machine 100 through a write request and set the noise level of the washing machine through a read request.

Contents defined as Indication in Table 2 may be transmitted to the controlling device 200 through a notification message. In the case of the notification message, the transmission of a confirm message from the controlling device 200 may not be required.

Table 3 below shows behaviors for the characteristics of a Bluetooth washing machine service.

TABLE 3

| Characteristics | UUID | Value | Command | Server Action |
|---|---|---|---|---|
| Operation status | 0x2A71 | Integer value<br>0x01 - On<br>0x02 - Sleeping<br>0x03 - Scheduled sleeping<br>0x04 - Pause<br>0x05 - Out of Order<br>0x10 - Running<br>0x11 - Washing<br>0x12 - Drying<br>0x13 - Rinsing<br>0x14 - Spin | Read | Provide a corresponding value when a request is received from a client |
| | | | Write | When a request is received from a client, a corresponding value is changed, and a washing machine operation status according to the request is changed.<br>(Washing -> Pause -> Washing) |
| | | | Indication | When the status is changed, changed information is provided to a client |
| Remaining time | 0x2A72 | Relative Time Value Hh:mm:ss<br>(ex. 01:30:00) | Read | Provide a remaining washing time information (may provide washing time information according to scheduled washing mode) |
| | | | Indication | Provided periodically or when an operation value is changed |
| Scheduled time | 0x2A73 | Absolute Time Value YYYY/MM/DD hh:mm:ss<br>(ex. 2014/11/03 17:30:00) | Read | Provide scheduled washing time information |
| | | | Write | Changed to a time value requested by a user |
| Scheduled operation | 0x2A74 | Integer Value<br>0x01 - Standard<br>0x02 - Cotton<br>0x03 - Silk<br>0x04 - Wool<br>0x05 - Synthetic<br>0xFF - not supported | Read | Provide scheduled washing mode information and provide washing time information if necessary (it is provided along with remaining time information) |
| | | | Write | Change washing mode when a new value is received |
| Laundry volume | 0x2A75 | Integer Value<br>0x01 - None<br>0x02 - Small<br>0x03 - Middle<br>0x04 - Much<br>0xFF - not supported | Read | Provide a corresponding value (laundry volume) when a request is received from a client |
| Water level | 0x2A76 | Integer Value<br>0x01 - None<br>0x02 - Low<br>0x03 - Middle<br>0x04 - High<br>0x05 - Full<br>0xFF - not supported | Read | Provide water level information when washing is performed |
| | | | Write | Set a water level value when washing is performed |
| Water temperature | 0x2A77 | Integer Value<br>0x00~0x5F (95)<br>0xFF - not supported | Read | Provide a water temperature value when washing is performed |
| | | | Write | Set a water temperature value when washing is performed |
| Noise level | 0x2A78 | Integer Value<br>0x00 - Low Noise Mode<br>0x02 - Normal Mode<br>0xFF - not supported | Read | Provide a noise mode value when washing is performed |
| | | | Write | Set a noise mode value when washing is performed |

The controlling device 200 may control the washing machine 100, that is, a washing machine, through Bluetooth communication based on through the aforementioned contents and the characteristics of Table 3.

FIG. 32 is a flowchart illustrating a method for controlling a Bluetooth device using a device other than Bluetooth in accordance with other embodiments of the present invention.

From FIG. 32, it may be seen that the controlling device 200 receives a command from an external remote controlling device 300 and controls the target device 100.

A Representative Safe Transfer Application Program Interface (REST API) is described in more detail below.

The remote controlling device 300 may access the controlling device 200 using the REST API. The controlling device 200 and the washing machine 100, that is, a washing machine, can communicate with each other using Bluetooth.

The REST API is one type of software architecture for a distributed hypermedia system, such as World Wide Web. In a strict sense, REST is a collection of network architecture principles. In this case, the network architecture principle refers to a summary of a method for defining resources and designating addresses for the resources.

The REST basically includes three elements: a resource, a method, and a message.

Table 4 below shows four methods used in the REST.

TABLE 4

| Method | Meaning | Idempotent |
| --- | --- | --- |
| POST | Create | No |
| GET | Select | Yes |
| PUT | Update | Yes |
| DELETE | Delete | Yes |

In Table 4, Idempotent means a case where the results are the same although the method is performed several times.

The remote controlling device 300 may request a list of devices connected to the controlling device 200 through "get device" at step S3210. In this case, a resource may be http://gateway/bluetooth/gatt/devices, and a method may be "get."

In response to the request, the controlling device 200 may provide the list of devices connected to the remote controlling device 300 at step S3220. In this case, the controlling device 200 may send the list to the remote controlling device 300 through an HTTP 200 OK message and may also send information about profiles and services supported for each device.

Thereafter, the remote controlling device 300 may request connection with the washing machine connected to the controlling device 200 by sending a connection request to the controlling device 200 at step S3230.

In response to the connection request, the controlling device 200 may perform a Bluetooth connection with the target device 100 by requesting the Bluetooth connection from the target device 100.

In this case, a resource may be http://gateway/bluetooth/gatt/devices_name.

Thereafter, the controlling device 200 that has requested the Bluetooth connection from the target device 100 may send an HTTP 200 OK message to the remote controlling device 300 as a response to the connection request received from the target device 100 at step S3240.

After the controlling device 200 and the target device 100 are connected together through Bluetooth through the connection request, the remote controlling device 300 may send write and read requests to the washing machine 100 through the controlling device 200 at step S3250.

The remote controlling device 300 may perform a specific operation on the target device 100 or request information from the target device 100 through the write and read requests.

In this case, the resource of a method corresponding to "get" may be http://gateway/bluetooth/gatt/devices_name/service_name/characteristic_name." The resource of a method corresponding to "put" may be http://gateway/bluetooth/gatt/devices_name/service_/characteristic_name/value_parameter.

Thereafter, the controlling device 200 may include a response to the write and/or read request in an HPPT 200 OK message and send the HPPT 200 OK message to the remote controlling device 300 at step S3260.

Furthermore, if the status or operation of the target device 100 is changed, the remote controlling device 300 may send a "Subscribe" message, requesting the changed status or operation from the remote controlling device 300, to the controlling device 200 at step S3270.

In this case, the resource of a method corresponding to the "put" may be http://gateway/bluetooth/gatt/devices_name/service_name.

In response to the "Subscribe" message, the controlling device 200 may send an HTTP 200 OK message to the remote controlling device 300 at step S3280.

Thereafter, if the status or operation of the target device 100 is changed and the indication message or notification message of the target device 100 is transmitted, the controlling device 200 may send the indication message or notification message to the remote controlling device 300 at step S3290.

Through the aforementioned method, a user can control the target device 100 at home through the remote controlling device 300 even in the outside.

FIG. 33 is a diagram showing a data structure to which a service has been applied in accordance with yet another embodiment of the present invention.

Referring to FIG. 33, advertising data AdvData and scan response data ScanRspData may be divided into a significant part 3310 and a non-significant part 3320.

The significant part 3310 may be subdivided into a plurality of AD structures 3330. Each of the AD structures 3330 may be divided into a length filed 3340 and a data field 3350.

The size of the length filed 3340 may be 1 octet and may indicate the size of the data field. Furthermore, the size of the data field 3350 has the same octet size as the value of the length filed and may be divided into an AD Type 3360 and AD DATA 3370.

The AD Type 3360 may have a size of n octets and may include at least one of a Service UUID, a Local Name, Flags, Manufacturer Specific Data (Company identifier code and/or Manufacture specific data), a TX Power level, a Security Manager out of Band (OOB), a Security Manager TK Value, a Slave Connection Interval Range, Service Solicitation, and Service Data.

The AD DATA 3370 may have a size obtained by subtracting the size of the AD Type from the value of the length field 3340 and may be indicated as an octet value.

If the advertising data or the scan response data indicate the washing machine service, the fields may have values of Table 5 below.

TABLE 5

| Length | AD Type | AD Data |
| --- | --- | --- |
| 3 | 0x03 | 0x1817 |

FIGS. 34 to 37 are flowcharts illustrating operations between the Bluetooth controlling device and the target device according to yet another embodiment of the present invention.

Referring to FIG. 34, the controlling device 200 may request specific information from the washing machine 100 through Bluetooth communication.

More specifically, when a user inputs a command to the controlling device 200 in order to check the operation status of the washing machine 100, the controlling device 200 may request a characteristic value from the washing machine 100 through a read request at step S3410.

In response to the read request, the washing machine 100 may check information requested through the read request, that is, a characteristic value, and send the characteristic value to the controlling device 200 at step S3420.

Accordingly, the controlling device 200 and the user can check the current status of the washing machine 100, for example, a laundry volume, a scheduled operation, a scheduled time and/or a water level through the output unit. Table 6 below shows the format of the read request, and Table 7 below shows the format of the read response.

TABLE 6

| Opcode (1 octet) | Length (1 octet) | Data |
|---|---|---|
| 0x1E | Data size + 2 | Characteristic UUID |

TABLE 7

| Opcode (1 octet) | Length (1 octet) | Data |
|---|---|---|
| 0x1F | Data size + 2 | Characteristic UUID |

FIG. 35 shows a method for changing, by the controlling device 200, the operation of the washing machine 100 through a write request. More specifically, when the controlling device 200 receives a signal indicative of a specific operation of the washing machine 100 from a user, the controlling device 200 may give an order to the washing machine 100 through a write request so that the washing machine 100 performs the specific operation at step S3510.

In response to the write request, the washing machine 100 may change or stop its operation in response to the requested signal and send corresponding results to the controlling device 200 at step S3520.

Table 8 below shows the format of the write request, and Table 9 below shows the format of the write response.

TABLE 8

| Opcode (1 octet) | Length (1 octet) | Data | |
|---|---|---|---|
| 0x12 | Data size + 2 | Characteristic UUID | Value of Characteristic |

TABLE 9

| Opcode (1 octet) |
|---|
| 0x13 |

FIG. 36 is a diagram showing that the controlling device is notified of a change of the status of the washing machine when the status of the washing machine is changed. More specifically, if the operation status of the washing machine 100 is changed, the washing machine 100 may notify the controlling device 200 of a change of the operation status through an indication message at step S3610.

The controlling device 200 that has received the indication message may send a confirm message to the washing machine 100 as a response to the indication message at step S3620.

The indication message may be changed to a notification message. In this case, the controlling device 200 may not send the confirm message.

Table 10 below shows the format of the indication message, and Table 11 below shows the format of the confirm message.

TABLE 10

| Opcode (1 octet) | Length (1 octet) | Data | |
|---|---|---|---|
| 0x1D | Data size + 2 | Characteristic UUID | Value of Characteristic |

TABLE 11

| Opcode (1 octet) |
|---|
| 0x1E |

FIG. 37 shows a method for sending an error message if the washing machine does not perform a requested operation when the controlling device requests a change of an operation from the washing machine.

More specifically, the controlling device 200 may give an order to the washing machine 100 through a write request so that the washing machine 100 executes a specific operation in response to a user's input as described with reference to FIG. 35, at step S3710.

In this case, if the washing machine 100 is unable to execute the specific operation due to an abnormal operation, the washing machine sends an error message to the controlling device 200 at step S3720. For example, when the controlling device 200 gives an order to the washing machine 100 through a write request so that the washing machine performs washing, if the washing machine 100 is unable to perform the washing, the washing machine may send error code "0x88" to the controlling device 200.

Table 12 below shows the format of the error response, and Table 13 below shows error code for an error which may occur.

TABLE 12

| Opcode (1 octet) | Length (1 octet) | Data |
|---|---|---|
| 0x01 | 3 | Error Code |

TABLE 13

| Error situation | Error Response Code | Server Action |
|---|---|---|
| Inaccurate time | 0x80 | A requested scheduled time is inaccurate |
| Not enough water | 0x81 | Water is insufficient in a washing tub |
| Motor is not working | 0x82 | Abnormal washing tub motor |
| Dryer is not working | 0x83 | No dry function operation |
| Temperature is not measured | 0x84 | Temperature measurement is impossible |

TABLE 13-continued

| Error situation | Error Response Code | Server Action |
|---|---|---|
| Low noise mode is not supported | 0x85 | Not support noise mode |
| Water level is not measured | 0x86 | Water level measurement is impossible |
| Laundry level is not measured | 0x87 | Laundry volume measurement is impossible |
| Out of order | 0x88 | An operational error |
| Wrong message format | 0x89 | A message format error |

FIGS. 38 to 41 are flowcharts illustrating communication with a Bluetooth device using a function other than Bluetooth in accordance with other embodiments of the present invention.

Referring to FIG. 38, a device outside a room can control devices inside the house through the controlling device.

More specifically, the controlling device 200 and the washing machine 100 are devices present out of a room. They are connected together through Bluetooth and exchange data through Bluetooth at step S3810.

In this case, a user outside the room may request information about devices connected to the controlling device 200 from the controlling device 200 using the remote controlling device 300 at step S3820.

In this case, as described above, the user may request information about the devices connected to the controlling device 200 using the HTTP Get method through the REST API. In this case, a resource may indicate http://gateway/bluetooth/gatt/devices.

In response to the request, the controlling device 200 may send information about a device connected thereto and devices previously connected thereto to the remote controlling device 300 at step S3830. For example, the controlling device 200 may send information about a device connected thereto and devices previously connected thereto to the remote controlling device 300 through an HTTP 1.1 OK response message, that is, an HTTP response format. The HTTP 1.1 OK message may include content types, device names, supported profiles, and supported services.

Referring to FIG. 39, a device outside a room may obtain information about devices outside the room through the controlling device.

More specifically, the remote controlling device 300 outside a room may request information about the target device 100 from the controlling device 200 using the HTTP GET method at step S3910. In this case, the method described with reference to FIG. 32 may be used. In this case, a resource may be indicated as http://gateway/bluetooth/gatt/Washingmachineservice/operation.

Thereafter, the controlling device 200 may obtain the information about the target device 100 through a read procedure for the target device 100 using Bluetooth communication at step S3920. That is, the controlling device 200 may request specific information about the target device 100 by sending a read request to the target device 100. In response to the read request, the target device 100 may send the requested information to the controlling device 200 by sending a read response to the controlling device 200.

The controlling device 200 that has received the information of the target device 100 may send the obtained information to the remote controlling device 300 through an HTTP 1.1 OK message, that is, an HTTP response format, at step S3930.

Referring to FIG. 40, a device outside a room can change the operation of the washing machine through the controlling device inside the room.

More specifically, the remote controlling device 300 may request a change of the operation of the target device 100 from the controlling device 200 at step S4010. In this case, the remote controlling device 300 may request a change of the operation status of the washing machine 100 through the HTTP Put method. In this case, a resource may be indicated as http://gateway/bluetooth/gatt/WashingMachine/Washingmachineservice/operation_Pause.

In response to the request, the controlling device 200 may request the target device 100 to change an operation that is now performed or to perform a specific operation through a write procedure using Bluetooth communication at step S4020.

That is, the controlling device 200 may give an order to the target device 100 through the write request so that the target device 100 changes a current operation or performs a specific operation. The target device 100 may execute the requested operation and send a corresponding response to the controlling device 200.

Thereafter, the controlling device 200 may send the response of the target device 100 to the remote controlling device 300 through an HTTP 1.1 OK message, that is, an HTTP Response format, at step S4030.

Referring to FIG. 41, if the status of the washing machine 100 is changed, the washing machine 100 may notify the controlling device of the changed status through an indication message. The controlling device 200 may notify the remote controlling device 300 of the changed status.

More specifically, the remote controlling device 300 may request an event service subscription, providing notification of a change of the status or operation of the target device 100 whenever the status or operation of the target device 100 is changed, from the controlling device 200 at step S4110. In this case, a resource may be indicated as http://gateway/bluetooth/gatt/WashingMachine/Washingmachineservice.

After the target device 100 performs the event service subscription, the controlling device 200 may send a response, indicating whether the target device 100 has subscribed to the event service, to the remote controlling device 300 through an HTTP 200 OK message at step S4120.

Thereafter, if the status or operation of the target device 100 is changed, the target device 100 may notify the controlling device 200 that the status or operation of the target device 100 has changed through an indication procedure at step S4130.

That is, if the status or operation of the target device 100 is changed, the target device 100 may notify the controlling device 200 of information related to the change by sending an indication message to the controlling device 200. The controlling device 200 may send a confirm message to the target device 100.

If the target device 100 notifies the controlling device 200 of its change state or change operation through a notification message, the controlling device 200 may not send the confirm message to the target device.

The controlling device 200 that has received the indication message or the notification message from the target device 100 may notify the remote controlling device 300 of the status of the target device 100 through an HTTP method (e.g., through an HTTP 1.1 OK message) or a session connection at step S4140.

The present invention may be substituted, modified, and changed in various ways by those skilled in the art to which the present invention pertains without departing from the technical spirit of the present invention and thus is not limited to the aforementioned embodiments and the accompanying drawings.

INDUSTRIAL APPLICABILITY

This specification provides some Bluetooth connection methods and devices. In particular, this specification provides Bluetooth connection methods and devices for connecting Bluetooth devices together using a low energy method of Bluetooth, that is, a short-distance wireless communication technology.

The invention claimed is:

1. A Bluetooth connection method, comprising: transmitting, by a Bluetooth Low Energy (LE) module, a first request message to neighboring devices requesting device information associated with at least one device including a Bluetooth LE module in a standby state to search for a connectable Bluetooth LE module: receiving a first response message including the device information: transmitting, by the Bluetooth LE module, a connection request message for instructing a connection through the Bluetooth LE module to a target device among the at least one device:
   establishing a connection with the target device through the Bluetooth LE module based on the connection request message:
   transmitting, by the Bluetooth LE module, a handover request message requesting handover to a Bluetooth Basic Rate/Enhanced Data Rate (BR/EDR) module to the target device: transmitting a wake-up message to the Bluetooth BR/EDR module to activate the Bluetooth BR/EDR module in an inactivated state:
   changing a power level indicating an operable state of at least the Bluetooth BR/EDR module or the Bluetooth LE module based on the wake-up message:
   receiving a handover response message for the handover request message from the target device:
   performing a handover from the Bluetooth LE module to the Bluetooth BR/EDR module:
and
   transmitting or receiving, by the Bluetooth BR/EDR module, data via the Bluetooth BR/EDR module with the target device wherein the connection request message includes connection authority information of the target device, and
   wherein the connection authority information includes registration information indicating whether the target device is a registered device, a control level for determining whether the target device can be controlled, product group information of the target device, and security information indicating security strength.

2. The method of claim 1, wherein the device information includes a name of the at least one device, a type of the at least one device, a Universal Unique Identifier (UUID), information of a device connected to the at least one device, and connection authority information of the at least one device.

3. The method of claim 1, further comprising:
   receiving response messages in response to the connection request message.

4. The method of claim 1, wherein the connection is established based on connection authority information.

5. The method of claim 1, further comprising:
   grouping, by the Bluetooth LE module, the at least one device based on the device information according to a provided service,
   wherein devices providing a same service among the at least one device are classified into a same group.

6. The method of claim 5, further comprising:
   selecting one of the grouped devices as a group owner, wherein the group owner receives a controlling message including information for controlling all the devices belonging to the identical group.

7. The method of claim 6, further comprising:
   controlling operations of the grouped devices by transmitting the information to a Bluetooth BR/EDR module corresponding to the device selected as the group owner.

8. A method for connecting a controlling device and a target device using Bluetooth in a wireless communication system, the method performed by the controlling device and comprising:
   receiving an advertising message from the target device, wherein the advertising message includes a universal unique identifier (UUID) indicating a washing machine service;
   transmitting a connection request message to request connection using a Bluetooth Low Energy (LE) method to the target device based on the received packet;
   establishing the connection with the target device using the Bluetooth LE method;
   transmitting a first write request message requesting writing of a specific characteristic to instruct execution of a specific operation for providing the washing machine service,
   wherein the specific characteristic indicates the specific operation; and
   receiving a first write response message including status information indicating whether the target device has performed the specific operation in response to the first request message.

9. The method of claim 8, further comprising:
   transmitting a request message to request additional information related to the second target device to the target device; and
   receiving a response message in response to the request message from the target device.

10. The method of claim 8, further comprising:
    transmitting a second write request message requesting a status change of the target device to the target device; and
    receiving a second write response message in response to the second write request message from the target device.

11. A method for controlling a target device through a controlling device using Bluetooth in a wireless communication system, the method performed by a remote controlling device and comprising:
    transmitting a first request message to a controlling device requesting list information of at least one device controllable by the controlling device;
    receiving a first response message including the list information from the controlling device,
    wherein the first response message includes at least one of profile information or service information supported by each of the at least one device, and
    wherein the profile information or the service information is associated with a washing machine service;
    transmitting a second request message to indicate connection with the target device included in the at least one device using a Bluetooth Low Energy (LE) method to the controlling device;

receiving a second response message in response to the second request message;

transmitting to the controlling device a third request message for instructing the target device to perform a specific operation for providing the washing machine service; and receiving a third response message including status information indicating whether the target device has performed the specific operation in response to the third request message, wherein the remote controlling device is connected to the controlling device via a network other than the Bluetooth.

12. The method of claim 8, wherein the first write request message includes time information indicating a time at which the specific operation is performed.

13. The method of claim 1, wherein the power level is determined according to a state of at least one of the BR/EDR module or the LE module, a band pass filter (BPF), and a power application state of a demodulator.

* * * * *